(12) United States Patent
Maehara et al.

(10) Patent No.: US 9,191,856 B2
(45) Date of Patent: Nov. 17, 2015

(54) NETWORK SYSTEM, OFFLOAD DEVICE, AND OFFLOAD TRAFFIC CONTROL METHOD

(71) Applicant: FUJITSU LIMITED, Kawasaki (JP)

(72) Inventors: Satoshi Maehara, Yokohama (JP); Masaharu Kako, Toukai (JP)

(73) Assignee: FUJITSU LIMITED, Kawasaki (JP)

( * ) Notice: Subject to any disclaimer, the term of this patent is extended or adjusted under 35 U.S.C. 154(b) by 562 days.

(21) Appl. No.: 13/692,578

(22) Filed: Dec. 3, 2012

(65) Prior Publication Data

US 2013/0188481 A1 Jul. 25, 2013

(30) Foreign Application Priority Data

Jan. 25, 2012 (JP) ................................. 2012-012939

(51) Int. Cl.
H04L 1/00 (2006.01)
H04L 12/26 (2006.01)
H04W 28/02 (2009.01)
H04W 28/14 (2009.01)

(52) U.S. Cl.
CPC .......... *H04W 28/0273* (2013.01); *H04W 28/14* (2013.01); *H04L 12/26* (2013.01)

(58) Field of Classification Search
CPC .............. H04L 47/10; H04L 12/5695; H04W 28/0273; H04W 28/04
See application file for complete search history.

(56) References Cited

U.S. PATENT DOCUMENTS

| | | | | |
|---|---|---|---|---|
| 2005/0079878 A1* | 4/2005 | Smith et al. | ................ | 455/456.5 |
| 2011/0075675 A1* | 3/2011 | Koodli et al. | ................ | 370/401 |
| 2012/0082161 A1* | 4/2012 | Leung et al. | ................ | 370/392 |
| 2012/0269134 A1 | 10/2012 | Jin et al. | | |
| 2013/0089076 A1* | 4/2013 | Olvera-Hernandez et al. | ............................. | 370/332 |
| 2013/0189994 A1* | 7/2013 | Maehara et al. | ............... | 455/439 |

FOREIGN PATENT DOCUMENTS

| | | |
|---|---|---|
| JP | 2004-523148 | 7/2004 |
| JP | 2010-541312 | 12/2010 |
| JP | 2013-517640 | 5/2013 |
| JP | 2013-518492 | 5/2013 |
| WO | WO 02/43410 A2 | 5/2002 |
| WO | WO 2009/040700 A2 | 4/2009 |
| WO | 2011/079634 A1 | 7/2011 |
| WO | 2011/095358 A1 | 8/2011 |

OTHER PUBLICATIONS

Japanese Office Action issued Jun. 16, 2015 in corresponding Japanese patent application No. 2012-012939.

* cited by examiner

*Primary Examiner* — Hassan Kizou
*Assistant Examiner* — Abdelnabi Musa
(74) *Attorney, Agent, or Firm* — Staas & Halsey LLP

(57) ABSTRACT

A network system includes: a plurality of base stations, each with which a mobile station communicates; a core network to include the plurality of base stations; and a plurality of offload devices, each being arranged between the base station and a node device included in the core network, each to serve as the node device of an anchor point at which traffic to be offloaded is transmitted/received to/from an offload network, and each to serve as the node device of a relay point at which the traffic to be offloaded is relayed between the anchor point and one of the plurality of base stations with which the mobile station is communicating.

6 Claims, 95 Drawing Sheets

FIG. 5

| INTRA-oGW UE IDENTIFIER | USER LINE IDENTIFIER (E RAB ID) | TCP Connection INFO | OFFLOAD ANCHOR POINT INFO |
|---|---|---|---|
| 8000 | 2 | UE#x-IP-Addr. port#10000 | TOF UL-TEID#1, oGW#1 |
| 8001 | 2 | UE#x-IP-Addr. port#10000 | TOF UL-TEID#3z, oGW#3 |
| 8000 | 2 | UE#x-IP-Addr. port#10001 | TOF UL-TEID#1, oGW#1 |
| 8000 | 2 | UE#x-IP-Addr. port#10002 | TOF UL-TEID#1, oGW#1 |
|  |  |  |  |
|  |  |  |  |
|  |  |  |  |

| USER DATA | get http://www.fujitsu.com... |
|---|---|
| TCP | flags=syn/fin, src port=10005, dst port=80 |
| IP | SA: UE IP Address, DA: Web IP Address |
| GTP-u | TEID=TEID#SGW-u2 (for S-GW) |
| UDP_G | UDP HEADER |
| IP_G | SA: eNB#1 IP Address, DA: S-GW#1 IP Address |
| L2 | L2 HEADER |
| L1 | L1 HEADER |

FIG. 7

| USER DATA | Http/1.0 200 ok content-type... |
|---|---|
| TCP | flags=syn/fin, src port=80, dst port=10005 |
| IP | SA: Web IP Address, DA: UE IP Address |
| GTP-u | TEID=eNB-TEID#2 (for eNB) |
| UDP_G | UDP HEADER |
| IP_G | SA: S-GW#1 IP Address, DA: eNB#1 IP Address |
| L2 | L2 HEADER |
| L1 | L1 HEADER |

FIG. 8

| USER DATA | get http://www.fujitsu.com... |
|---|---|
| TCP | flags=syn/fin, src port=10005, dst port=80 |
| IP | SA: UE IP Address, DA: Web IP Address |
| GTP-u | TEID=TOF UL-TEID#1 (for oGW ANCHOR POINT) |
| UDP_G | UDP HEADER |
| IP_G | SA: oGW#1 (SORTING) IP Address, DA: oGW#1 (ANCHOR) IP Address |
| L2 | L2 HEADER |
| L1 | L1 HEADER |

FIG. 9

| USER DATA | get http://www.fujitsu.com |
|---|---|
| TCP | flags=syn/fin, src port=20021, dst port=80 |
| IP | SA:oGW#1(ANCHOR) IP Address, DA:Web IP Address |
| L2 | L2 HEADER |
| L1 | L1 HEADER |

FIG. 10

| USER DATA | Http/1.0 200 ok content-type... |
|---|---|
| TCP | flags=syn/fin, src port=80, dst port=20021 |
| IP | SA:Web IP Address, DA:oGW#1(ANCHOR) IP Address |
| L2 | L2 HEADER |
| L1 | L1 HEADER |

FIG. 11

| USER DATA | Http/1.0 200 ok content-type... |
|---|---|
| TCP | flags=syn/fin, src port=80, dst port=10005 |
| IP | SA:Web IP Address, DA:UE IP Address |
| GTP-u | TEID=TOF UL-TEID#1 (for oGW SORTING POINT) |
| UDP_G | UDP HEADER |
| IP_G | SA:oGW#1(ANCHOR) IP Address, DA:oGW#1(SORTING) IP Address |
| L2 | L2 HEADER |
| L1 | L1 HEADER |

FIG. 12

Bearer USER DETERMINATION TABLE — 175A

| INTRA-oGW UE IDENTIFIER | INTRA-MME UE IDENTIFIER | MME DEVICE IDENTIFIER | INTRA-eNB UE IDENTIFIER (S1AP) | INTRA-eNB UE IDENTIFIER (X2AP) | eNB DEVICE IDENTIFIER |
|---|---|---|---|---|---|
| 8000 | MME UE S1AP ID | MME#1 | eNB UE S1AP ID#x | | eNB#1 |
| 8001 | MME UE S1AP ID | MME#1 | eNB UE S1AP ID#z | | eNB#1 |
| | | | | | |

175a

Bearer USER DETERMINATION TABLE

| INTRA-oGW UE IDENTIFIER | INTRA-T-Target CELL ID INFO T-Target Cell ID inf | T-C-RNTI inf | INTRA-S-Target CELL ID INFO S-Target Cell ID inf | INTRA-S-Target-CELL UE ID INFO S-C-RNTI inf |
|---|---|---|---|---|
| 8000 | | | | |
| 8001 | | | | |
| | | | | |

175b

Bearer TABLE — 175B

| INTRA-oGW UE IDENTIFIER | USER LINE IDENTIFIER | uplink LINE ASSIGNMENT INFO | | downlink LINE ASSIGNMENT INFO | | TOF SORTING POINT POSITION INFO | TOF ANCHOR POINT POSITION INFO |
|---|---|---|---|---|---|---|---|
| 8000 | 1 | TEID#SGW-u1 | SGW#1 | eNB-TEID#1 | eNB#1 | (OFFLOAD NOT APPLICABLE) | |
| 8000 | 2 | TEID#SGW-u2 | SGW#1 | eNB-TEID#2 | eNB#1 | TOF DL-TEID#x | TOF UL-TEID#1 oGW#1 |
| 8000 | 3 | TEID#SGW-u3 | SGW#1 | eNB-TEID#3 | eNB#1 | (OFFLOAD NOT APPLICABLE) | |
| 8001 | 2 | TEID#SGW-u6 | SGW#1 | eNB-TEID#4 | eNB#1 | TOF DL-TEID#z | TOF UL-TEID#x oGW#1 |
| | | | | | | | |

FIG. 13

TOF RELAY MANAGEMENT TABLE　　　　　178a

| INTRA-oGW-ANCHOR UE IDENTIFIER | USER LINE IDENTIFIER | TOF ANCHOR POINT POSITION | TOF SORTING POINT POSITION | |
|---|---|---|---|---|
| 4000 | 2 | TOF UL-TEID#1 | TOF DL-TEID#1 | oGW#2 |
| 4001 | 2 | TOF UL-TEID#y | TOF DL-TEID#2y | oGW#2 |
|  |  |  |  |  |
|  |  |  |  |  |

TOF Session MANAGEMENT TABLE　　　　　178b

| INTRA-oGW-ANCHOR UE IDENTIFIER | USER LINE IDENTIFIER | UE TCP Connection INFO | oGW TCP Connection INFO | Session STATE |
|---|---|---|---|---|
| 4000 | 2 | UE#x-IP-Addr. port=10000 | oGW#1-IP-Addr. port=20000 | UNDER CONNECTION |
| 4000 | 2 | UE#x-IP-Addr. port=10001 | oGW#1-IP-Addr. port=20010 | WAITING FOR UL DISCONNECT CONFIRMATION |
| 4000 | 2 | UE#x-IP-Addr. port=10002 | oGW#1-IP-Addr. port=20015 | WAITING FOR DL DISCONNECT CONFIRMATION |
| 4001 | 3 | UE#y-IP-Addr. port=10002 | oGW#1-IP-Addr. port=20011 | UNDER CONNECTION |
|  |  |  |  |  |
|  |  |  |  |  |
|  |  |  |  |  |

| S1AP | Message type=Initial Context Setup Request | |
| --- | --- | --- |
| | MME UE S1AP ID=MME#1 UE S1AP ID#x | |
| | eNB UE S1AP ID=eNB#1 UE S1AP ID#x | |
| | E RAB to Be Setup List | |
| | E RAB ID=1 | GTP-TEID=TEID#SGW-u1 |
| | E RAB ID=2 | GTP-TEID=TEID#SGW-u2 |
| SCTP | SCTP HEADER | |
| IP | SA:MME#1 IP Address, DA:eNB#1 IP Address | |
| L2 | L2 HEADER | |
| L1 | L1 HEADER | |

FIG. 15

| S1AP | Message type=Initial Context Setup Response | |
| --- | --- | --- |
| | MME UE S1AP ID=MME#1 UE S1AP ID#x | |
| | eNB UE S1AP ID=eNB#1 UE S1AP ID#x | |
| | E RAB to Be Setup List | |
| | E RAB ID=1 | GTP-TEID=eNB-TEID#1 |
| | E RAB ID=2 | GTP-TEID=eNB-TEID#2 |
| SCTP | SCTP HEADER | |
| IP | SA:eNB#1 IP Address, DA:MME#1 IP Address | |
| L2 | L2 HEADER | |
| L1 | L1 HEADER | |

FIG. 16

| S1AP | Message type=Handover Required |
| --- | --- |
| | MME UE S1AP ID=MME#1 UE S1AP ID#x |
| | eNB UE S1AP ID=eNB#1 UE S1AP ID#x |
| | Target ID=eNB#2 |
| | Source To Target Transparent Container =Cell ID#x |
| SCTP | SCTP HEADER |
| IP | SA:eNB#1 IP Address, DA:MME#1 IP Address |
| L2 | L2 HEADER |
| L1 | L1 HEADER |

FIG. 17

| S1AP | Message type=Handover Request | |
| --- | --- | --- |
| | MME UE S1AP ID=MME#2 UE S1AP ID#x | |
| | E RAB to Be Setup List | |
| | E RAB ID=1 | GTP-TEID=TEID#SGW-u21 |
| | E RAB ID=2 | GTP-TEID=TEID#SGW-u22 |
| | Source To Target Transparent Container =Cell ID#x | |
| SCTP | SCTP HEADER | |
| IP | SA:MME#2 IP Address, DA:eNB#2 IP Address | |
| L2 | L2 HEADER | |
| L1 | L1 HEADER | |

FIG. 18

| S1AP | Message type=Handover Request Ack. |  |
|---|---|---|
| | MME UE S1AP ID=MME#2 UE S1AP ID#x |  |
| | eNB UE S1AP ID=eNB#2 UE S1AP ID#x |  |
| | E RAB to Be Setup List |  |
| | E RAB ID=1 | GTP-TEID=eNB-TEID#21 |
| | E RAB ID=2 | GTP-TEID=eNB-TEID#22 |
| | Target To Source Transparent Container =C-RNTI#x |  |
| SCTP | SCTP HEADER |  |
| IP | SA:eNB#2 IP Address, DA:MME#2 IP Address |  |
| L2 | L2 HEADER |  |
| L1 | L1 HEADER |  |

FIG. 19

| S1AP | Message type=Handover Command |
|---|---|
| | MME UE S1AP ID=MME#1 UE S1AP ID#x |
| | eNB UE S1AP ID=eNB#1 UE S1AP ID#x |
| | Target To Source Transparent Container =C-RNTI#x |
| SCTP | SCTP HEADER |
| IP | SA:MME#1 IP Address, DA:eNB#1 IP Address |
| L2 | L2 HEADER |
| L1 | L1 HEADER |

FIG. 20

| S1AP | Message type=UE Context Release Command |
| --- | --- |
| | MME UE S1AP ID=MME#1 UE S1AP ID#x |
| | eNB UE S1AP ID=eNB#1 UE S1AP ID#x |
| SCTP | SCTP HEADER |
| IP | SA:MME#1 IP Address, DA:eNB#1 IP Address |
| L2 | L2 HEADER |
| L1 | L1 HEADER |

FIG. 21

| X2AP | Message type=Handover Request | |
| --- | --- | --- |
| | Old eNB UE X2AP ID=eNB#1 UE X2AP ID#x | |
| | GUMMEI=MME#1 | |
| | UE Context Information | |
| | MME UE S1AP ID=MME#1 UE S1AP ID#x | |
| | E RAB to Be Setup List | |
| | E RAB ID=1 | UL GTP Tunnel Endpoint=TEID#SGW-u1 |
| | E RAB ID=2 | UL GTP Tunnel Endpoint=TEID#SGW-u2 |
| SCTP | SCTP HEADER | |
| IP | SA:eNB#1 IP Address, DA:eNB#2 IP Address | |
| L2 | L2 HEADER | |
| L1 | L1 HEADER | |

FIG. 22

| X2AP | Message type=Handover Request Ack. |
|---|---|
| | Old eNB UE X2AP ID=eNB#1 UE X2AP ID#x |
| | New eNB UE X2AP ID=eNB#1 UE X2AP ID#x |
| SCTP | SCTP HEADER |
| IP | SA:eNB#1 IP Address, DA:eNB#2 IP Address |
| L2 | L2 HEADER |
| L1 | L1 HEADER |

FIG. 23

| X2AP | Message type=UE Context Release |
|---|---|
| | Old eNB UE S1AP ID=eNB#1 UE X2AP ID#x |
| | New eNB UE X2AP ID=eNB#1 UE X2AP ID#x |
| SCTP | SCTP HEADER |
| IP | SA:eNB#2 IP Address, DA:eNB#1 IP Address |
| L2 | L2 HEADER |
| L1 | L1 HEADER |

FIG. 24

| S1AP | Message type=Path Switch Request |  |
|---|---|---|
|  | Source MME UE S1AP ID=MME#1 UE S1AP ID#x |  |
|  | eNB UE S1AP ID=eNB#2 UE S1AP ID#x |  |
|  | E RAB to Be Switched in Downlink List |  |
|  | E RAB ID=1 | GTP-TEID=eNB-TEID#21 |
|  | E RAB ID=2 | GTP-TEID=eNB-TEID#22 |
| SCTP | SCTP HEADER |  |
| IP | SA:eNB#2 IP Address, DA:MME#1 IP Address |  |
| L2 | L2 HEADER |  |
| L1 | L1 HEADER |  |

FIG. 25

| S1AP | Message type=Path Switch Request Ack. |  |
|---|---|---|
|  | MME UE S1AP ID=MME#1 UE S1AP ID#x |  |
|  | eNB UE S1AP ID=eNB#2 UE S1AP ID#x |  |
|  | Target ID=eNB#2 |  |
|  | E RAB to Be Switched in Uplink List |  |
|  | E RAB ID=1 | GTP-TEID=TEID#SGW-u21 |
|  | E RAB ID=2 | GTP-TEID=TEID#SGW-u22 |
| SCTP | SCTP HEADER |  |
| IP | SA:MME#1 IP Address, DA:eNB#2 IP Address |  |
| L2 | L2 HEADER |  |
| L1 | L1 HEADER |  |

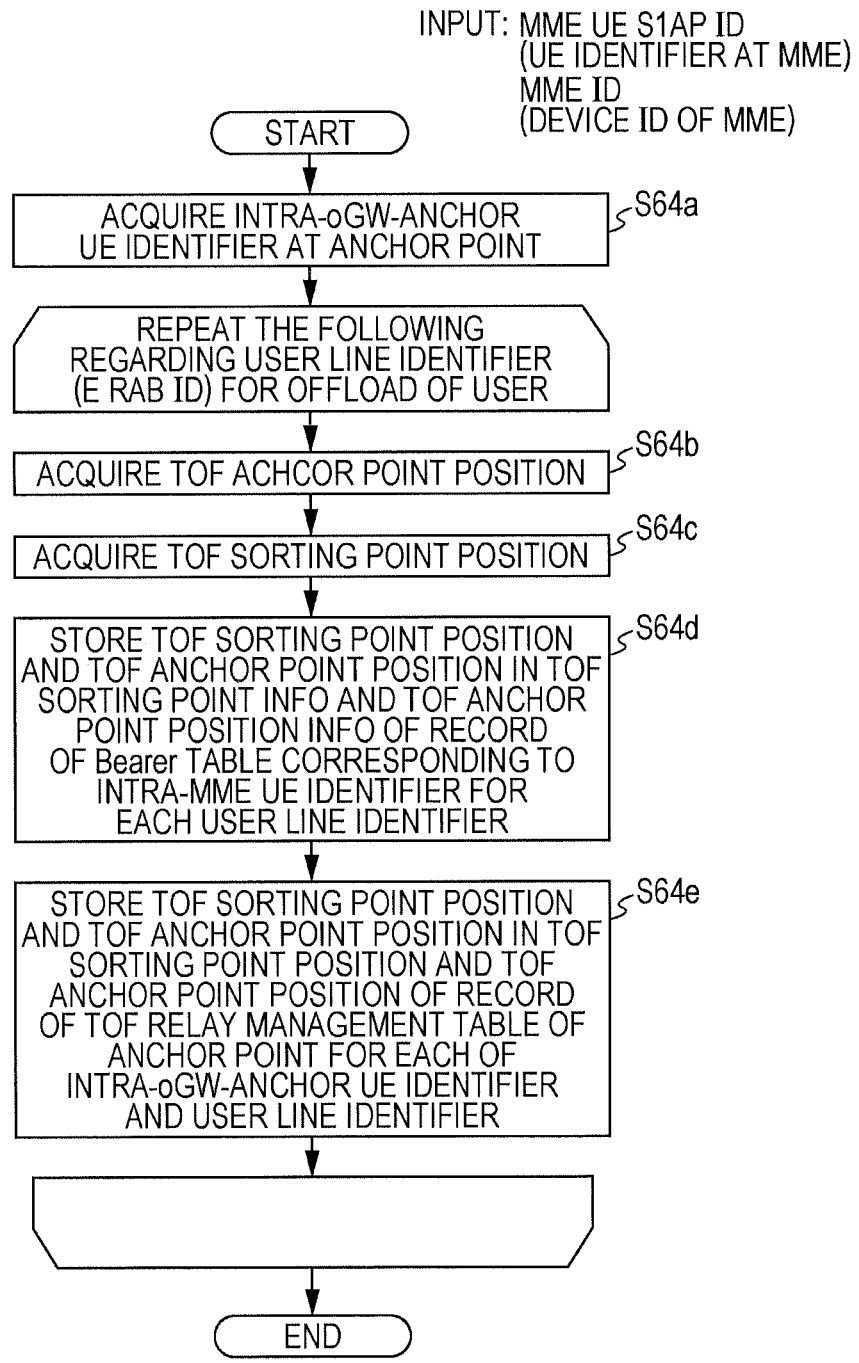

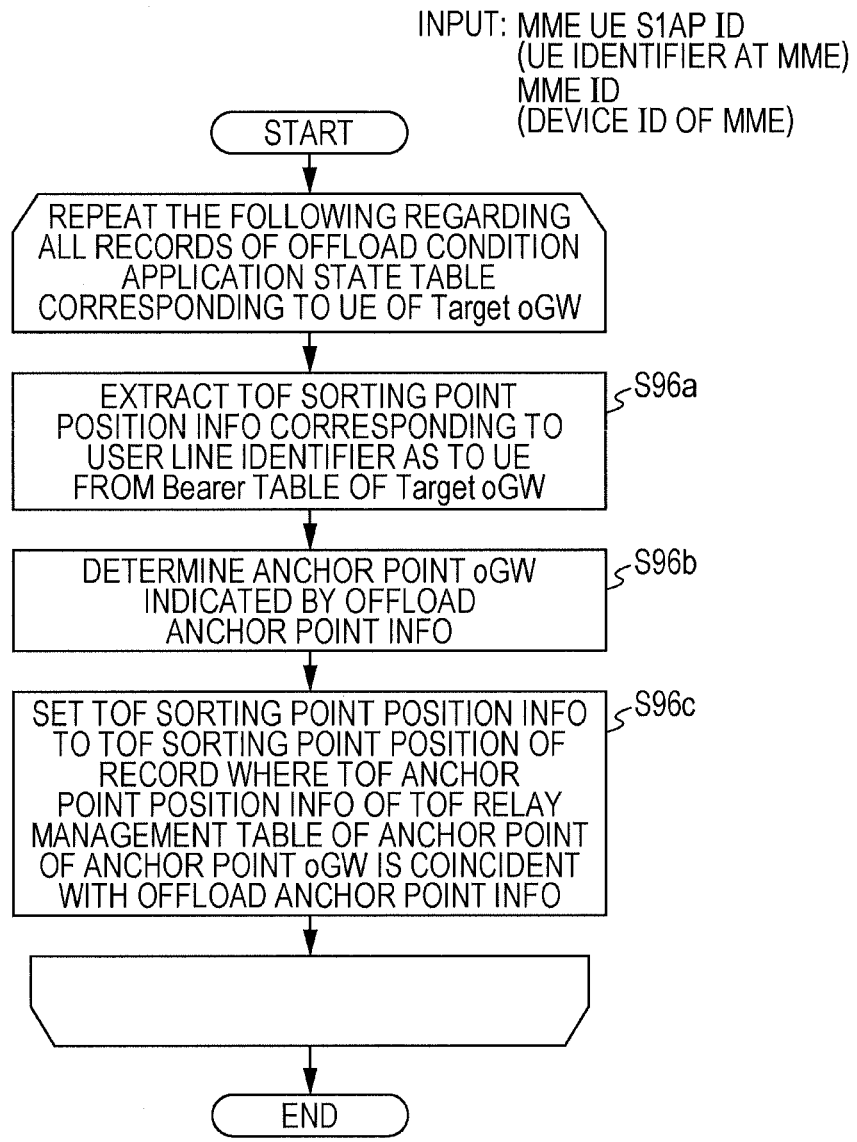

FIG. 41

Bearer USER DETERMINATION TABLE — 175a / 175A

| INTRA-oGW UE IDENTIFIER | INTRA-MME UE IDENTIFIER | MME DEVICE IDENTIFIER | INTRA-eNB UE IDENTIFIER (S1AP) | INTRA-eNB UE IDENTIFIER (X2AP) | eNB DEVICE IDENTIFIER |
|---|---|---|---|---|---|
| 8000 | MME#1 UE S1AP ID#x | MME#1 | eNB UE S1AP ID#x | | eNB#1 |
| | | | | | |

Bearer USER DETERMINATION TABLE — 175b

| INTRA-oGW UE IDENTIFIER | INTRA-T-Target CELL ID INFO T-Target Cell ID inf | INTRA-T-Target-CELL UE ID INFO T-C-RNTI inf | S-Target CELL ID INFO S-Target Cell ID inf | INTRA-S-Target-CELL UE ID INFO S-C-RNTI inf |
|---|---|---|---|---|
| 8000 | | | | |
| | | | | |

Bearer TABLE — 175B

| INTRA-oGW UE IDENTIFIER | USER LINE IDENTIFIER | uplink LINE ASSIGNMENT INFO | | downlink LINE ASSIGNMENT INFO | | TOF SORTING POINT POSITION INFO | TOF ANCHOR POINT POSITION INFO |
|---|---|---|---|---|---|---|---|
| 8000 | 1 | TEID#SGW-u1 | SGW#1 | eNB-TEID#1 | eNB#1 | (OFFLOAD NOT APPLICABLE) | |
| 8000 | 2 | TEID#SGW-u2 | SGW#1 | eNB-TEID#2 | eNB#1 | TOF DL-TEID#1 | TOF UL-TEID#1 oGW#1 |
| | | | | | | | |

FIG. 42

TOF RELAY MANAGEMENT TABLE    178a

| INTRA-oGW-ANCHOR UE IDENTIFIER | USER LINE IDENTIFIER | TOF ANCHOR POINT POSITION | TOF SORTING POINT POSITION | |
|---|---|---|---|---|
| 4000 | 2 | TOF UL-TEID#1 | TOF DL-TEID#1 | oGW#1 |
| | | | | |
| | | | | |
| | | | | |

TOF Session MANAGEMENT TABLE    178b

| INTRA-oGW-ANCHOR UE IDENTIFIER | USER LINE IDENTIFIER | UE TCP Connection INFO | oGW TCP Connection INFO | Session STATE |
|---|---|---|---|---|
| | | | | |
| | | | | |
| | | | | |
| 4000 | 2 | UE#x-IP-Addr. port = 10005 | oGW#1-IP-Addr. port = 20021 | UNDER CONNECTION |
| | | | | |
| | | | | |
| | | | | |

FIG. 43

| INTRA-oGW UE IDENTIFIER | USER LINE IDENTIFIER (E RAB ID) | TCP Connection INFO | OFFLOAD ANCHOR POINT INFO |
|---|---|---|---|
|  |  |  | 176A |
| 8000 | 2 | UE#x-IP-Addr. port#10005 | TOF UL-TEID#1, oGW#1 |
|  |  |  |  |
|  |  |  |  |

FIG. 45

Source oGW (= oGW#1)
Bearer USER DETERMINATION TABLE — 175a

| INTRA-oGW UE IDENTIFIER | INTRA-MME UE IDENTIFIER | MME DEVICE IDENTIFIER | INTRA-eNB UE IDENTIFIER (S1AP) | INTRA-eNB UE IDENTIFIER (X2AP) | eNB DEVICE IDENTIFIER |
|---|---|---|---|---|---|
| 8000 | MME#1 UE S1AP ID#x | MME#1 | eNB UE S1AP ID#x | | eNB#1 |
| | | | | | |
| | | | | | |

SETTING ACCORDING TO Handover Required INTERCEPTION
SETTING ACCORDING TO Handover Command INTERCEPTION Bearer USER DETERMINATION TABLE — 175b

| INTRA-oGW UE IDENTIFIER | T-Target Cell ID inf | T-C-RNTI inf | Target ID | S-Target Cell ID inf | S-C-RNTI inf |
|---|---|---|---|---|---|
| 8000 | | | eNB#2 | Cell ID#x | C-RNTI#x |
| | | | | | |
| | | | | | |

} 175A

Bearer TABLE — 175B

| INTRA-oGW UE IDENTIFIER | USER LINE IDENTIFIER | uplink LINE ASSIGNMENT INFO | downlink LINE ASSIGNMENT INFO | TOF SORTING POINT POSITION INFO | TOF ANCHOR POINT POSITION INFO |
|---|---|---|---|---|---|
| 8000 | 1 | TEID#SGW-u1 SGW#1 | eNB-TEID#1 eNB#1 | (OFFLOAD NOT APPLICABLE) | |
| 8000 | 2 | TEID#SGW-u2 SGW#1 | eNB-TEID#2 eNB#1 | TOF DL-TEID#1 | TOF UL-TEID#1 oGW#1 |
| | | | | | |
| | | | | | |

Target oGW (= oGW#2)
Bearer USER DETERMINATION TABLE — 175a'

| INTRA-oGW UE IDENTIFIER | INTRA-MME UE IDENTIFIER | MME DEVICE IDENTIFIER | INTRA-eNB UE IDENTIFIER (S1AP) | INTRA-eNB UE IDENTIFIER (X2AP) | eNB DEVICE IDENTIFIER |
|---|---|---|---|---|---|
| | | | | | |
| 8102 | MME#2 UE S1AP ID#x | MME#2 | eNB#2 UE S1AP ID#x | | eNB#2 |
| | | | | | |

Bearer USER DETERMINATION TABLE — 175b'

| INTRA-oGW UE IDENTIFIER | T-Target Cell ID inf | T-C-RNTI inf | Target ID | S-Target Cell ID inf | S-C-RNTI inf |
|---|---|---|---|---|---|
| | | | | | |
| 8102 | Cell ID#x | C-RNTI#x | | | |
| | | | | | |

} 175A'

SETTING ACCORDING TO Handover Request INTERCEPTION
SETTING ACCORDING TO Handover Request Ack. INTERCEPTION Bearer TABLE — 175B'

| INTRA-oGW UE IDENTIFIER | USER LINE IDENTIFIER | uplink LINE ASSIGNMENT INFO | downlink LINE ASSIGNMENT INFO | TOF SORTING POINT POSITION INFO | TOF ANCHOR POINT POSITION INFO |
|---|---|---|---|---|---|
| | | | | | |
| 8102 | 1 | TEID#SGW-u21 SGW#2 | eNB-TEID#21 eNB#2 | (OFFLOAD NOT APPLICABLE) | |
| 8102 | 2 | TEID#SGW-u22 SGW#2 | eNB-TEID#22 eNB#2 | TOF DL-TEID#2 | TOF UL-TEID#2 oGW#2 |

FIG. 46

Source oGW (=oGW#1)
TOF RELAY MANAGEMENT TABLE — 178a

| INTRA-oGW-ANCHOR UE IDENTIFIER | USER LINE IDENTIFIER | TOF ANCHOR POINT POSITION | TOF SORTING POINT POSITION | |
|---|---|---|---|---|
| 4000 | 2 | TOF UL-TEID#1 | TOF DL-TEID#1 | oGW#1 |
|  |  |  | ↓ | ↓ |
|  |  |  | TOF DL-TEID#2 | oGW#2 |
|  |  |  |  |  |
|  |  |  |  |  |

TOF Session MANAGEMENT TABLE — 178b

| INTRA-oGW-ANCHOR UE IDENTIFIER | USER LINE IDENTIFIER | UE TCP Connection INFO | oGW TCP Connection IONFO | Session STATE |
|---|---|---|---|---|
|  |  |  |  |  |
|  |  |  |  |  |
| 4000 | 2 | UE#x-IP-Addr. port = 10005 | oGW#1-IP-Addr. port = 20021 | UNDER CONNECTION |
|  |  |  |  |  |
|  |  |  |  |  |
|  |  |  |  |  |
|  |  |  |  |  |

Target oGW (=oGW#2)
TOF RELAY MANAGEMENT TABLE — 178a'

| INTRA-oGW-ANCHOR UE IDENTIFIER | USER LINE IDENTIFIER | TOF ANCHOR POINT POSITION | TOF SORTING POINT POSITION | |
|---|---|---|---|---|
|  |  |  |  |  |
| 4102 | 2 | TOF UL-TEID#2 | TOF DL-TEID#2 | oGW#2 |
|  |  |  |  |  |
|  |  |  |  |  |
|  |  |  |  |  |

TOF Session MANAGEMENT TABLE — 178b'

| INTRA-oGW-ANCHOR UE IDENTIFIER | USER LINE IDENTIFIER | UE TCP Connection INFO | oGW TCP Connection INFO | Session STATE |
|---|---|---|---|---|
|  |  |  |  |  |
|  |  |  |  |  |
|  |  |  |  |  |
|  |  |  |  |  |
|  |  |  |  |  |
|  |  |  |  |  |

FIG. 47

Source oGW (=oGW#1)
OFFLOAD CONDITION APPLICATION STATE TABLE          176A

| INTRA-oGW UE IDENTIFIER | USER LINE IDENTIFIER (E RAB ID) | TCP Connection INFO | OFFLOAD ANCHOR POINT INFO |
|---|---|---|---|
|  |  |  |  |
| 8000 | 2 | UE#x-IP-Addr. port#10005 | TOF UL-TEID#1, oGW#1 |
|  |  |  |  |
|  |  |  |  |

Target oGW (=oGW#2)
OFFLOAD CONDITION APPLICATION
STATE TABLE          176A'

| INTRA-oGW UE IDENTIFIER | USER LINE IDENTIFIER (E RAB ID) | TCP Connection INFO | OFFLOAD ANCHOR POINT INFO |
|---|---|---|---|
|  |  |  |  |
| 8102 | 2 | UE#x-IP-Addr. port#10005 | TOF UL-TEID#1, oGW#1 |
|  |  |  |  |
|  |  |  |  |

FIG. 49

Source oGW (= oGW#1)
Bearer USER DETERMINATION TABLE

| INTRA-oGW UE IDENTIFIER | INTRA-MME UE IDENTIFIER | MME DEVICE IDENTIFIER | INTRA-eNB UE IDENTIFIER (S1AP) | INTRA-eNB UE IDENTIFIER (X2AP) | eNB DEVICE IDENTIFIER |
|---|---|---|---|---|---|
|  |  |  |  |  |  |
|  |  |  |  |  |  |
|  |  |  |  |  |  |

Bearer USER DETERMINATION TABLE

| INTRA-oGW UE IDENTIFIER | T-Target Cell ID inf | T-C-RNTI inf | Target ID | S-Target Cell ID inf | S-C-RNTI inf |
|---|---|---|---|---|---|
|  |  |  |  |  |  |
|  |  |  |  |  |  |
|  |  |  |  |  |  |

} 175A

Bearer TABLE

| INTRA-oGW UE IDENTIFIER | USER LINE IDENTIFIER | uplink LINE ASSIGNMENT INFO | downlink LINE ASSIGNMENT INFO | TOF SORTING POINT POSITION INFO | TOF ANCHOR POINT POSITION INFO |
|---|---|---|---|---|---|
|  |  |  |  |  |  |
|  |  |  |  |  |  |
|  |  |  |  |  |  |
|  |  |  |  |  |  |

} 175B

Target oGW (= oGW#2)
Bearer USER DETERMINATION TABLE

| INTRA-oGW UE IDENTIFIER | INTRA-MME UE IDENTIFIER | MME DEVICE IDENTIFIER | INTRA-eNB UE IDENTIFIER (S1AP) | INTRA-eNB UE IDENTIFIER (X2AP) | eNB DEVICE IDENTIFIER |
|---|---|---|---|---|---|
|  |  |  |  |  |  |
| 8102 | MME#1 UE S1AP ID#x | MME#1 | eNB#2 UE S1AP ID#x |  | eNB#2 |
|  |  |  |  |  |  |

Bearer USER DETERMINATION TABLE

| INTRA-oGW UE IDENTIFIER | T-Target Cell ID inf | T-C-RNTI inf | Target ID | S-Target Cell ID inf | S-C-RNTI inf |
|---|---|---|---|---|---|
|  |  |  |  |  |  |
| 8102 |  |  |  |  |  |
|  |  |  |  |  |  |

} 175A'

Bearer TABLE

| INTRA-oGW UE IDENTIFIER | USER LINE IDENTIFIER | uplink LINE ASSIGNMENT INFO | downlink LINE ASSIGNMENT INFO | TOF SORTING POINT POSITION INFO | TOF ANCHOR POINT POSITION INFO |
|---|---|---|---|---|---|
|  |  |  |  |  |  |
|  |  |  |  |  |  |
| 8102 | 1 | TEID#SGW-u21 SGW#2 | eNB-TEID#21 eNB#2 | (OFFLOAD NOT APPLICABLE) |  |
| 8102 | 2 | TEID#SGW-u22 SGW#2 | eNB-TEID#22 eNB#2 | TOF DL-TEID#2 | TOF UL-TEID#2 oGW#2 |
|  |  |  |  |  |  |

Source oGW (=oGW#1)
OFFLOAD CONDITION APPLICATION STATE TABLE 176A

| INTRA-oGW UE IDENTIFIER | USER LINE IDENTIFIER (E RAB ID) | TCP Connection INFO | OFFLOAD ANCHOR POINT INFO |
|---|---|---|---|
|  |  |  |  |
|  |  |  |  |
|  |  |  |  |

Target oGW (=oGW#2)
OFFLOAD CONDITION APPLICATION STATE TABLE 176A'

| INTRA-oGW UE IDENTIFIER | USER LINE IDENTIFIER (E RAB ID) | TCP Connection INFO | OFFLOAD ANCHOR POINT INFO |
|---|---|---|---|
|  |  |  |  |
| 8102 | 2 | UE#x-IP-Addr. port#10005 | TOF UL-TEID#1, oGW#1 |
|  |  |  |  |
|  |  |  |  |

FIG. 50B

Source oGW (=oGW#1)
TOF RELAY MANAGEMENT TABLE 178a

| INTRA-oGW-ANCHOR UE IDENTIFIER | USER LINE IDENTIFIER | TOF ANCHOR POINT POSITION | TOF SORTING POINT POSITION | |
|---|---|---|---|---|
| 4000 | 2 | TOF UL-TEID#1 | TOF DL-TEID#2 | oGW#2 |
| | | | | |
| | | | | |
| | | | | |
| | | | | |

TOF Session MANAGEMENT TABLE 178b

| INTRA-oGW-ANCHOR UE IDENTIFIER | USER LINE IDENTIFIER | UE TCP Connection INFO | oGW TCP Connection INFO | Session STATE |
|---|---|---|---|---|
| | | | | |
| | | | | |
| 4000 | 2 | UE#x-IP-Addr. port = 10005 | oGW#1-IP-Addr. port = 20021 | UNDER CONNECTION |
| | | | | |
| | | | | |
| | | | | |
| | | | | |

Target oGW (=oGW#2)
TOF RELAY MANAGEMENT TABLE 178a'

| INTRA-oGW-ANCHOR UE IDENTIFIER | USER LINE IDENTIFIER | TOF ANCHOR POINT POSITION | TOF SORTING POINT POSITION | |
|---|---|---|---|---|
| 4102 | 2 | TOF UL-TEID#2 | TOF UL-TEID#2 | oGW#2 |
| | | | | |
| | | | | |
| | | | | |
| | | | | |

TOF Session MANAGEMENT TABLE 178b'

| INTRA-oGW-ANCHOR UE IDENTIFIER | USER LINE IDENTIFIER | UE TCP Connection INFO | oGW TCP Connection INFO | Session STATE |
|---|---|---|---|---|
| | | | | |
| | | | | |
| | | | | |
| | | | | |
| | | | | |
| | | | | |
| | | | | |

FIG. 52

Source oGW (= oGW#1)
Bearer USER DETERMINATION TABLE

| INTRA-oGW UE IDENTIFIER | INTRA-MME UE IDENTIFIER | MME DEVICE IDENTIFIER | INTRA-eNB UE IDENTIFIER (S1AP) | INTRA-eNB UE IDENTIFIER (X2AP) | eNB DEVICE IDENTIFIER |
|---|---|---|---|---|---|
| 8000 | eNB#1 UE S1AP ID#x | MME#1 | eNB#1 UE S1AP ID#x | eNB#1 UE X2AP ID#x | eNB#1 |
| | | | | | |
| | | | | | |

Bearer USER DETERMINATION TABLE

| INTRA-oGW UE IDENTIFIER | T-Target Cell ID inf | T-C-RNTI inf | Target ID | S-Target Cell ID inf | S-C-RNTI inf |
|---|---|---|---|---|---|
| 8000 | | | | | |
| | | | | | |
| | | | | | |

Bearer TABLE

| INTRA-oGW UE IDENTIFIER | USER LINE IDENTIFIER | uplink LINE ASSIGNMENT INFO | | downlink LINE ASSIGNMENT INFO | | TOF SORTING POINT POSITION INFO | TOF ANCHOR POINT POSITION INFO | |
|---|---|---|---|---|---|---|---|---|
| 8000 | 1 | TEID#SGW-u1 | SGW#1 | eNB-TEID#1 | eNB#1 | (OFFLOAD NOT APPLICABLE) | | |
| 8000 | 2 | TEID#SGW-u2 | SGW#1 | eNB-TEID#2 | eNB#1 | TOF DL-TEID#1 | TOF UL-TEID#1 | oGW#1 |
| | | | | | | | | |
| | | | | | | | | |

} 175A

} 175B

Target oGW (= oGW#2)
Bearer USER DETERMINATION TABLE

| INTRA-oGW UE IDENTIFIER | INTRA-MME UE IDENTIFIER | MME DEVICE IDENTIFIER | INTRA-eNB UE IDENTIFIER (S1AP) | INTRA-eNB UE IDENTIFIER (X2AP) | eNB DEVICE IDENTIFIER |
|---|---|---|---|---|---|
| 8102 | MME#1 UE S1AP ID#x | MME#1 | eNB#2 UE S1AP ID#x | | eNB#2 |
| | | | | | |
| | | | | | |

Bearer USER DETERMINATION TABLE

| INTRA-oGW UE IDENTIFIER | T-Target Cell ID inf | T-C-RNTI inf | Target ID | S-Target Cell ID inf | S-C-RNTI inf |
|---|---|---|---|---|---|
| 8102 | | | | | |
| | | | | | |
| | | | | | |

Bearer TABLE

| INTRA-oGW UE IDENTIFIER | USER LINE IDENTIFIER | uplink LINE ASSIGNMENT INFO | | downlink LINE ASSIGNMENT INFO | | TOF SORTING POINT POSITION INFO | TOF ANCHOR POINT POSITION INFO | |
|---|---|---|---|---|---|---|---|---|
| | | | | | | | | |
| | | | | | | | | |
| 8102 | 1 | TEID#SGW-u21 | SGW#2 | eNB-TEID#21 | eNB#2 | (OFFLOAD NOT APPLICABLE) | | |
| 8102 | 2 | TEID#SGW-u22 | SGW#2 | eNB-TEID#22 | eNB#2 | TOF DL-TEID#2 | TOF UL-TEID#2 | oGW#2 |
| | | | | | | | | |

Source oGW (= oGW#1)
TOF RELAY MANAGEMENT TABLE — 178a

| INTRA-oGW-ANCHOR UE IDENTIFIER | USER LINE IDENTIFIER | TOF ANCHOR POINT POSITION | TOF SORTING POINT POSITION | |
|---|---|---|---|---|
| 4000 | 2 | TOF UL-TEID#1 | TOF DL-TEID#1 | oGW#1 |
|  |  |  | ↓ | ↓ |
|  |  |  | TOF DL-TEID#2 | oGW#2 |
|  |  |  |  |  |
|  |  |  |  |  |

TOF Session MANAGEMENT TABLE — 178b

| INTRA-oGW-ANCHOR UE IDENTIFIER | USER LINE IDENTIFIER | UE TCP Connection INFO | oGW TCP Connection INFO | Session STATE |
|---|---|---|---|---|
|  |  |  |  |  |
|  |  |  |  |  |
| 4000 | 2 | UE#x-IP-Addr. port = 10005 | oGW#1-IP-Addr. port = 20021 | UNDER CONNECTION |
|  |  |  |  |  |
|  |  |  |  |  |
|  |  |  |  |  |
|  |  |  |  |  |

Target oGW (= oGW#2)
TOF RELAY MANAGEMENT TABLE — 178a'

| INTRA-oGW-ANCHOR UE IDENTIFIER | USER LINE IDENTIFIER | TOF ANCHOR POINT POSITION | TOF SORTING POINT POSITION | |
|---|---|---|---|---|
|  |  |  |  |  |
| 4102 | 2 | TOF UL-TEID#2 | TOF DL-TEID#2 | oGW#2 |
|  |  |  |  |  |
|  |  |  |  |  |
|  |  |  |  |  |

TOF Session MANAGEMENT TABLE — 178b'

| INTRA-oGW-ANCHOR UE IDENTIFIER | USER LINE IDENTIFIER | UE TCP Connection INFO | oGW TCP Connection INFO | Session STATE |
|---|---|---|---|---|
|  |  |  |  |  |
|  |  |  |  |  |
|  |  |  |  |  |
|  |  |  |  |  |
|  |  |  |  |  |
|  |  |  |  |  |
|  |  |  |  |  |

FIG. 54

Source oGW (=oGW#1)
OFFLOAD CONDITION APPLICATION STATE TABLE  176A

| INTRA-oGW UE IDENTIFIER | USER LINE IDENTIFIER (E RAB ID) | TCP Connection INFO | OFFLOAD ANCHOR POINT INFO |
|---|---|---|---|
|  |  |  |  |
| 8000 | 2 | UE#x-IP-Addr. port#10005 | TOF UL-TEID#1, oGW#1 |
|  |  |  |  |
|  |  |  |  |

Target oGW (=oGW#2)
OFFLOAD CONDITION APPLICATION
STATE TABLE  176A'

| INTRA-oGW UE IDENTIFIER | USER LINE IDENTIFIER (E RAB ID) | TCP Connection INFO | OFFLOAD ANCHOR POINT INFO |
|---|---|---|---|
|  |  |  |  |
| 8102 | 2 | UE#x-IP-Addr. port#10005 | TOF UL-TEID#1, oGW#1 |
|  |  |  |  |
|  |  |  |  |

FIG. 56

Source oGW (=oGW#1)
OFFLOAD CONDITION APPLICATION STATE TABLE  176A

| INTRA-oGW UE IDENTIFIER | USER LINE IDENTIFIER (E RAB ID) | TCP Connection INFO | OFFLOAD ANCHOR POINT INFO |
|---|---|---|---|
| | | | |
| | | | |
| | | | |
| | | | |

Target oGW (=oGW#2)
OFFLOAD CONDITION APPLICATION STATE TABLE  176A'

| INTRA-oGW UE IDENTIFIER | USER LINE IDENTIFIER (E RAB ID) | TCP Connection INFO | OFFLOAD ANCHOR POINT INFO |
|---|---|---|---|
| | | | |
| 8102 | 2 | UE#x-IP-Addr. port#10005 | TOF UL-TEID#1, oGW#1 |
| 8102 | 2 | UE#x-IP-Addr. port#10010 | TOF UL-TEID#2, oGW#2 |
| | | | |

FIG. 57

Source oGW (= oGW#1)
TOF RELAY MANAGEMENT TABLE    178a

| INTRA-oGW-ANCHOR UE IDENTIFIER | USER LINE IDENTIFIER | TOF ANCHOR POINT POSITION | TOF SORTING POINT POSITION | |
|---|---|---|---|---|
| 4000 | 2 | TOF UL-TEID#1 | TOF DL-TEID#2 | oGW#2 |
| | | | | |
| | | | | |
| | | | | |

TOF Session MANAGEMENT TABLE    178b

| INTRA-oGW-ANCHOR UE IDENTIFIER | USER LINE IDENTIFIER | UE TCP Connection INFO | oGW TCP Connection INFO | Session STATE |
|---|---|---|---|---|
| | | | | |
| | | | | |
| 4000 | 2 | UE#x-IP-Addr. port = 10005 | oGW#1-IP-Addr. port = 20021 | UNDER CONNECTION |
| | | | | |
| | | | | |
| | | | | |

Target oGW (= oGW#2)
TOF RELAY MANAGEMENT TABLE    178a'

| INTRA-oGW-ANCHOR UE IDENTIFIER | USER LINE IDENTIFIER | TOF ANCHOR POINT POSITION | TOF SORTING POINT POSITION | |
|---|---|---|---|---|
| 4102 | 2 | TOF UL-TEID#2 | TOF DL-TEID#2 | oGW#2 |
| | | | | |
| | | | | |
| | | | | |

TOF Session MANAGEMENT TABLE    178b'

| INTRA-oGW-ANCHOR UE IDENTIFIER | USER LINE IDENTIFIER | UE TCP Connection INFO | oGW TCP Connection INFO | Session STATE |
|---|---|---|---|---|
| | | | | |
| | | | | |
| 4102 | 2 | UE#x-IP-Addr. port = 10010 | oGW#2-IP-Addr. port = 20016 | UNDER CONNECTION |
| | | | | |
| | | | | |
| | | | | |

FIG. 58B

Source oGW (= oGW#1)
Bearer USER DETERMINATION TABLE

| INTRA-oGW UE IDENTIFIER | INTRA-MME UE IDENTIFIER | MME DEVICE IDENTIFIER | INTRA-eNB UE IDENTIFIER (S1AP) | INTRA-eNB UE IDENTIFIER (X2AP) | eNB DEVICE IDENTIFIER |
|---|---|---|---|---|---|
| | | | | | |
| | | | | | |
| | | | | | |
| | | | | | |

Bearer USER DETERMINATION TABLE

| INTRA-oGW UE IDENTIFIER | T-Target Cell ID inf | T-C-RNTI inf | Target ID | S-Target Cell ID inf | S-C-RNTI inf |
|---|---|---|---|---|---|
| | | | | | |
| | | | | | |
| | | | | | |
| | | | | | |

Bearer TABLE

| INTRA-oGW UE IDENTIFIER | USER LINE IDENTIFIER | uplink LINE ASSIGNMENT INFO | downlink LINE ASSIGNMENT INFO | TOF SORTING POINT POSITION INFO | TOF ANCHOR POINT POSITION INFO |
|---|---|---|---|---|---|
| | | | | | |
| | | | | | |
| | | | | | |
| | | | | | |
| | | | | | |

Target oGW (= oGW#2)
Bearer USER DETERMINATION TABLE

| INTRA-oGW UE IDENTIFIER | INTRA-MME UE IDENTIFIER | MME DEVICE IDENTIFIER | INTRA-eNB UE IDENTIFIER (S1AP) | INTRA-eNB UE IDENTIFIER (X2AP) | eNB DEVICE IDENTIFIER |
|---|---|---|---|---|---|
| | | | | | |
| 8102 | MME#1 UE S1AP ID#x | MME#1 | eNB#2 UE S1AP ID#x | | eNB#2 |
| | | | | | |

Bearer USER DETERMINATION TABLE

| INTRA-oGW UE IDENTIFIER | T-Target Cell ID inf | T-C-RNTI inf | Target ID | S-Target Cell ID inf | S-C-RNTI inf |
|---|---|---|---|---|---|
| | | | | | |
| 8102 | | | | | |
| | | | | | |
| | | | | | |

Bearer TABLE

| INTRA-oGW UE IDENTIFIER | USER LINE IDENTIFIER | uplink LINE ASSIGNMENT INFO | downlink LINE ASSIGNMENT INFO | TOF SORTING POINT POSITION INFO | TOF ANCHOR POINT POSITION INFO |
|---|---|---|---|---|---|
| | | | | | |
| 8102 | 1 | TEID#SGW-u21 | SGW#2 | eNB-TEID#21 | eNB#2 | (OFFLOAD NOT APPLICABLE) | |
| 8102 | 2 | TEID#SGW-u22 | SGW#2 | eNB-TEID#22 | eNB#2 | TOF DL-TEID#2 | TOF UL-TEID#2 | oGW#2 |
| | | | | | |

FIG. 59

Source oGW (=oGW#1)
OFFLOAD CONDITION APPLICATION STATE TABLE 176A

| INTRA-oGW UE IDENTIFIER | USER LINE IDENTIFIER (E RAB ID) | TCP Connection INFO | OFFLOAD ANCHOR POINT INFO |
|---|---|---|---|
|  |  |  |  |
|  |  |  |  |
|  |  |  |  |
|  |  |  |  |

Target oGW (=oGW#2)
OFFLOAD CONDITION APPLICATION STATE TABLE          DELETE   176A'

| INTRA-oGW UE IDENTIFIER | USER LINE IDENTIFIER (E RAB ID) | TCP Connection INFO | OFFLOAD ANCHOR POINT INFO |
|---|---|---|---|
|  |  |  |  |
| 8102 | 2 | UE#x-IP-Addr. port#10005 | TOF UL-TEID#1, oGW#1 |
| 8102 | 2 | UE#x-IP-Addr. port#10005 | TOF UL-TEID#2, oGW#2 |
|  |  |  |  |

FIG. 60

Source oGW (= oGW#1)
TOF RELAY MANAGEMENT TABLE — 178a

| INTRA-oGW-ANCHOR UE IDENTIFIER | USER LINE IDENTIFIER | TOF ANCHOR POINT POSITION | TOF SORTING POINT POSITION | |
|---|---|---|---|---|
| 4000 | 2 | TOF UL-TEID#1 | TOF DL-TEID#2 | oGW#2 ← DELETE |
| | | | | |
| | | | | |
| | | | | |
| | | | | |

TOF Session MANAGEMENT TABLE — 178b

| INTRA-oGW-ANCHOR UE IDENTIFIER | USER LINE IDENTIFIER | UE TCP Connection INFO | oGW TCP Connection INFO | Session STATE |
|---|---|---|---|---|
| | | | | |
| | | | | |
| 4000 | 2 | UE#x-IP-Addr. port = 10005 | oGW#1-IP-Addr. port = 20021 | UNDER DL DISCONNECT CHECK |
| | | | | |
| | | | | |
| | | | | |

Target oGW (= oGW#2)
TOF RELAY MANAGEMENT TABLE — 178a'

| INTRA-oGW-ANCHOR UE IDENTIFIER | USER LINE IDENTIFIER | TOF ANCHOR POINT POSITION | TOF SORTING POINT POSITION | |
|---|---|---|---|---|
| | | | | |
| 4102 | 2 | TOF UL-TEID#2 | TOF DL-TEID#2 | oGW#2 |
| | | | | |
| | | | | |
| | | | | |

TOF Session MANAGEMENT TABLE — 178b'

| INTRA-oGW-ANCHOR UE IDENTIFIER | USER LINE IDENTIFIER | UE TCP Connection INFO | oGW TCP Connection INFO | Session STATE |
|---|---|---|---|---|
| | | | | |
| | | | | |
| 4102 | 2 | UE#x-IP-Addr. port = 10010 | oGW#2-IP-Addr. port = 20016 | UNDER CONNECTION |
| | | | | |
| | | | | |
| | | | | |

FIG. 62

Source oGW (= oGW#1)
Bearer USER DETERMINATION TABLE

| INTRA-oGW UE IDENTIFIER | INTRA-MME UE IDENTIFIER | MME DEVICE IDENTIFIER | INTRA-eNB UE IDENTIFIER (S1AP) | INTRA-eNB UE IDENTIFIER (X2AP) | eNB DEVICE IDENTIFIER |
|---|---|---|---|---|---|
| 8000 | eNB#1 UE X2AP ID#x | MME#1 | eNB UE S1AP ID#x | eNB#1 UE X2AP ID#x | eNB#1 |
|  |  |  |  |  |  |
|  |  |  |  |  |  |
|  |  |  |  |  |  |

Bearer USER DETERMINATION TABLE

| INTRA-oGW UE IDENTIFIER | T-Target Cell ID inf | T-C-RNTI inf | Target ID | S-Target Cell ID inf | S-C-RNTI inf |
|---|---|---|---|---|---|
|  |  |  |  |  |  |
|  |  |  |  |  |  |
|  |  |  |  |  |  |
|  |  |  |  |  |  |

}175A

Bearer TABLE

| INTRA-oGW UE IDENTIFIER | USER LINE IDENTIFIER | uplink LINE ASSIGNMENT INFO | downlink LINE ASSIGNMENT INFO | TOF SORTING POINT POSITION INFO | TOF ANCHOR POINT POSITION INFO |
|---|---|---|---|---|---|
|  |  |  |  |  |  |
|  |  |  |  |  |  |
|  |  |  |  |  |  |
|  |  |  |  |  |  |
|  |  |  |  |  |  |

}175B

Target oGW (= oGW#2)
Bearer USER DETERMINATION TABLE

| INTRA-oGW UE IDENTIFIER | INTRA-MME UE IDENTIFIER | MME DEVICE IDENTIFIER | INTRA-eNB UE IDENTIFIER (S1AP) | INTRA-eNB UE IDENTIFIER (X2AP) | eNB DEVICE IDENTIFIER |
|---|---|---|---|---|---|
| 8102 | MME#1 UE S1AP ID#x | MME#1 | eNB#2 UE S1AP ID#x |  | eNB#2 |
|  |  |  |  |  |  |
|  |  |  |  |  |  |

Bearer USER DETERMINATION TABLE

| INTRA-oGW UE IDENTIFIER | T-Target Cell ID inf | T-C-RNTI inf | Target ID | S-Target Cell ID inf | S-C-RNTI inf |
|---|---|---|---|---|---|
|  |  |  |  |  |  |
| 8102 |  |  |  |  |  |
|  |  |  |  |  |  |

}175A'

Bearer TABLE

| INTRA-oGW UE IDENTIFIER | USER LINE IDENTIFIER | uplink LINE ASSIGNMENT INFO | downlink LINE ASSIGNMENT INFO | TOF SORTING POINT POSITION INFO | TOF ANCHOR POINT POSITION INFO |
|---|---|---|---|---|---|
|  |  |  |  |  |  |
|  |  |  |  |  |  |
| 8102 | 1 | TEID#SGW-u21 SGW#2 | eNB-TEID#21 eNB#2 | (OFFLOAD NOT APPLICABLE) |  |
| 8102 | 2 | TEID#SGW-u22 SGW#2 | eNB-TEID#22 eNB#2 | TOF DL-TEID#2 | TOF UL-TEID#2 oGW#2 |
|  |  |  |  |  |  |

| INTRA-oGW UE IDENTIFIER | USER LINE IDENTIFIER (E RAB ID) | TCP Connection INFO | OFFLOAD ANCHOR POINT INFO 276A |
|---|---|---|---|
| 8000 | 2 | Multicast Addr#m | TOF UL-TEID#1, oGW#1 |
| 8001 | 2 | Multicast Addr#o | TOF UL-TEID#3z, oGW#3 |
| 8000 | 2 | Multicast Addr#n | TOF UL-TEID#1, oGW#1 |
| 8000 | 2 | Multicast Addr#o | TOF UL-TEID#1, oGW#1 |
| | | | |
| | | | |
| | | | |

FIG. 67

| UDP | IPTV BROADCAST CONTENTS |
|---|---|
| IP | SA: IPTV STATION IP Address, DA: Multicast Addr#m |
| GTP-u | TEID=eNB-TEID#2 (for eNB) |
| UDP_G | UDP HEADER |
| IP_G | SA: S-GW#1 IP Address, DA: eNB#1 IP Address |
| L2 | L2 HEADER |
| L1 | L1 HEADER |

FIG. 69

IGMP-join EXAMPLE

| IGMP | Type=Version 2 Membership Report |
|---|---|
| | Group Address=Multicast Addr#m |
| IP | SA:oGW IP Address, DA:Multicast Addr#m |
| L2 | L2 HEADER |
| L1 | L1 HEADER |

IGMP-leave EXAMPLE

| IGMP | Type=Leave Group |
|---|---|
| | Group Address=Multicast Addr#m |
| IP | SA:oGW IP Address, DA:224.0.0.2 |
| L2 | L2 HEADER |
| L1 | L1 HEADER |

FIG. 70

| UDP | IPTV BROADCAST CONTENTS |
|---|---|
| IP | SA: IPTV STATION IP Address, DA: Multicast Addr#m |
| L2 | L2 HEADER |
| L1 | L1 HEADER |

FIG. 71

| UDP | IPTV BROADCAST CONTENTS |
|---|---|
| IP | SA: IPTV STATION IP Address, DA: Multicast Addr#m |
| GTP-u | TEID=TOF DL-TEID#1 (for oGW SORTING POINT) |
| UDP_G | UDP HEADER |
| IP_G | SA: oGW#1 (ANCHOR) IP Address, DA: oGW#1 (SORTING) IP Address |
| L2 | L2 HEADER |
| L1 | L1 HEADER |

FIG. 72

TOF RELAY MANAGEMENT TABLE  278a

| INTRA-oGW-ANCHOR UE IDENTIFIER | USER LINE IDENTIFIER | TOF ANCHOR POINT POSITION | TOF SORTING POINT POSITION | |
|---|---|---|---|---|
| 4000 | 2 | TOF UL-TEID#1 | TOF DL-TEID#1 | oGW#1 |
| 4001 | 2 | TOF UL-TEID#y | TOF DL-TEID#2y | oGW#2 |
| | | | | |
| | | | | |
| | | | | |

TOF Session MANAGEMENT TABLE (Multicast/UDP/IPTV)  278b

| INTRA-oGW-ANCHOR UE IDENTIFIER | USER LINE IDENTIFIER | Multicast VIEWING INFO |
|---|---|---|
| 4000 | 2 | Multicast Addr#m |
| 4000 | 2 | Multicast Addr#n |
| 4000 | 2 | Multicast Addr#o |
| 4001 | 3 | Multicast Addr#n1 |
| | | |
| | | |
| | | |

178

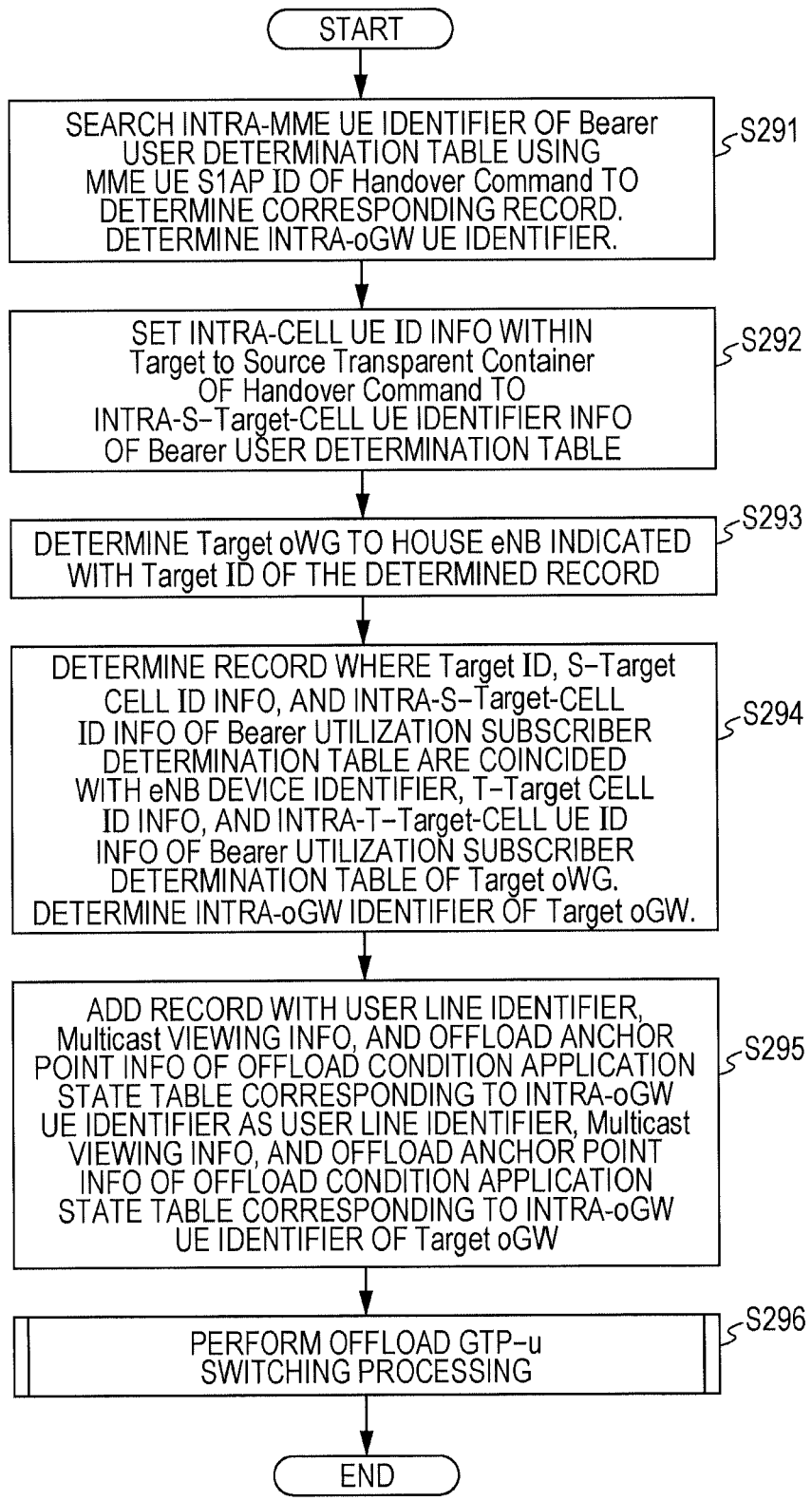

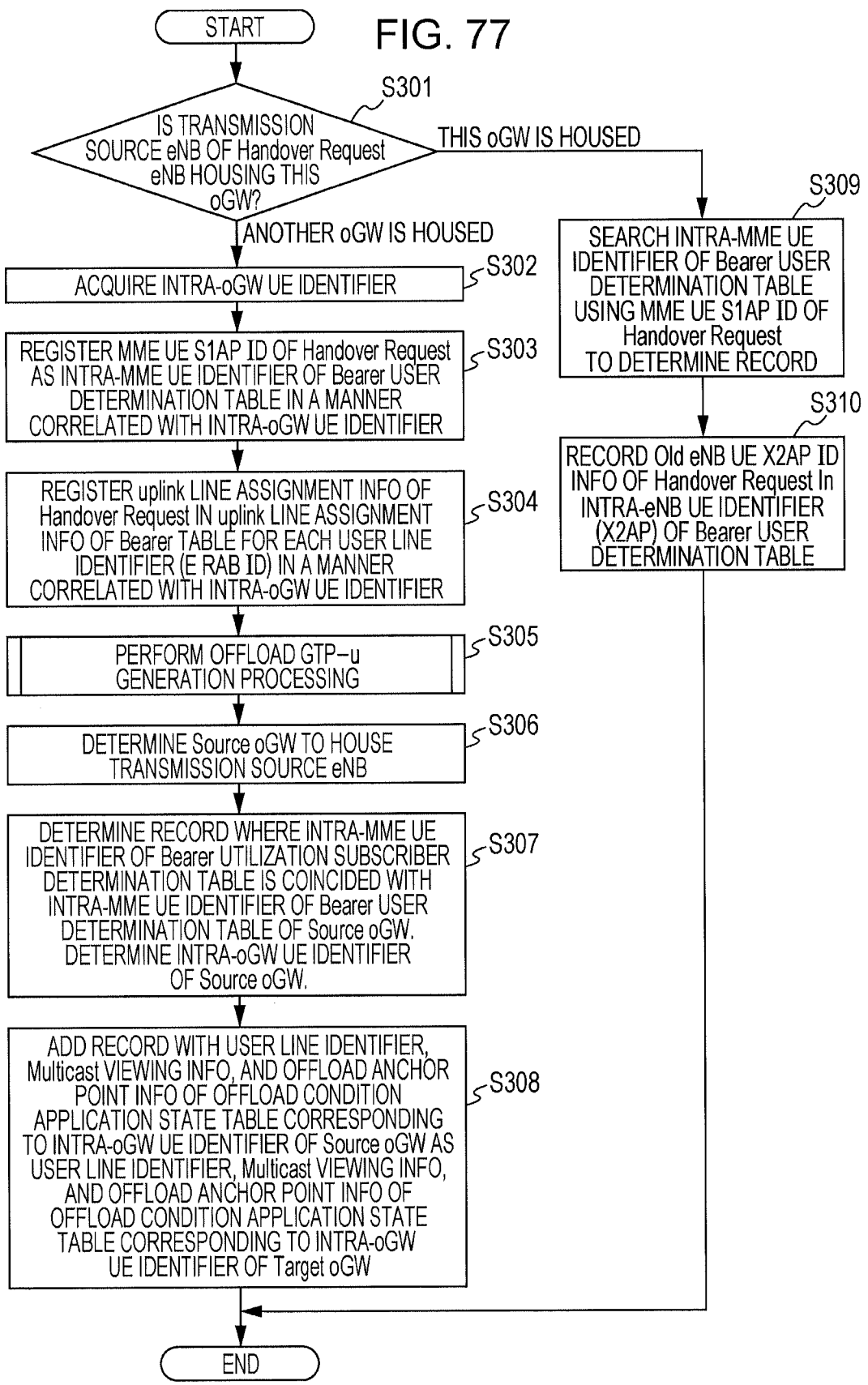

FIG. 78

Bearer USER DETERMINATION TABLE 175A

| INTRA-oGW UE IDENTIFIER | INTRA-MME UE IDENTIFIER | MME DEVICE IDENTIFIER | INTRA-eNB UE IDENTIFIER (S1AP) | INTRA-eNB UE IDENTIFIER (X2AP) | eNB DEVICE IDENTIFIER |
|---|---|---|---|---|---|
| 8000 | MME#1 UE S1AP ID#1 | MME#1 | eNB UE S1AP ID#x | | eNB#1 |
| | | | | | |
| | | | | | |

Bearer USER DETERMINATION TABLE

| INTRA-oGW UE IDENTIFIER | INTRA-T-Target-CELL UE ID INFO | | INTRA-T-Target-CELL UE ID INFO | INTRA-S-Target-CELL CELL ID INFO | | INTRA-S-Target-CELL UE ID INFO |
|---|---|---|---|---|---|---|
| | T-Target Cell ID Info | T-Target ID | T-C-RNTI inf | S-Target Cell ID inf | S-Target ID | S-C-RNTI inf |
| 8000 | | | | | | |
| | | | | | | |

Bearer TABLE 175B

| INTRA-oGW UE IDENTIFIER | USER LINE IDENTIFIER | uplink LINE ASSIGNMENT INFO | | downlink LINE ASSIGNMENT INFO | | TOF SORTING POINT POSITION INFO | TOF ANCHOR POINT POSITION INFO |
|---|---|---|---|---|---|---|---|
| 8000 | 1 | TEID#SGW-u1 | SGW#1 | eNB-TEID#1 | eNB#1 | (OFFLOAD NOT APPLICABLE) | |
| 8000 | 2 | TEID#SGW-u2 | SGW#1 | eNB-TEID#2 | eNB#1 | TOF DL-TEID#x | TOF UL-TEID#1 oGW#1 |
| | | | | | | | |

FIG. 79

| TOF RELAY MANAGEMENT TABLE | | | | 278a |
|---|---|---|---|---|
| INTRA-oGW-ANCHOR UE IDENTIFIER | USER LINE IDENTIFIER | TOF ANCHOR POINT POSITION | TOF SORTING POINT POSITION | |
| 4000 | 2 | TOF UL-TEID#1 | TOF DL-TEID#1 | oGW#1 |
| | | | | |
| | | | | |
| | | | | |

| TOF Session MANAGEMENT TABLE | | 278b |
|---|---|---|
| INTRA-oGW-ANCHOR UE IDENTIFIER | USER LINE IDENTIFIER | Multicast VIEWING INFO |
| | | |
| | | |
| | | |
| 4000 | 2 | Multicast Addr#m |
| | | |
| | | |
| | | |

FIG. 80

OFFLOAD CONDITION APPLICATION STATE TABLE          276A

| INTRA-oGW UE IDENTIFIER | USER LINE IDENTIFIER (E RAB ID) | Multicast VIEWING INFO | OFFLOAD ANCHOR POINT INFO |
|---|---|---|---|
|  |  |  |  |
| 8000 | 2 | Multicast Addr#m | TOF UL-TEID#1, oGW#1 |
|  |  |  |  |
|  |  |  |  |

FIG. 82

Source oGW (= oGW#1)
Bearer USER DETERMINATION TABLE — 175a

| INTRA-oGW UE IDENTIFIER | INTRA-MME UE IDENTIFIER | MME DEVICE IDENTIFIER | INTRA-eNB UE IDENTIFIER (S1AP) | INTRA-eNB UE IDENTIFIER (X2AP) | eNB DEVICE IDENTIFIER |
|---|---|---|---|---|---|
| 8000 | MME#1 UE S2AP ID#x | MME#1 | eNB UE S1AP ID#x | | eNB#1 |
| | | | | | |
| | | | | | |

SETTING ACCORDING TO Handover Required INTERCEPTION
SETTING ACCORDING TO Handover Command INTERCEPTION
} 175A Bearer USER DETERMINATION TABLE

| INTRA-oGW UE IDENTIFIER | T-Target Cell ID inf | T-C-RNTI inf | Target ID | S-Target Cell ID inf | S-C-RNTI inf |
|---|---|---|---|---|---|
| 8000 | | | eNB#2 | Cell ID#x | C-RNTI#x |
| | | | | | |
| | | | | | |

— 175b

Bearer TABLE — 175B

| INTRA-oGW UE IDENTIFIER | USER LINE IDENTIFIER | uplink LINE ASSIGNMENT INFO | downlink LINE ASSIGNMENT INFO | TOF SORTING POINT POSITION INFO | TOF ANCHOR POINT POSITION INFO |
|---|---|---|---|---|---|
| 8000 | 1 | TEID#SGW-u1 SGW#1 | eNB-TEID#1 eNB#1 | (OFFLOAD NOT APPLICABLE) | |
| 8000 | 2 | TEID#SGW-u2 SGW#1 | eNB-TEID#2 eNB#1 | TOF DL-TEID#1 | TOF UL-TEID#1 oGW#1 |
| | | | | | |

Target oGW (= oGW#2)
Bearer USER DETERMINATION TABLE — 175a'

| INTRA-oGW UE IDENTIFIER | INTRA-MME UE IDENTIFIER | MME DEVICE IDENTIFIER | INTRA-eNB UE IDENTIFIER (S1AP) | INTRA-eNB UE IDENTIFIER (X2AP) | eNB DEVICE IDENTIFIER |
|---|---|---|---|---|---|
| 8102 | MME#2 UE S1AP ID#x | MME#2 | eNB#2 UE S1AP ID#x | | eNB#2 |
| | | | | | |
| | | | | | |

Bearer USER DETERMINATION TABLE — 175b'

| INTRA-oGW UE IDENTIFIER | T-Target Cell ID inf | T-C-RNTI inf | Target ID | S-Target Cell ID inf | S-C-RNTI inf |
|---|---|---|---|---|---|
| 8102 | Cell ID#x | C-RNTI#x | | | |
| | | | | | |
| | | | | | |

} 175A'

SETTING ACCORDING TO Handover Request INTERCEPTION
SETTING ACCORDING TO Handover Request Ack. INTERCEPTION Bearer TABLE — 175B'

| INTRA-oGW UE IDENTIFIER | USER LINE IDENTIFIER | uplink LINE ASSIGNMENT INFO | downlink LINE ASSIGNMENT INFO | TOF SORTING POINT POSITION INFO | TOF ANCHOR POINT POSITION INFO |
|---|---|---|---|---|---|
| | | | | | |
| | | | | | |
| 8102 | 1 | TEID#SGW-u21 SGW#2 | eNB-TEID#21 eNB#2 | (OFFLOAD NOT APPLICABLE) | |
| 8102 | 2 | TEID#SGW-u22 SGW#2 | eNB-TEID#22 eNB#2 | TOF DL-TEID#2 | TOF UL-TEID#2 oGW#2 |

FIG. 83

Source oGW (=oGW#1)
TOF RELAY MANAGEMENT TABLE  278a

| INTRA-oGW-ANCHOR UE IDENTIFIER | USER LINE IDENTIFIER | TOF ANCHOR POINT POSITION | TOF SORTING POINT POSITION | |
|---|---|---|---|---|
| 4000 | 2 | TOF UL-TEID#1 | TOF DL-TEID#1 | oGW#1 |
| | | | TOF DL-TEID#2 | oGW#2 |
| | | | | |
| | | | | |

TOF Session MANAGEMENT TABLE  278b

| INTRA-oGW-ANCHOR UE IDENTIFIER | USER LINE IDENTIFIER | Multicast VIEWING INFO |
|---|---|---|
| | | |
| | | |
| 4000 | 2 | Multicast Addr#m |
| | | |
| | | |
| | | |
| | | |

Target oGW (=oGW#2)
TOF RELAY MANAGEMENT TABLE  278a'

| INTRA-oGW-ANCHOR UE IDENTIFIER | USER LINE IDENTIFIER | TOF ANCHOR POINT POSITION | TOF SORTING POINT POSITION | |
|---|---|---|---|---|
| | | | | |
| 4102 | 2 | TOF UL-TEID#2 | TOF DL-TEID#2 | oGW#2 |
| | | | | |
| | | | | |

TOF Session MANAGEMENT TABLE  278b'

| INTRA-oGW-ANCHOR UE IDENTIFIER | USER LINE IDENTIFIER | Multicast VIEWING INFO |
|---|---|---|
| | | |
| | | |
| | | |
| | | |
| | | |
| | | |
| | | |

FIG. 84

Source oGW (=oGW#1)
OFFLOAD CONDITION APPLICATION STATE TABLE          176A

| INTRA-oGW UE IDENTIFIER | USER LINE IDENTIFIER (E RAB ID) | Multicast VIEWING INFO | OFFLOAD ANCHOR POINT INFO |
|---|---|---|---|
|  |  |  |  |
| 8000 | 2 | Multicast Addr#m | TOF UL-TEID#1, oGW#1 |
|  |  |  |  |
|  |  |  |  |

Target oGW (=oGW#2)
OFFLOAD CONDITION APPLICATION
STATE TABLE          176A'

| INTRA-oGW UE IDENTIFIER | USER LINE IDENTIFIER (E RAB ID) | Multicast VIEWING INFO | OFFLOAD ANCHOR POINT INFO |
|---|---|---|---|
|  |  |  |  |
| 8102 | 2 | Multicast Addr#m | TOF UL-TEID#1, oGW#1 |
|  |  |  |  |
|  |  |  |  |

FIG. 86

Source oGW (= oGW#1)
Bearer USER DETERMINATION TABLE

| INTRA-oGW UE IDENTIFIER | INTRA-MME UE IDENTIFIER | MME DEVICE IDENTIFIER | INTRA-eNB UE IDENTIFIER (S1AP) | INTRA-eNB UE IDENTIFIER (X2AP) | eNB DEVICE IDENTIFIER |
|---|---|---|---|---|---|
| | | | | | |
| | | | | | |
| | | | | | |
| | | | | | |

Bearer USER DETERMINATION TABLE

| INTRA-oGW UE IDENTIFIER | T-Target Cell ID inf | T-C-RNTI inf | Target ID | S-Target Cell ID inf | S-C-RNTI inf |
|---|---|---|---|---|---|
| | | | | | |
| | | | | | |
| | | | | | |
| | | | | | |

Bearer TABLE

| INTRA-oGW UE IDENTIFIER | USER LINE IDENTIFIER | uplink LINE ASSIGNMENT INFO | downlink LINE ASSIGNMENT INFO | TOF SORTING POINT POSITION INFO | TOF ANCHOR POINT POSITION INFO |
|---|---|---|---|---|---|
| | | | | | |
| | | | | | |
| | | | | | |
| | | | | | |
| | | | | | |

Target oGW (= oGW#2)
Bearer USER DETERMINATION TABLE

| INTRA-oGW UE IDENTIFIER | INTRA-MME UE IDENTIFIER | MME DEVICE IDENTIFIER | INTRA-eNB UE IDENTIFIER (S1AP) | INTRA-eNB UE IDENTIFIER (X2AP) | eNB DEVICE IDENTIFIER |
|---|---|---|---|---|---|
| | | | | | |
| 8102 | MME#1 UE S1AP ID#x | MME#1 | eNB UE S1AP ID#x | | eNB#2 |
| | | | | | |

Bearer USER DETERMINATION TABLE

| INTRA-oGW UE IDENTIFIER | T-Target Cell ID inf | T-C-RNTI inf | Target ID | S-Target Cell ID inf | S-C-RNTI inf |
|---|---|---|---|---|---|
| | | | | | |
| 8102 | | | | | |
| | | | | | |

Bearer TABLE

| INTRA-oGW UE IDENTIFIER | USER LINE IDENTIFIER | uplink LINE ASSIGNMENT INFO | downlink LINE ASSIGNMENT INFO | TOF SORTING POINT POSITION INFO | TOF ANCHOR POINT POSITION INFO |
|---|---|---|---|---|---|
| | | | | | |
| | | | | | |
| 8102 | 1 | TEID#SGW-u21 SGW#2 | eNB-TEID#21 eNB#2 | (OFFLOAD NOT APPLICABLE) | |
| 8102 | 2 | TEID#SGW-u22 SGW#2 | eNB-TEID#22 eNB#2 | TOF DL-TEID#2 | TOF UL-TEID#2 oGW#2 |
| | | | | | |

FIG. 87

Source oGW (=oGW#1)
OFFLOAD CONDITION APPLICATION STATE TABLE

| INTRA-oGW UE IDENTIFIER | USER LINE IDENTIFIER (E RAB ID) | Multicast VIEWING INFO | OFFLOAD ANCHOR POINT INFO |
|---|---|---|---|
|  |  |  |  |
|  |  |  |  |
|  |  |  |  |
|  |  |  |  |

Target oGW (=oGW#2)
OFFLOAD CONDITION APPLICATION STATE TABLE

| INTRA-oGW UE IDENTIFIER | USER LINE IDENTIFIER (E RAB ID) | Multicast VIEWING INFO | OFFLOAD ANCHOR POINT INFO |
|---|---|---|---|
|  |  |  |  |
| 8102 | 2 | Multicast Addr#m | TOF UL-TEID#1, oGW#1 |
|  |  |  |  |
|  |  |  |  |

FIG. 89A

Source oGW (= oGW#1)
Bearer USER DETERMINATION TABLE

| INTRA-oGW UE IDENTIFIER | INTRA-MME UE IDENTIFIER | MME DEVICE IDENTIFIER | INTRA-eNB UE IDENTIFIER (S1AP) | INTRA-eNB UE IDENTIFIER (X2AP) | eNB DEVICE IDENTIFIER |
|---|---|---|---|---|---|
| 8000 | MME#1 UE S1AP ID#x | MME#1 | eNB#1 UE S1AP ID#x | eNB#1 UE X2AP ID#x | eNB#1 |
| | | | | | |
| | | | | | |

Bearer USER DETERMINATION TABLE

| INTRA-oGW UE IDENTIFIER | T-Target Cell ID inf | T-C-RNTI inf | Target ID | S-Target Cell ID inf | S-C-RNTI inf |
|---|---|---|---|---|---|
| 8000 | | | | | |
| | | | | | |
| | | | | | |

⎱ 175A

Bearer TABLE

| INTRA-oGW UE IDENTIFIER | USER LINE IDENTIFIER | uplink LINE ASSIGNMENT INFO | | downlink LINE ASSIGNMENT INFO | | TOF SORTING POINT POSITION INFO | TOF ANCHOR POINT POSITION INFO | |
|---|---|---|---|---|---|---|---|---|
| 8000 | 1 | TEID#SGW-u1 | SGW#1 | eNB-TEID#1 | eNB#1 | (OFFLOAD NOT APPLICABLE) | | |
| 8000 | 2 | TEID#SGW-u2 | SGW#1 | eNB-TEID#2 | eNB#1 | TOF DL-TEID#1 | TOF UL-TEID#1 | oGW#1 |
| | | | | | | | | |
| | | | | | | | | |

⎰ 175B

Target oGW (= oGW#2)
Bearer USER DETERMINATION TABLE

| INTRA-oGW UE IDENTIFIER | INTRA-MME UE IDENTIFIER | MME DEVICE IDENTIFIER | INTRA-eNB UE IDENTIFIER (S1AP) | INTRA-eNB UE IDENTIFIER (X2AP) | eNB DEVICE IDENTIFIER |
|---|---|---|---|---|---|
| | | | | | |
| 8102 | MME#1 UE S1AP ID#x | MME#1 | eNB#2 UE S1AP ID#x | | eNB#2 |
| | | | | | |

Bearer USER DETERMINATION TABLE

| INTRA-oGW UE IDENTIFIER | T-Target Cell ID inf | T-C-RNTI inf | Target ID | S-Target Cell ID inf | S-C-RNTI inf |
|---|---|---|---|---|---|
| | | | | | |
| 8102 | | | | | |
| | | | | | |

⎱ 175A'

Bearer TABLE

| INTRA-oGW UE IDENTIFIER | USER LINE IDENTIFIER | uplink LINE ASSIGNMENT INFO | | downlink LINE ASSIGNMENT INFO | | TOF SORTING POINT POSITION INFO | TOF ANCHOR POINT POSITION INFO | |
|---|---|---|---|---|---|---|---|---|
| | | | | | | | | |
| | | | | | | | | |
| 8102 | 1 | TEID#SGW-u21 | SGW#2 | eNB-TEID#21 | eNB#2 | (OFFLOAD NOT APPLICABLE) | | |
| 8102 | 2 | TEID#SGW-u22 | SGW#2 | eNB-TEID#22 | eNB#2 | TOF DL-TEID#2 | TOF UL-TEID#2 | oGW#2 |

Source oGW (=oGW#1)
TOF RELAY MANAGEMENT TABLE    278a

| INTRA-oGW-ANCHOR UE IDENTIFIER | USER LINE IDENTIFIER | TOF ANCHOR POINT POSITION | TOF SORTING POINT POSITION | |
|---|---|---|---|---|
| 4000 | 2 | TOF UL-TEID#1 | TOF DL-TEID#2 | oGW#2 |
| | | | | |
| | | | | |
| | | | | |

TOF Session MANAGEMENT TABLE    278b

| INTRA-oGW-ANCHOR UE IDENTIFIER | USER LINE IDENTIFIER | Multicast VIEWING INFO |
|---|---|---|
| | | |
| | | |
| 4000 | 2 | Multicast Addr#m |
| | | |
| | | |
| | | |
| | | |

Target oGW (=oGW#2)
TOF RELAY MANAGEMENT TABLE    278a'

| INTRA-oGW-ANCHOR UE IDENTIFIER | USER LINE IDENTIFIER | TOF ANCHOR POINT POSITION | TOF SORTING POINT POSITION | |
|---|---|---|---|---|
| 4102 | 2 | TOF UL-TEID#2 | TOF DL-TEID#2 | oGW#2 |
| | | | | |
| | | | | |
| | | | | |

TOF Session MANAGEMENT TABLE    278b'

| INTRA-oGW-ANCHOR UE IDENTIFIER | USER LINE IDENTIFIER | Multicast VIEWING INFO |
|---|---|---|
| | | |
| | | |
| | | |
| | | |
| | | |
| | | |
| | | |

FIG. 90

Source oGW (=oGW#1)
TOF RELAY MANAGEMENT TABLE 278a

| INTRA-oGW-ANCHOR UE IDENTIFIER | USER LINE IDENTIFIER | TOF ANCHOR POINT POSITION | TOF SORTING POINT POSITION | |
|---|---|---|---|---|
| 4000 | 2 | TOF UL-TEID#1 | TOF DL-TEID#1 | oGW#1 |
| | | | TOF DL-TEID#2 | oGW#2 |
| | | | | |
| | | | | |

TOF Session MANAGEMENT TABLE 278b

| INTRA-oGW-ANCHOR UE IDENTIFIER | USER LINE IDENTIFIER | Multicast VIEWING INFO |
|---|---|---|
| | | |
| | | |
| 4000 | 2 | Multicast Addr#m |
| | | |
| | | |
| | | |
| | | |

Target oGW (=oGW#2)
TOF RELAY MANAGEMENT TABLE 278a'

| INTRA-oGW-ANCHOR UE IDENTIFIER | USER LINE IDENTIFIER | TOF ANCHOR POINT POSITION | TOF SORTING POINT POSITION | |
|---|---|---|---|---|
| | | | | |
| 4102 | 2 | TOF UL-TEID#2 | TOF DL-TEID#2 | oGW#2 |
| | | | | |
| | | | | |
| | | | | |

TOF Session MANAGEMENT TABLE 278b'

| INTRA-oGW-ANCHOR UE IDENTIFIER | USER LINE IDENTIFIER | Multicast VIEWING INFO |
|---|---|---|
| | | |
| | | |
| | | |
| | | |
| | | |
| | | |

FIG. 93

Source oGW (=oGW#1)
OFFLOAD CONDITION APPLICATION STATE TABLE          176A

| INTRA-oGW UE IDENTIFIER | USER LINE IDENTIFIER (E RAB ID) | Multicast VIEWING INFO | OFFLOAD ANCHOR POINT INFO |
|---|---|---|---|
|  |  |  |  |
|  |  |  |  |
|  |  |  |  |
|  |  |  |  |

Target oGW (=oGW#2)
OFFLOAD CONDITION APPLICATION STATE TABLE          176A'

| INTRA-oGW UE IDENTIFIER | USER LINE IDENTIFIER (E RAB ID) | Multicast VIEWING INFO | OFFLOAD ANCHOR POINT INFO |
|---|---|---|---|
|  |  |  |  |
| 8102 | 2 | Multicast Addr#m | TOF UL-TEID#1, oGW#1 |
| 8102 | 2 | Multicast Addr#n | TOF UL-TEID#2, oGW#2 |
|  |  |  |  |

FIG. 94

Source oGW (=oGW#1)
TOF RELAY MANAGEMENT TABLE  278a

| INTRA-oGW-ANCHOR UE IDENTIFIER | USER LINE IDENTIFIER | TOF ANCHOR POINT POSITION | TOF SORTING POINT POSITION | |
|---|---|---|---|---|
| 4000 | 2 | TOF UL-TEID#1 | TOF DL-TEID#2 | oGW#2 |
| | | | | |
| | | | | |
| | | | | |
| | | | | |

TOF Session MANAGEMENT TABLE  278b

| INTRA-oGW-ANCHOR UE IDENTIFIER | USER LINE IDENTIFIER | Multicast VIEWING INFO |
|---|---|---|
| | | |
| | | |
| 4000 | 2 | Multicast Addr#m |
| | | |
| | | |
| | | |

Target oGW (=oGW#2)
TOF RELAY MANAGEMENT TABLE  278a'

| INTRA-oGW-ANCHOR UE IDENTIFIER | USER LINE IDENTIFIER | TOF ANCHOR POINT POSITION | TOF SORTING POINT POSITION | |
|---|---|---|---|---|
| | | | | |
| 4102 | 2 | TOF UL-TEID#2 | TOF DL-TEID#2 | oGW#2 |
| | | | | |
| | | | | |
| | | | | |

TOF Session MANAGEMENT TABLE  278b'

| INTRA-oGW-ANCHOR UE IDENTIFIER | USER LINE IDENTIFIER | Multicast VIEWING INFO |
|---|---|---|
| | | |
| | | |
| 4102 | 2 | Multicast Addr#n |
| | | |
| | | |
| | | |

FIG. 96

Source oGW (=oGW#1)
Bearer USER DETERMINATION TABLE

| INTRA-oGW UE IDENTIFIER | INTRA-MME UE IDENTIFIER | MME DEVICE IDENTIFIER | INTRA-eNB UE IDENTIFIER (S1AP) | INTRA-eNB UE IDENTIFIER (X2AP) | eNB DEVICE IDENTIFIER |
|---|---|---|---|---|---|
|  |  |  |  |  |  |
|  |  |  |  |  |  |
|  |  |  |  |  |  |

Bearer USER DETERMINATION TABLE

| INTRA-oGW UE IDENTIFIER | T-Target Cell ID inf | T-C-RNTI inf | Target ID | S-Target Cell ID inf | S-C-RNTI inf |
|---|---|---|---|---|---|
|  |  |  |  |  |  |
|  |  |  |  |  |  |
|  |  |  |  |  |  |

175A

Bearer TABLE

| INTRA-oGW UE IDENTIFIER | USER LINE IDENTIFIER | uplink LINE ASSIGNMENT INFO | downlink LINE ASSIGNMENT INFO | TOF SORTING POINT POSITION INFO | TOF ANCHOR POINT POSITION INFO |
|---|---|---|---|---|---|
|  |  |  |  |  |  |
|  |  |  |  |  |  |
|  |  |  |  |  |  |
|  |  |  |  |  |  |

175B

Target oGW (=oGW#2)
Bearer USER DETERMINATION TABLE

| INTRA-oGW UE IDENTIFIER | INTRA-MME UE IDENTIFIER | MME DEVICE IDENTIFIER | INTRA-eNB UE IDENTIFIER (S1AP) | INTRA-eNB UE IDENTIFIER (X2AP) | eNB DEVICE IDENTIFIER |
|---|---|---|---|---|---|
|  |  |  |  |  |  |
| 8102 | MME#1 UE S1AP ID#x | MME#1 | eNB#2 UE S1AP ID#x |  | eNB#2 |
|  |  |  |  |  |  |

Bearer USER DETERMINATION TABLE

| INTRA-oGW UE IDENTIFIER | T-Target Cell ID inf | T-C-RNTI inf | Target ID | S-Target Cell ID inf | S-C-RNTI inf |
|---|---|---|---|---|---|
|  |  |  |  |  |  |
| 8102 |  |  |  |  |  |
|  |  |  |  |  |  |

175A'

Bearer TABLE

| INTRA-oGW UE IDENTIFIER | USER LINE IDENTIFIER | uplink LINE ASSIGNMENT INFO | downlink LINE ASSIGNMENT INFO | TOF SORTING POINT POSITION INFO | TOF ANCHOR POINT POSITION INFO |
|---|---|---|---|---|---|
|  |  |  |  |  |  |
|  |  |  |  |  |  |
| 8102 | 1 | TEID#SGW-u21 | SGW#2 | eNB-TEID#21 | eNB#2 | (OFFLOAD NOT APPLICABLE) |  |
| 8102 | 2 | TEID#SGW-u22 | SGW#2 | eNB-TEID#22 | eNB#2 | TOF DL-TEID#2 | TOF UL-TEID#2 oGW#2 |
|  |  |  |  |  |  |

Source oGW (= oGW#1)
Bearer USER DETERMINATION TABLE

| INTRA-oGW UE IDENTIFIER | INTRA-MME UE IDENTIFIER | MME DEVICE IDENTIFIER | INTRA-eNB UE IDENTIFIER (S1AP) | INTRA-eNB UE IDENTIFIER (X2AP) | eNB DEVICE IDENTIFIER |
|---|---|---|---|---|---|
| | | | | | |
| | | | | | |
| | | | | | |

Bearer USER DETERMINATION TABLE

| INTRA-oGW UE IDENTIFIER | T-Target Cell ID inf | T-C-RNTI inf | Target ID | S-Target Cell ID inf | S-C-RNTI inf |
|---|---|---|---|---|---|
| | | | | | |
| | | | | | |
| | | | | | |

Bearer TABLE

| INTRA-oGW UE IDENTIFIER | USER LINE IDENTIFIER | uplink LINE ASSIGNMENT INFO | downlink LINE ASSIGNMENT INFO | TOF SORTING POINT POSITION INFO | TOF ANCHOR POINT POSITION INFO |
|---|---|---|---|---|---|
| | | | | | |
| | | | | | |
| | | | | | |
| | | | | | |

{ 175A, 175B }

Target oGW (= oGW#2)
Bearer USER DETERMINATION TABLE

| INTRA-oGW UE IDENTIFIER | INTRA-MME UE IDENTIFIER | MME DEVICE IDENTIFIER | INTRA-eNB UE IDENTIFIER (S1AP) | INTRA-eNB UE IDENTIFIER (X2AP) | eNB DEVICE IDENTIFIER |
|---|---|---|---|---|---|
| | | | | | |
| 8102 | MME#1 UE S1AP ID#x | MME#1 | eNB#2 UE S1AP ID#x | | eNB#2 |
| | | | | | |

Bearer USER DETERMINATION TABLE

| INTRA-oGW UE IDENTIFIER | T-Target Cell ID inf | T-C-RNTI inf | Target ID | S-Target Cell ID inf | S-C-RNTI inf |
|---|---|---|---|---|---|
| | | | | | |
| 8102 | | | | | |
| | | | | | |

Bearer TABLE

| INTRA-oGW UE IDENTIFIER | USER LINE IDENTIFIER | uplink LINE ASSIGNMENT INFO | downlink LINE ASSIGNMENT INFO | TOF SORTING POINT POSITION INFO | TOF ANCHOR POINT POSITION INFO |
|---|---|---|---|---|---|
| | | | | | |
| 8102 | 1 | TEID#SGW-u21 SGW#2 | eNB-TEID#21 eNB#2 | (OFFLOAD NOT APPLICABLE) | |
| 8102 | 2 | TEID#SGW-u22 SGW#2 | eNB-TEID#22 eNB#2 | TOF DL-TEID#2 | TOF UL-TEID#2 oGW#2 |
| | | | | | |

{ 175A', 175B' }

FIG. 101 eNB ACCOMMODATION TABLE

| eNB IDENTIFIER | eNB Address INFO | ACCOMMODATED oGW INFO |
|---|---|---|
| eNB#1 | eNB#1 Address | oGW#1 |
| eNB#2 | eNB#2 Address | oGW#2 |
| eNB#3 | eNB#3 Address | oGW#3 |
| eNB#4 | eNB#4 Address | oGW#4 |
| | | |

NETWORK SYSTEM, OFFLOAD DEVICE, AND OFFLOAD TRAFFIC CONTROL METHOD

CROSS-REFERENCE TO RELATED APPLICATION

This application is based upon and claims the benefit of priority of the prior Japanese Patent Application No. 2012-012939, filed on Jan. 25, 2012, the entire contents of which are incorporated herein by reference.

FIELD

The embodiments discussed herein are related to a network system, an offload device, and an offload traffic control method.

BACKGROUND

LTE/EPC (Long term Evolution/Evolved Packet Core) has been standardized with 3GPP as a mobile communication system according to the next generation of the third generation cellular phone network (3G mobile system). LTE/EPC includes an LTE network (wireless access network conforming to LTE: referred to as eUTRAN), and an EPC network (also referred to as SAE (System Architecture Evolution) serving as a core network (mobile transmission network)). The EPC network is connected to an IP (Internet Protocol) network (packet network) via an IMS (IP Multimedia Subsystem) network. Examples of the IP network includes an ISP (Internet Service Provider) network (the Internet) and an intranet.

A mobile station (User Equipment: UE) may be connected to the EPC network via the LTE network, and is connected to the IP network via the EPC network and IMS network. The UE may receive various packet communication services (e.g., Web service, VoIP (Voice over IP)) by accessing various servers and terminal devices connected to the IP network.

The EPC network includes multiple nodes such as MME (Mobility Management Entity), S-GW (Serving Gateway), P-GW (Packet Data Network Gateway), and PCRF (Policy and Charging rule Function). The UE is connected to the IMS network via an S-GW and a P-GW, whereby the UE can access the IP network.

Incidentally, there has been traffic offload technology with traffic reduction in the EPC network as one target. With the traffic offload technology, there is provided an offload device on the EPC network so that traffic from User Equipment accesses the ISP network without passing through an S-GW and a P-GW. The offload device may serve as an anchor point (point to execute handover, i.e., switching of a path) as to traffic from User equipment (wireless access network). The offload device transfers (offloads) the traffic from User Equipment to a network for offload (offload network: e.g., IP network, MPLS (Multi Protocol Label Switching) network) different from the EPC network. The offloaded traffic arrives at (is connected to) the target IP network through the offload network.

Japanese National Publication of International Patent Application Nos. 2004-523148 and 2010-541312 are examples of the related art of the present technology.

SUMMARY

According to an aspect of the invention, a network system includes: a plurality of base stations, each with which a mobile station communicates; a core network to include the plurality of base stations; and a plurality of offload devices, each arranged between the base station and a node device included in the core network, each to serve as the node device of an anchor point at which traffic to be offloaded is transmitted/received to/from an offload network, and each to serve as the node device of a relay point at which the traffic to be offloaded is relayed between the anchor point and one of the plurality of base stations with which the mobile station is communicating, wherein each of the plurality of offload devices includes: a storage device in which, in a case that the mobile station starts communicating of traffic to be offloaded via a first offload device, anchor point information including line information of the traffic, identification information of the traffic, and position information of the anchor point of the traffic are stored, relating to the first offload device; a packet transfer device to transmit, in a case that a second offload device serves as the node device of the relay point due to handover of the mobile station while the mobile station is communicating, the anchor point information to the second offload device; and a controller to control the packet transfer device so that the packet transfer device relays the traffic to be offloaded using the anchor point information received from the second offload device in a case that the first offload device serves as the node device of the relay point, and to release the first offload device from serving as the node device of the anchor point in a case of completion of the traffic.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 indicates a data structure example of an offload condition application state table;

FIG. 6 indicates a data structure example of an Uplink GTP-u packet (addressed to S-GW);

FIG. 7 indicates a data structure example of a Downlink GTP-u packet (address to eNB);

FIG. 8 indicates a data structure example of a packet addressed to an uplink offload anchor point;

FIG. 9 indicates a data structure example of a packet to be transmitted to a website from an anchor point;

FIG. 10 indicates a data structure example of a packet to be transmitted from a website to an anchor point;

FIG. 11 indicates a data structure example of a packet addressed to a downlink offload sorting point;

FIG. 12 indicates a data structure example of Bearer state management data at a sorting point;

FIG. 13 indicates a data structure example of TOF relay state management data at an offload anchor point;

FIG. 14 indicates a structure example of an Initial Context Setup Request message;

FIG. 15 indicates a structure example of an Initial Context Setup Response message;

FIG. 16 indicates a structure example of a Handover Required message;

FIG. 17 indicates a structure example of a Handover Request message;

FIG. 18 indicates a structure example of a Handover Request Ack. message;

FIG. 19 indicates a structure example of a Handover Command message;

FIG. 20 indicates a structure example of a UE Context Release Command message;

FIG. 21 indicates a structure example of an X2AP: Handover Request message;

FIG. 22 indicates a structure example of an X2AP: Handover Request Ack. message;

FIG. 23 indicates a structure example of an X2AP: UE Context Release message;

FIG. 24 indicates a structure example of a Path Switch Request message;

FIG. 25 indicates a structure example of a Path Switch Request Ack. message;

FIG. 30B illustrates an example of an offload GTP-u tunnel generation flow (subroutine);

FIG. 35B illustrates an example of an offload GTP-u switching processing flow (subroutine);

FIG. 41 indicates an example (Bearer state data) of an offload condition application state after generation of a TCP connection;

FIG. 42 indicates an example (relay state management data) of an offload condition application state after generation of a TCP connection;

FIG. 43 indicates an example (offload condition application state data) of an offload condition application state after generation of a TCP connection;

FIG. 45 indicates an example (Bearer state data) of handover of an offload condition application state at the S1-Based Handover;

FIG. 46 indicates an example (relay state management data) of handover of an offload condition application state at the S1-Based Handover;

FIG. 47 indicates an example (offload condition application state data) of handover of an offload condition application state at the S1-Based Handover;

FIG. 49 indicates an example (Bearer state data) of an offload condition application state in the event that a TCP connection is maintained after Handover completion;

FIG. 50A indicates an example (offload condition application state data) of an offload condition application state in the event that a TCP connection is maintained after Handover completion;

FIG. 50B indicates an example (relay state management data) of an offload condition application state in the event that a TCP connection is maintained after Handover completion;

FIG. 52 indicates an example (Bearer state data) of handover of an offload condition application state at the X2-Based Handover;

FIG. 53 indicates an example (relay state management data) of handover of an offload condition application state at the X2-Based Handover;

FIG. 54 indicates an example (offload condition application state data) of handover of an offload condition application state at the X2-Based Handover;

FIG. 56 indicates an example (offload condition application state data) of an offload condition application state after generation of a new TCP connection after Handover;

FIG. 57 indicates an example (relay state management data) of an offload condition application state after generation of a new TCP connection after Handover;

FIG. 58B indicates an example (Bearer state data) of an offload condition application state after generation of a new TCP connection after Handover;

FIG. 59 indicates an example (offload condition application state data) of an offload condition application state after disconnection of a TCP connection after Handover;

FIG. 60 indicates an example (relay state management data) of an offload condition application state after disconnection of a TCP connection after Handover;

FIG. 62 indicates an example (Bearer state data) of an offload condition application state after disconnection of a TCP connection after Handover;

FIG. 65 indicates an offload condition application table structure example (Multicast/UDP/IPTV);

FIG. 67 indicates a structure example of a packet (IPTV broadcast distribution) of GTP-u toward an eNB from an S-GW;

FIG. 69 indicates a structure example of a packet (IGMP-join, IGMP-leave) to be used when transmitting an uplink packet (IGMP-join, IGMP-leave) to be offloaded from an oGW serving as an anchor point to the offload network;

FIG. 70 indicates a structure example of a packet (IPTV broadcast distribution) to be arrived at an offload anchor point via the offload network from an IPTV station;

FIG. 71 indicates a structure example of a packet (IPTV broadcast distribution) to be used when transmitting data from an offload anchor point oGW to a sorting point oGW;

FIG. 72 indicates a structure example of TOF relay state management data at an offload anchor point;

FIG. 76 illustrates a processing flow example at the time of intercepting a Handover Command message;

FIG. 77 illustrates a processing flow example at the time of intercepting an X2AP: Handover Request message;

FIG. 78 indicates an example (Bearer state management data setting example) of an offload condition application state after start of IPTV broadcast viewing;

FIG. 79 indicates an example (TOF relay state management data setting example) of an offload condition application state after start of IPTV broadcast viewing;

FIG. 80 indicates an example (offload condition application state data setting example) of an offload condition application state after start of IPTV broadcast viewing;

FIG. 82 indicates an example (Bearer state management data setting example) of handover of an offload state application state (IPTV broadcast viewing information) at the S1-based Handover;

FIG. 83 indicates an example (TOF relay state management data setting example) of handover of an offload state application state (IPTV broadcast viewing information) at the S1-based Handover;

FIG. 84 indicates an example (offload condition application state data setting example) of handover of an offload state application state (IPTV broadcast viewing information) at the S1-based Handover;

FIG. 86 indicates an example (Bearer state management data setting example) of an offload state application state maintaining IPTV broadcast viewing at the time of Handover completion;

FIG. 87 indicates an example (offload condition application state data setting example) of an offload state application state maintaining IPTV broadcast viewing at the time of Handover completion;

FIG. 89A indicates an example (Bearer state management data setting example) of handover of an offload state application state (IPTV broadcast viewing information) at the X2-based Handover;

FIG. 89B indicates an example (Bearer state management data setting example) of an offload condition application state maintaining IPTV broadcast viewing at the time of Handover completion;

FIG. 90 indicates an example (TOF relay state management data setting example) of handover of an offload state application state (IPTV broadcast viewing information) at the X2-based Handover;

FIG. 93 indicates an example (offload condition application state data setting example) of an offload condition application state after start of new IPTV broadcast viewing after Handover;

FIG. 94 indicates an example (TOF relay state management data setting example) of an offload condition application state after start of new IPTV broadcast viewing after Handover;

FIG. 96 indicates an example (Bearer state management data setting example) of an offload condition application state after start of new IPTV broadcast viewing after Handover;

FIG. 100 indicates an example (Bearer state management data setting example) of an offload condition application state after secession of IPTV broadcast viewing after Handover; and FIG. 101 indicates a structure example of oGW information housing an eNB that an oGW holds at a storage device.

DESCRIPTION OF EMBODIMENTS

With traffic offload in the EPC network, there is determined an offload device serving as an offload anchor point in increments of communication lines at the time of communication line setting at User Equipment. The offload device at the anchor point is not changed by change of a base station to which User Equipment is connected. That is to say, all of the offload traffic from User Equipment passes through the offload device at the anchor point regardless of the position of the User Equipment. Thus, disconnection or disruption of communication between User Equipment and a target IP network due to movement of the User Equipment is avoided.

However, according to movement of User Equipment, traffic occurs between offload devices in the event that an offload device which receives traffic to be offloaded from the User Equipment becomes a state different from an offload device serving as an anchor point. Transmission distance according to traffic between the offload devices is extended as distance between the offload device serving as an anchor point and the User equipment separates.

Also, for example, with the current position of User Equipment, even in a situation wherein traffic transmission distance between offload devices may significantly be reduced by an offload device which receives traffic from the User Equipment (different from an offload device serving as an anchor point) carrying out offload toward a target IP network, traffic passes through the offload device serving as an anchor point. Such traffic leads to load increase in the EPC network (core network), and consumption of resources.

Hereinafter, embodiments of the present disclosure will be described with reference to the drawings. The configurations of the embodiments are an example, and the present disclosure is not restricted to the configurations of the embodiments.

First Embodiment

With a first embodiment, regarding TCP (Transmission Control Protocol) to be traffic-offloaded, for each TCP connection (also referred to as "TCP session"), an offload device which has started communication according the TCP connection is determined as an anchor point device as to a target packet network.

Also, "TCP connection information to be traffic offloaded" and "the position (offload device) of an offload anchor point" are managed. Next, in accordance with movement (handover) of User Equipment (UE), anchor point information including "TCP connection information to be traffic offloaded" and "the position (device) information of an offload anchor point" and line information of offload traffic is informed to a handover destination offload device. Thus, the handover destination offload device also maintains TCP communication. Thereafter, with completion (disconnection) of the TCP connection as a trigger, the offload anchor point according to this TCP connection is released.

Overall Configuration

Figure 1:
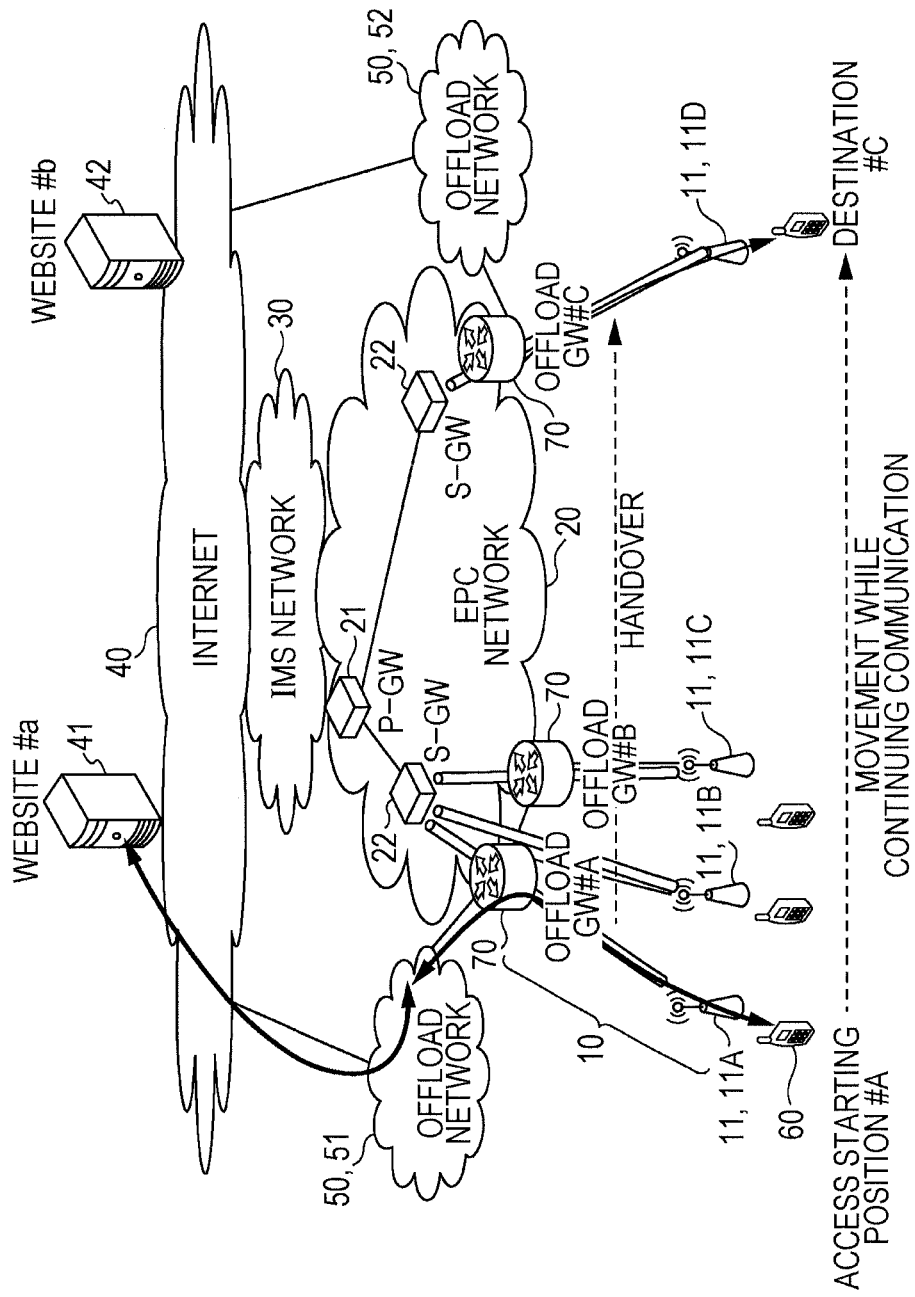
FIG. 1 illustrates a configuration example of a network system according to a first embodiment.

FIG. 1 illustrates a configuration example of a network system according to the first embodiment. In FIG. 1, the network system briefly includes an LTE network (eUTRAN) 10, an EPC network 20, an IMS network 30, an ISP (Internet Service Provider) network (Internet) 40, and an offload network 50 (in FIG. 1, offload networks 51 and 52 are exemplified). The LTE network 10 is an example of a wireless access network, and the EPC network 20 is an example of a core network. The ISP network 40 is an example of a packet network. In FIG. 1, a web server 41 which provides a website #a, and a web server 42 which provides a website #b are connected to the ISP network 40. However, the web servers 41 and 42 are examples of communication partners (Correspondence nodes: server and terminal device) to be connected to the ISP network 40. The types and services of the server and terminal device may be any type and any service as long as they perform TCP communication.

The LTE network 10 includes a base station 11 conforming to LTE called as "eNodeB (eNB)". The EPC network 20 is an example of a core network. The EPC network 20 may accommodate, in addition to an eNB, 3GPP wireless access networks of the second generation (2G: e.g., GSM), the third generation (3G: e.g., W-CDMA), and the 3.5th generation (HSPA). Further, the EPC network 20 may also accommodate a non-3GPP wireless access network such as CDMA2000 or Wi-Fi. The wireless access network 10 includes the above-mentioned wireless access networks. User Equipment 60 is wirelessly connected to the base station 11, whereby the UE can access communication partners such as web servers 41 and 42 via the EPC network 20 and ISP network 40. The User Equipment 60 may continue communication with a communication partner by changing the connection destination base station 11 (handover) according to movement of the User Equipment 60.

The EPC network 20 includes various nodes such as an MME (Mobility Management Entity) 21 (See FIG. 4A), an S-GW (Serving-Gateway) 22, a P-GW (Packet Data Network-Gateway) 23, and a PCRF (Policy and Changing Rule Function) (not illustrated). The MME 21 handles a C plane (Control Plane) for network control. The MME 21 performs movement control such as establishment/release of Bearer (connection between a user and a packet network), position registration or handover of User Equipment. Also, the MME 21 performs authentication of User Equipment in collaboration with an HSS (Home Subscriber Server: not illustrated) in which subscriber information is registered.

The S-GW 22 handles a U plane (User Plane) which is the packet data of user data. The S-GW 22 may serve as an anchor point of the wireless access network of 3GPP (eNB, 2G/3G), and perform relay processing of user packet data with the P-GW 23. The P-GW 23 serves as a connection point as to a packet network such as the ISP network 40. The P-GW 23 performs handover of an IP address as to user equipment, user authentication relating to connection to a packet network at the time of Bearer establishment. Further, the P-GW 23 has functions such as QoS (Quality of Service) control in accordance with a PCRF's instructions, accounting data generation, and a DHCP server. The number of each node such as the MME 21, S-GW 22, and P-GW 23 is one or more in the EPC network 20.

The base station 11 is connected to the MME 21 by a U-plane interface called as "S1-MME interface". Also, the base station 11 is connected to the S-GW 22 by an interface called as "S1-U interface". The S-GW 22 and MME 21 are connected by a C-plane interface called as "S11 interface". The S-GW 22 and P-GW 23 are connected by a U-plane interface called as "S5", and an interface for U-plane. Also, the base stations 11 are connected by an interface called as "X2 interface".

The EPC network 20 illustrated in FIG. 1 further includes one or more offload devices (hereafter, referred to as offload gateways (offload GWs: oGWs)) 70 which serve as a node to control offload traffic. With the example illustrated in FIG. 1, an offload GW#A, an offload GW#B, and an offload GW#C are illustrated as examples of the offload GWs 70.

The offload GW 70 is disposed between a base station 11 and an S-GW 22. The installed number of offload GWs 70 may be determined as appropriate. For example, the offload GW 70 may be disposed for each base station 11. The offload GW 70 intercepts a C-plane packet to be transmitted/received between the base station 11 and S-GW 22. The offload GW 70 determines traffic to be offloaded (offload traffic) of U-plane traffic which flows between the base station 11 and S-GW 22.

U-plane data (user packets) in offload traffic of uplink communication (User Equipment (base station 11)→communication partner) branches at the offload GW 70, and is transferred to the offload network 50. The traffic transferred to the offload network 50 is connected to the ISP network 40 without passing through the EPC network 20 (S-GW 22, P-GW 23), and is finally arrived at a target communication partner (e.g., web server 41). On the other hand, the offload GW 70 merges offload traffic in downlink communication (communication partner (offload network 50)→User Equipment 60 (base station 11)) to traffic toward the base station 11 from the S-GW 22.

The User Equipment 60 changes the base station 11 of the own connection destination by moving (handover). The offload GW 70 which receives traffic of uplink from the base station 11 is changed by handover between the base stations 11. For example, the base station 11 connected to the User Equipment 60 is changed from a base station 11A to a base station 11B, and accordingly, the offload GW 70 is changed from the offload GW#A to the offload GW#B.

Offload GW

Figure 2:
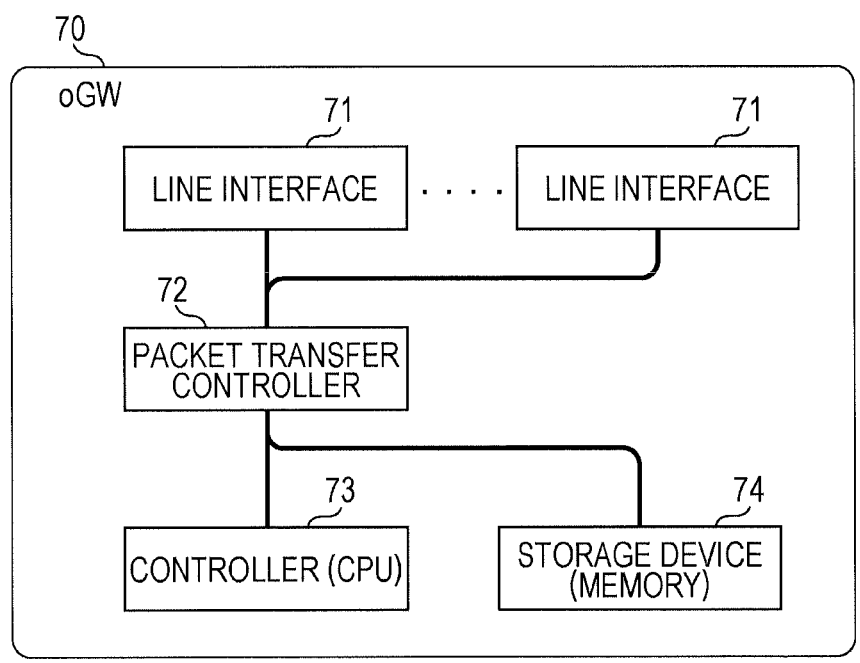
FIG. 2 illustrates a hardware configuration example of an offload GW (oGW)

FIG. 2 illustrates a hardware configuration example of the offload GW (oGW) 70. In FIG. 2, the oGW 70 includes multiple line interfaces 71, a packet transfer controller 72 connected to the line interfaces 71, and a CPU (Central Processing Unit) 73 and a storage device 74 which are connected to the packet transfer controller 72.

The line interfaces 71 accommodate a line connecting the offload GW 70 and base station 11, a line connecting the offload GW 70 and S-GW 22, a line connecting the offload GW 70 and MME 21, and a line connecting the offload GW 70 and offload network 50. With the offload GW 70, one or more line interfaces 71 corresponding to the number of lines which the offload GW 70 accommodates are provided. The line interfaces 71 are formed of a general-purpose or dedicated semiconductor circuit (LSI, ASIC, or the like).

The packet transfer controller 72 performs packet transfer processing. Specifically, the packet transfer controller 72 includes a routing table, calculates an output port corresponding to the destination address of a packet from the routing table, and transmits the packet to the output port. The packet transfer controller 72 is an example of a packet transfer device. The packet transfer controller 72 may be formed as a circuit chip on which a general-purpose or dedicated semiconductor circuit (LSI, ASIC, programmable logic device (PLD), DSP (Digital Signal Processor), or the like) is mounted.

The CPU 73 controls the entire operation of the oGW 70 through the control of the packet transfer controller 72. The CPU 73 is an example of a controller (control unit), and an example of a processor. Note that a controller configured to take charge of the function of the CPU 73 may be realized by application of a dedicated or general-purpose hardware chip. The storage device 74 is formed of, for example, semiconductor memory such as ROM (Read Only Memory), RAM (Random Access Memory), EEPROM (Electrically Erasable Programmable Read-Only Memory), or the like. The storage device 74 provides the work area of the CPU 73, the storage areas of various programs to be executed by the CPU 73, and data to be used at the time of executing a program.

Figure 3:
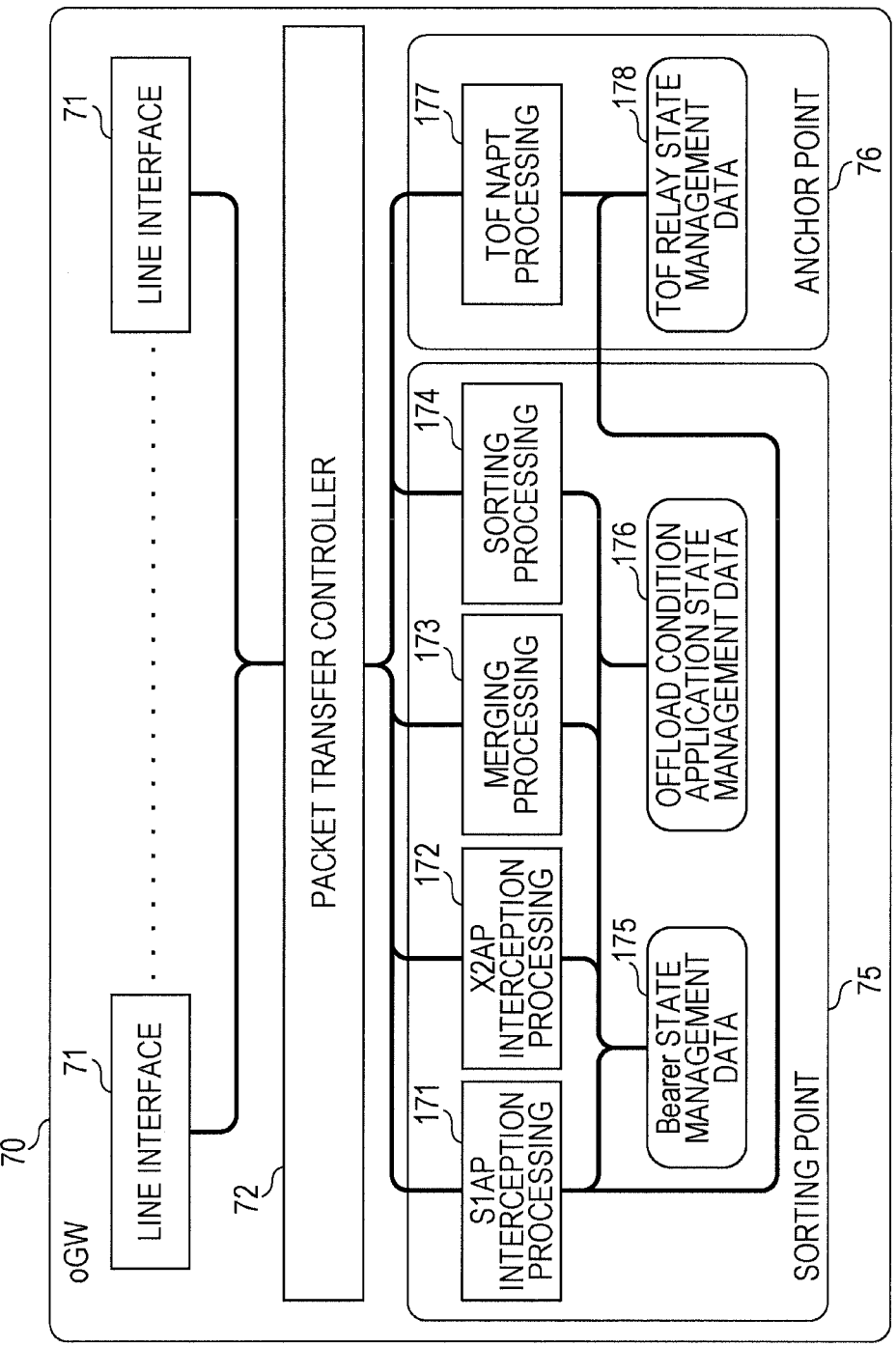
FIG. 3 is an explanatory diagram of a function of an oGW realized by the CPU illustrated in FIG. 2 executing a program stored in a storage device.

FIG. 3 is an explanatory diagram of the function of the oGW 70 to be executed by the CPU 73 illustrated in FIG. 2 executing a program stored in the storage device 74. As illustrated in FIG. 3, the CPU 73 serves as a sorting point (relay point) 75 and an anchor point 76 by the CPU 73 executing the program.

Functions of the sorting point (relay point) 75 include S1AP interception processing 171, X2AP interception processing 172, merging processing 173, and sorting processing 174. Bearer state management data 175 and offload condition application state management data 176 are stored in the storage device 74. The Bearer state management data and offload condition application state management data are used by the sorting point 75.

Functions of the anchor point 76 include TOF (Tramc Omoad Function) NAPT (Network Address Port Translation) processing 177. TOF relay state management data 178 is stored in the storage device 74. The TOF relay state management data is used by the anchor point 76.

Figure 4A:
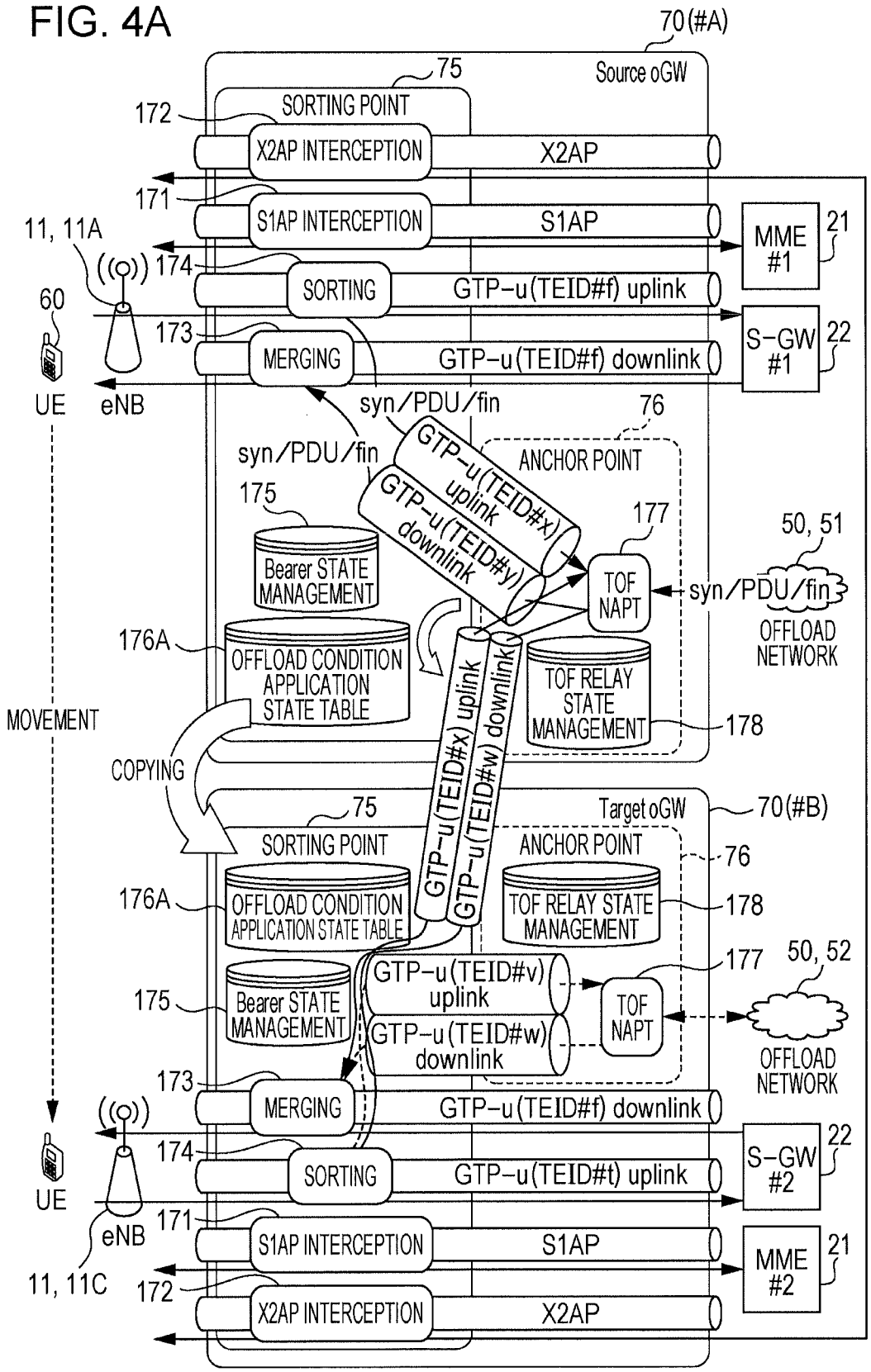
FIG. 4A is an explanatory diagram of a function that the CPU illustrated in FIG. 3 realizes.

FIG. 4A is an explanatory diagram of a function to be executed by the CPU 73 illustrated in FIG. 3. In FIG. 4A, an offload oGW 70 (#A) which is a source oGW, and an offload GW 70 (#B) which is a target oGW are illustrated.

In FIG. 4A, the S1AP interception processing 171 intercepts a control packet based on the S1AP (S1 Application Protocol) to be transmitted/received between the base station 11 and S-GW 22. The S1AP is a C-plane protocol which provides a signaling service between the base station 11 (eUTRAN) and MME 21 (EPC). Examples of functions that the S1AP includes include establishment, change, and release of Bearer, handover control, and incoming control as to standby user equipment.

The X2AP interception processing 172 intercepts a control packet based on the X2AP (X2 Application Protocol) to be transmitted/received to/from the base station 11. The X2AP is a C-plane protocol between base stations (eNodeB) on the X2 interface, and supports load management and handover adjustment between the base stations 11.

The sorting processing 174 causes, of traffic flowing into the GTP-u (GPRS Tunneling Protocol for User Plane) tunnel of uplink, traffic to be traffic offloaded to branch to the TOF NAPT processing 177. GTP-u is a protocol for IP transmission between the base station 11 and S-GW 22. The traffic flows into Bearer (GTP-u tunnel) established between the base station 11 and S-GW 22 based on the GTP-u. Note that TEID (Tunnel Endpoint IDentifier) is an identifier of a terminal point of the GTP-u tunnel to be set in a GTP header of a packet.

The merging processing 173 is to merge offload traffic from the TOF NAPT processing 177 into traffic from the S-GW 22 which flows into the downlink GTP-u tunnel. The TOF NAPT processing 177 of the anchor point 76 performs NAPT processing between the EPC network 20 and offload network 50 (IP address conversion relating to traffic to be offloaded, TCP/UDP port conversion).

With the present embodiment, an oGW 70 to be offloaded between the User Equipment 60 and a communication partner (web server 41 is exemplified) at the time of TCP communication being started is set as a sorting point and an anchor point. For example, as illustrated in FIG. 4A, in the event that the User Equipment 60 connected to a base station 11A has started TCP communication with the web server 41 (FIG. 1), the offload GW#A which executed the offload processing of this TCP communication is set as a sorting point and an anchor point.

Change of a sorting point is caused due to handover in accordance with movement of the User Equipment 60. Specifically, in the event that a base station 11 which is a handover destination of the User Equipment 60 (target base station) is housed in an offload GW 70 different from that of a base station 11 which is a handover source (source base station), the sorting point is changed.

With the present embodiment, user line information of traffic to be offloaded, identification information of communication relating to traffic (TCP connection information in the present embodiment), and position information of an anchor point are transmitted to an oGW 70 serving as a new sorting point (target oGW) from a source offload GW 70 (source oGW).

The target oGW 70 holds the transmitted information, and uses this to transfer traffic to be offloaded to an anchor point, or to transfer traffic received from an anchor point toward the base station 11. Thus, the setting (position) of the anchor point may be maintained regardless of handover while continuing communication (TCP communication).

On the other hand, in the event that TCP communication serving as a new offload target has been started at the target oGW, this target oGW becomes an anchor point in this TCP communication. Also, in the event that the maintained TCP communication has been ended, the setting of the anchor point as to the offload traffic is released (discarded (deleted)).

Note that, as for handover, there are X2-based handover to be carried out within a management range of the same MME 21, and S1-based handover to be performed straddling different MMEs 21. Change of an oGW 70 occurs regarding both the of the X2-based handover and S1-based handover in the event that an offload GW 70 has been installed for each base station 11.

Figure 4B:
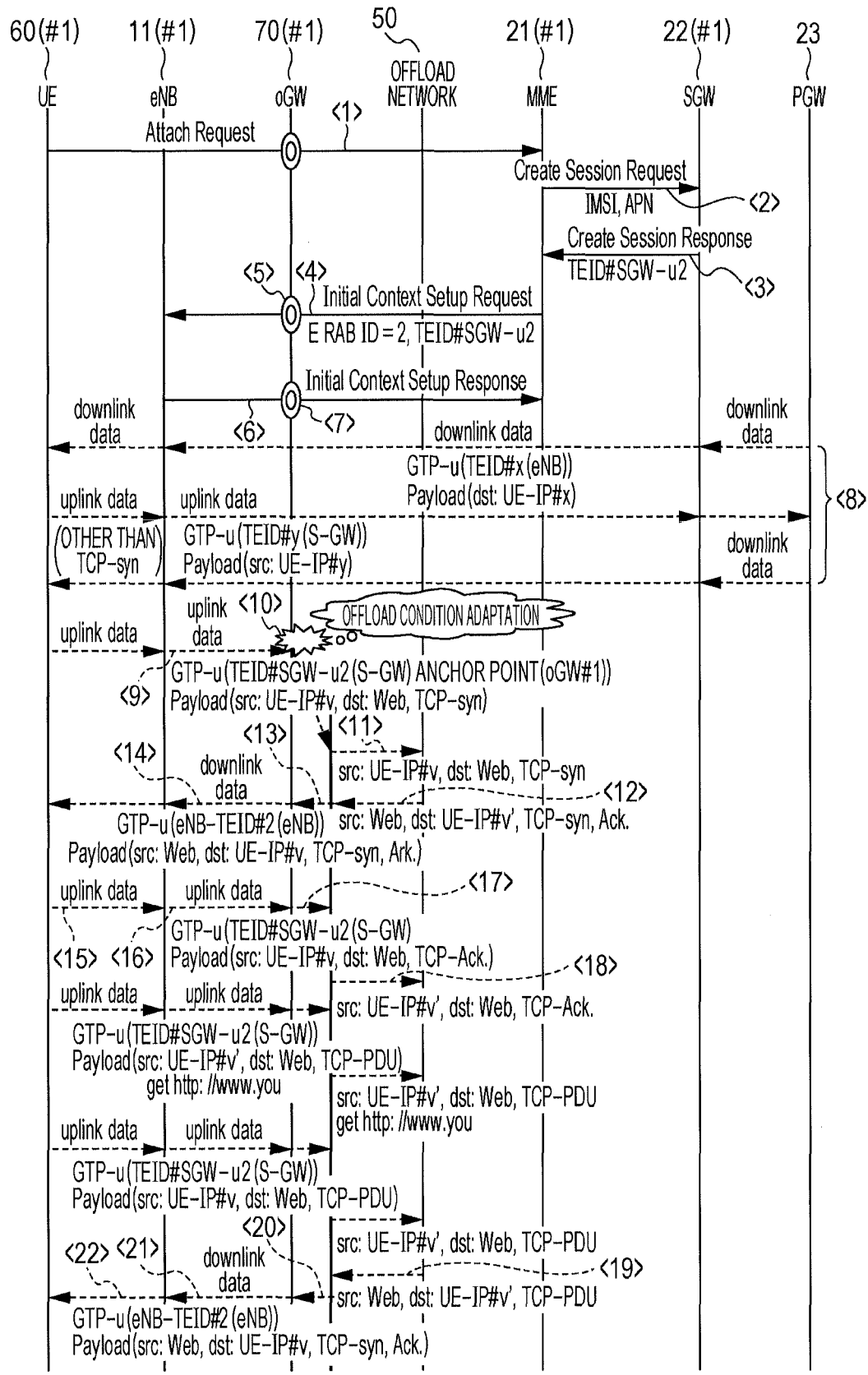
FIG. 4B illustrates a sequence example from activation of User Equipment until start of offload communication.

Hereafter, further details of the offload oGW 70 will be described. FIG. 4B is a sequence chart illustrating a processing example of the S1-based handover, and FIG. 4D is a sequence chart illustrating a processing example of the X2-based handover. The details of each sequence will be described later.

Offload Condition Application State Data

FIG. 5 indicates a data structure example of the offload condition application state table 176A which holds the offload condition application state data 176 indicated in FIG. 4A. The offload condition application state table 176A stores one or more records including an intra-oGW UE identifier, a user line identifier (E RAB ID), TCP connection information, and offload anchor point information.

"intra-oGW UE identifier" is information to uniquely identify a mobile station (UE) 60 using this offload GW (oGW). "user line identifier" is information to uniquely identify a line within UE 60, and is sync with the line identifier at UE 60 (E RAB ID). "TCP connection information" is connection information of TCP communication to be offloaded with communication between UE 60 and a communication partner (e.g., website#1). With the example in FIG. 5, the TCP connection information includes the identifier, IP address and TCP port number of UE.

"offload anchor point information" is position information of an offload anchor point at a position where TCP communication to be offloaded has been started. With the example in FIG. 5, the offload anchor point information includes TEID relating to offload traffic, and the identifier of an offload GW.

Packets

FIG. 6 indicates a data structure example of a GTP-u packet of uplink (UL capsulated packet) toward an S-GW 22 from a base station (eNB) 11. As indicated in FIG. 6, with the GTP-u packet, an IP packet including user data, a TCP header, and an IP header is capsulated at a GTP-u header, a UDP_G (User Datagram Protocol) header, and an IP_G header. Further, a layer 2 (L2) header and a layer 1 (L1) header are appended to the capsulated packet.

As a destination IP address of an IP packet within GTP-u, the IP address of a target web server has been set, and as for a transmission source IP address, the IP address of User Equipment 60 has been set. On the other hand, the destination IP address of the IP_G header is the IP address of the target S-GW 22, and the transmission source address is the IP address of the base station 11. As for the TEID, a value indicating the S-GW 22 positioned in the terminal point of the GTP tunnel has been set.

FIG. 7 indicates a data structure example of a downlink GTP-u packet (DL capsulated packet) to be transmitted from an S-GW 22 to a base station 11. With the example indicated in FIG. 7, the transmission destination IP address and destination IP address within the IP header and IP_G header become reverse of those in the GTP-u packet indicated in FIG. 6. The TEID indicates a tunnel terminal point within the target base station 11. Also, the data structure example indicated in FIG. 7 is also a data structure example of a GTP-u packet to be transmitted from the sorting point 172 to the base station 11 via the offload network 50.

FIG. 8 is a structure example (data structure example) of a packet to be used when transmitting an uplink packet to be offloaded from an offload GW 70 serving as a sorting point to an offload GW 70 serving as an anchor point (packet toward an UL anchor point). In order to simplify description, a packet employing the GTP-u is exemplified. As for a packet to be transferred between offload GWs, a packet based on a protocol different from the GTP-u may be applicable.

FIG. 9 is a structure example of a packet (UL offload packet) to be used when transmitting an uplink packet to be offloaded from the offload GW 70 serving as an anchor point to the web server 41 (website #a). FIG. 10 is a structure example of a packet (DL offload packet) to be arrived at the offload GW 70 serving as an offload anchor point from the web server 41 (website #a) via the offload network. FIG. 11 is a structure example of a packet (packet toward a DL sorting point) to be used when transmitting information from the offload GW 70 serving as the offload anchor point to the offload GW 70 serving as a sorting point. In order to simplify description, a GTP-u-based packet will be exemplified.

Bearer State Management Data

FIG. 12 is an explanatory diagram of the Bearer state management data 175. With the present embodiment, the Bearer state management data 175 is managed with a Bearer user determination table 175A and a Bearer table 175B. However, the table structure is an example.

The Bearer user determination table 175A (Bearer user determination tables 175a and 175b) is a series of a table. "Intra-offload-GW UE identifier" in the Bearer user determination table 175b is the same value as "Intra-offload-GW UE identifier" in the Bearer user determination table 175a, and is described so as to clearly specify that both are the same record.

"Intra-offload-GW UE identifier" stores information to uniquely identify User Equipment (UE) using this offload GW (oGW). With regard to the same mobile station, the Intra-offload-GW UE identifier having the same value is stored in both of the offload condition application state table 176A (FIG. 5) and the Bearer user determination table 175A.

"Intra-MME UE identifier" is the identifier of UE 60 appended at an MME 21 (MME UE S1AP ID). "MME device identifier" is the identifier of the MME 21 (MME device) which appended the intra-MME UE identifier to UE 60. "intra-eNB UE identifier (S1AP)" is the identifier (eNB UE S1AP ID) of UE 60 appended at a base station 11 (eNB).

"Intra-eNB UE identifier (X2AP)" is the identifier of UE 60 appended at the base station 11 (eNB UE X2AP ID). "eNB device identifier" is the identifier of the base station 11 which appended the intra-eNB UE identifier (S1AP) and intra-eNB UE identifier (X2AP) to UE 60.

"T-Target cell identification information" is handover destination cell identification information selected by a handover source base station 11, received at a handover destination offload GW 70. "intra-T-Target-cell UE identification information" is identification information of UE 60 within the handover destination cell selected by the handover destination base station 11, received at the handover destination offload GW 70. "Target ID" is the identifier of the handover destination base station 11 selected by the handover source base station 11, received at the handover source offload GW 70.

"S-Target cell identification information" is the handover destination cell identification information selected by the handover source base station 11, received at the handover source offload GW 70. "intra-S-Target-cell UE identification information" is identification information of UE 60 within the handover destination cell selected by the handover destination base station 11, received at the handover source offload GW 70.

Bearer Table

The Bearer table 175B indicated in FIG. 12 includes data as described below. "intra-offload-GW UE identifier" is information to uniquely identify UE 60 using an offload GW 70. With regard to the same UE 60, the same value as with "intra-offload-GW UE identifier" of the Bearer user determination table 175A is stored in the Bearer table 175B. "user line identifier" is information to uniquely identify a line within UE 60, and is sync with a line identifier at UE 60 (E RAB ID).

"uplink line assignment information" is destination information of an uplink packet toward an S-GW 22 as to a user line identifier. "downlink line assignment information" is destination information of a downlink packet toward a base station 11, corresponding to a user line identifier. "TOF sorting point position information" is destination information to transmit a packet passed through the offload network 50 from an offload GW 70 serving as an offload anchor point to an offload GW 70 serving as a sorting point. The offload GW 70 serving as a sorting point waits for a packet from the offload GW 70 serving as an anchor point based on this "TOF sorting point position information".

"TOF anchor point position information" is destination information to transmit a packet to be offloaded from an offload GW 70 serving as a sorting point to an offload GW 70 serving as an anchor point. The offload GW 70 serving as a sorting point transmits a packet to the offload GW 70 serving as an offload anchor point based on this "TOF anchor point position information".

TOF Relay State Management Data

Next, a structure example of the TOF relay state management data 178 at an offload anchor point will be described. FIG. 13 indicates a data structure example of the TOF relay management table 178a and a TOF session management table 178b.

In FIG. 13, with the TOF relay management table 178a, "intra-offload-GW-anchor UE identifier" is information to uniquely identify UE 60 within the anchor point of an offload GW (oGW) 70. "user line identifier" is information to uniquely identify a line within UE 60, and is sync with a line identifier (E RAB ID) at UE 60.

"TOF anchor point position" is destination information to transmit a packet to be offloaded from an offload GW 70 serving as a sorting point to an offload GW 70 serving as an offload anchor point. The offload GW 70 serving as an offload anchor point waits for a packet from the offload GW 70 serving as a sorting point based on this "TOF anchor point position".

"TOF sorting point position" is destination information to transmit a packet passed through the offload network 50 from an offload GW 70 serving as an offload anchor point to an offload GW 70 serving as a sorting point. The offload GW 70 serving as an offload anchor point transmits a packet to the offload GW 70 serving as a sorting point based on this "TOF sorting point position".

In FIG. 13, the TOF session management table 178b includes the following information. "intra-offload-GW-anchor UE identifier" is information to uniquely identify UE 60 within the anchor point of an offload GW (oGW) 70. With regard to the same UE 60, the same value as with "intra-offload-GW-anchor UE identifier" stored in the TOF relay management table 178a is stored.

"user line identifier" is information to uniquely identify a line within UE 60, and is sync with the line identifier (E RAB ID) at UE 60. As "UE TCP connection information", the IP address and portion number on the UE 60 side are stored for each session of TCP communication. With "oGW TCP connection information", the IP address and port number on the offload GW 70 side, corresponding to the IP address and port number on the UE 60 side are stored for each session of TCP communication. As "Session state, communication state ("under connection", waiting for uplink (UL) disconnect confirmation, waiting for downlink (DL) disconnect confirmation) for each session of TCP communication is stored.

Messages

Next, data structure examples of principal messages to be exchanged between nodes will be indicated. FIG. 14 indicates a structure example of an Initial Context Setup Request message to be transmitted from an MME 21 to a base station 11 at the time of activation of UE 60. FIG. 15 indicates a structure example of an Initial Context Setup Response message which is a reply message of the Initial Context Setup Request message. The initial Context Setup Response message is transmitted from the base station 11 to MME 21.

FIG. 16 indicates a structure example of a Handover Required message to be transmitted from UE 60 to a source MME 21 at the time of the S1-based handover of the UE 60. FIG. 17 indicates a structure example of a Handover Required message to be transmitted from a target MME 21 to a target base station 11 at the time of the S1-based handover. FIG. 18 indicates a structure example of a Handover Request Ack. message to be sent back to the target MME 21 from the target base station 11 in response to the Handover Request message.

FIG. 19 indicates a structure example of a Handover Command message to be transmitted from a source MME 21 to a source base station (serving base station) 11. FIG. 20 indicates a structure example of a UE Context Release Command message to be transmitted from the source MME 21 to the source base station 11.

FIG. 21 indicates a structure example of an X2AP: Handover Request message to be transferred from the source base station 11 to the target base station 11 via a target offload GW 70, with X2-based handover. FIG. 22 indicates a structure example of an X2AP: Handover Request Ack. message which is a reply message of the X2AP: Handover Request message. The X2AP: Handover Request Ack. message is transmitted from the target base station 11 to the source base station 11 via the target oGW 70. FIG. 23 is a structure example of an X2AP: UE Context Release message.

FIG. 24 indicates a structure example of a Path Switch Request message to be transmitted from the target base station 11 to an MME 21 at the X2-based handover. FIG. 25 indicates a Path Switch Request Ack. message to be transmitted from the MME 21 to the target base station 11 as a reply of the Path Switch Request message.

Processing Flows

Figure 26:
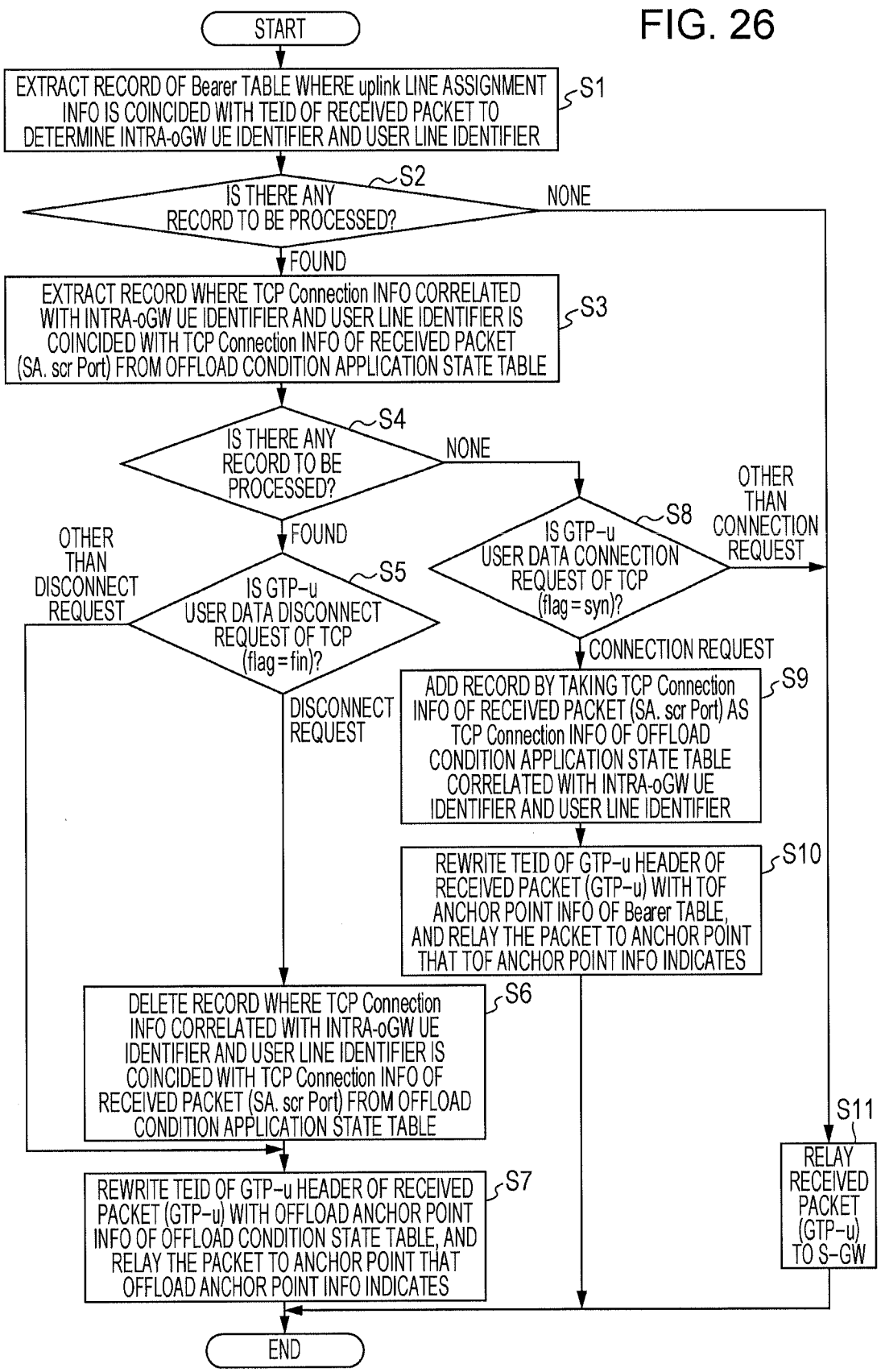
FIG. 26 illustrates a processing flow example at the time of receiving an uplink GTP-u packet (addressed to S-GW)

Next, processing flows at an offload GW 70 will be described. The following processing is executed by the CPU 73 (FIG. 2). FIG. 26 illustrates a processing flow example in the event that an offload GW 70 serving as a sorting point has received an uplink GTP-u packet (FIG. 6) toward an S-GW 22 from a base station 11.

In FIG. 26, first, a record in the Bearer table 175B wherein the uplink line assignment information in the Bearer table 175B (FIG. 12) is coincided with the TEID of a received packet is extracted, and the intra-oGW UE identifier and user line identifier are determined (S1).

Next, determination is made whether or not there is any record to be processed (S2). In the event that there is no record, the processing proceeds to S11, and the received packet (GTP-u) is relayed to the S-GW 22, and the processing in FIG. 26 is ended. On the other hand, in the event that there is a record, the processing proceeds to S3.

In the event that there is a record, a record which corresponds to the intra-oGW UE identifier and user line identifier, and also of which the TCP connection information is coincided with the TCP connection information (source IP address (SA), source port number (scr port)) of the received packet, is extracted from the offload condition application state table 176A (FIG. 5) (S3).

Next, determination is made whether or not there is any record to be processed (S4). In the event that there is a record, the processing proceeds to S5, and in the event that there is no record, the processing proceeds to S8.

In S5, determination is made whether or not the GTP-u user data is a TCP disconnect request (flag=fin). At this time, in the event of a disconnect request, the processing proceeds to S6, and in the event of other than a disconnect request, the processing proceeds to S7.

In S6, a record which corresponds to the intra-oGW UE identifier and user line identifier, and also of which the TCP connection information is coincided with the TCP connection information (source IP address (SA), source port number (scr port)) of the received packet, is deleted from the offload condition application state table 176A (FIG. 5).

In S7, the TEID of the GTP-u header of the received packet (GTP-u) is rewritten with the offload anchor point information of the offload condition application state table 176A, and the packet is relayed to an anchor point that the offload anchor point information indicates. Thereafter, the processing in FIG. 26 is ended.

In S8, determination is made whether or not the GTP-u user data is a TCP connection request (flag=syn). At this time, in the event of other than the connection request, the processing proceeds to S11, and in the event of the connection request, the processing proceeds to S9.

In S9, a record including the TCP connection information of the received packet is added to the offload condition application state table 176A. The TCP connection information of the additional record is correlated with the intra-oGW UE identifier, and user line identifier of User Equipment 60.

In S10, the TEID of the GTP-u header of the received packet (GTP-u) is rewritten with the TOF anchor point position information of the Bearer table 175B. Further, the packet is relayed to an anchor point that the TOF anchor point position information indicates, and the processing in FIG. 26 is ended.

Figure 27:
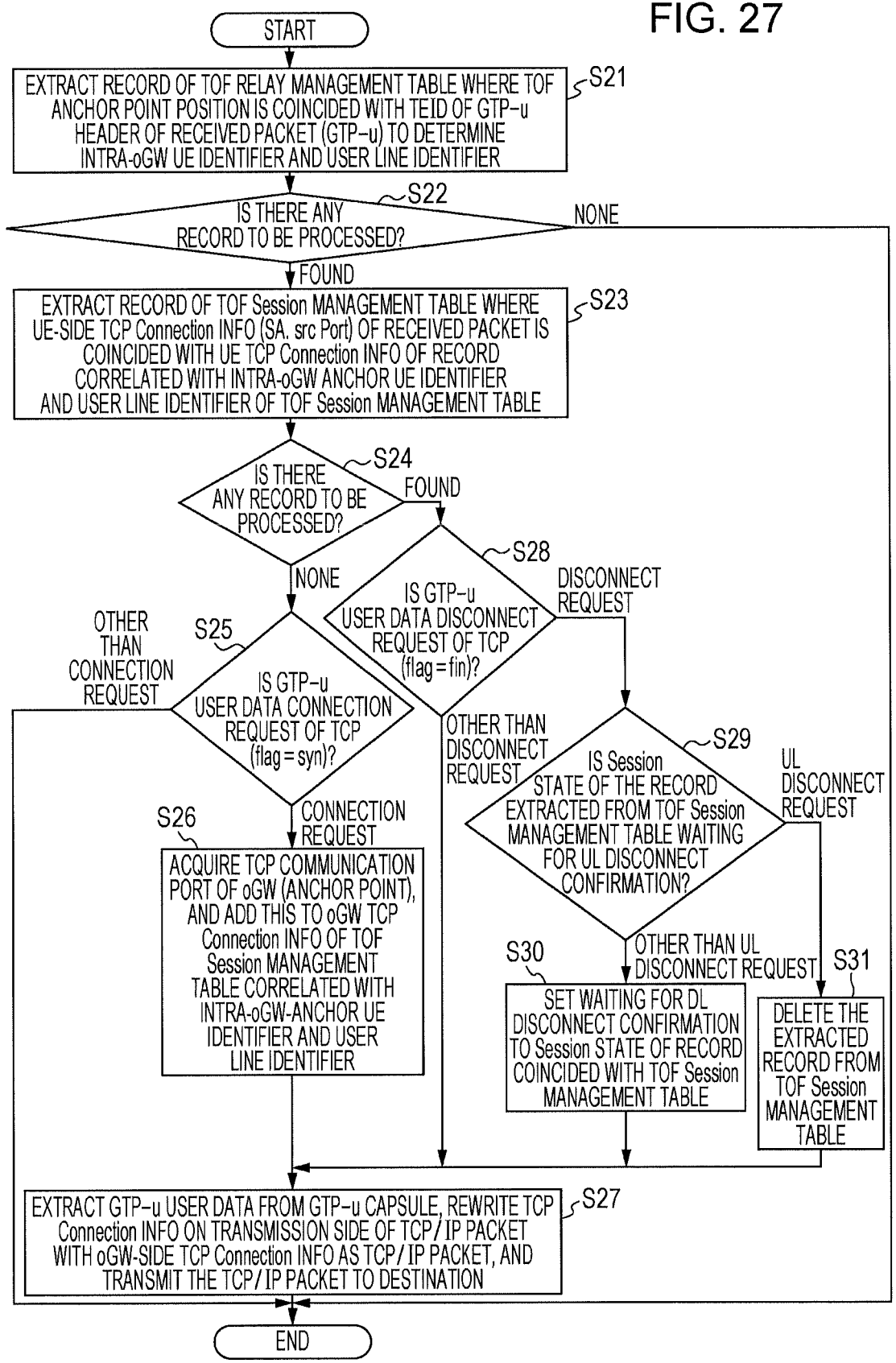
FIG. 27 illustrates a processing flow example at the time of receiving a packet addressed to offload uplink.

FIG. 27 is a processing flow example in the event that an offload GW 70 serving as an offload anchor point has received an uplink packet to be offloaded (FIG. 8) from an offload GW 70 serving as a sorting point.

In FIG. 27, first, a record where the TOF anchor point position in the TOF relay management table 178a (FIG. 13) is coincided with the TEID of the GTP-u header of the received packet is extracted from the TOF relay management table 178a, and the intra-oGW-anchor UE identifier and user line identifier are determined (S21).

Next, determination is made whether or not there is a record to be processed (S22). In the event that there is no record, the processing in FIG. 27 is ended. On the other hand, in the event that there is a record, the processing proceeds to S23.

In S23, a record of the TOF session management table 178b of which the intra-oGW-anchor UE identifier and user line identifier correspond to the UE-side TCP connection information of the received packet and is also coincided with the UE TCP connection information thereof, is extracted.

Next, determination is made whether or not there is a record to be processed (S24). In the event that there is a record, the processing proceeds to S28, and in the event that there is no record, the processing proceeds to S25.

In S25, determination is made whether or not the GTP-u user data is a TCP connection request. At this time, in the event of other than the connection request, the processing in FIG. 27 is ended. On the other hand, in the event of the connection request, the processing proceeds to S26.

In S26, the TCP communication port of an oGW (anchor point) is acquired, a record is added to the TOF session management table 178b in a manner correlated with the intra-oGW-anchor UE identifier and user line identifier. The TCP communication port of the anchor point is stored as oGW TCP connection information of the table 178b.

In S27, the GTP-u user data is extracted from the GTP-u capsule, thereby obtaining a TCP/IP packet. Next, the transmission-side TCP connection information of the TCP/IP packet is rewritten with the oGW-side TCP connection information. The TCP/IP packet is then transmitted to the destination. Thereafter, the processing in FIG. 27 is ended.

In S28, determination is made whether or not the GTP-u user data is a TCP disconnect request. At this time, in the event of other than the disconnect request, the processing proceeds to S27. On the other hand, in the event of the disconnect request, the processing proceeds to S29.

In S29, determination is made whether or not the session state of a record extracted from the TOF session management table 178b is "waiting for UL disconnect confirmation". At this time, in the event of the state of waiting for UL disconnect confirmation, the extracted record is deleted from the TOF session management table 178b (S31), and the processing in FIG. 27 is ended.

On the other hand, in the event of other than waiting for UL disconnect confirmation, "waiting for DL disconnect confirmation" is set as the session state of the concerted record of the TOF session management table 178b (S30). Thereafter, the processing in FIG. 27 is ended.

Figure 28:
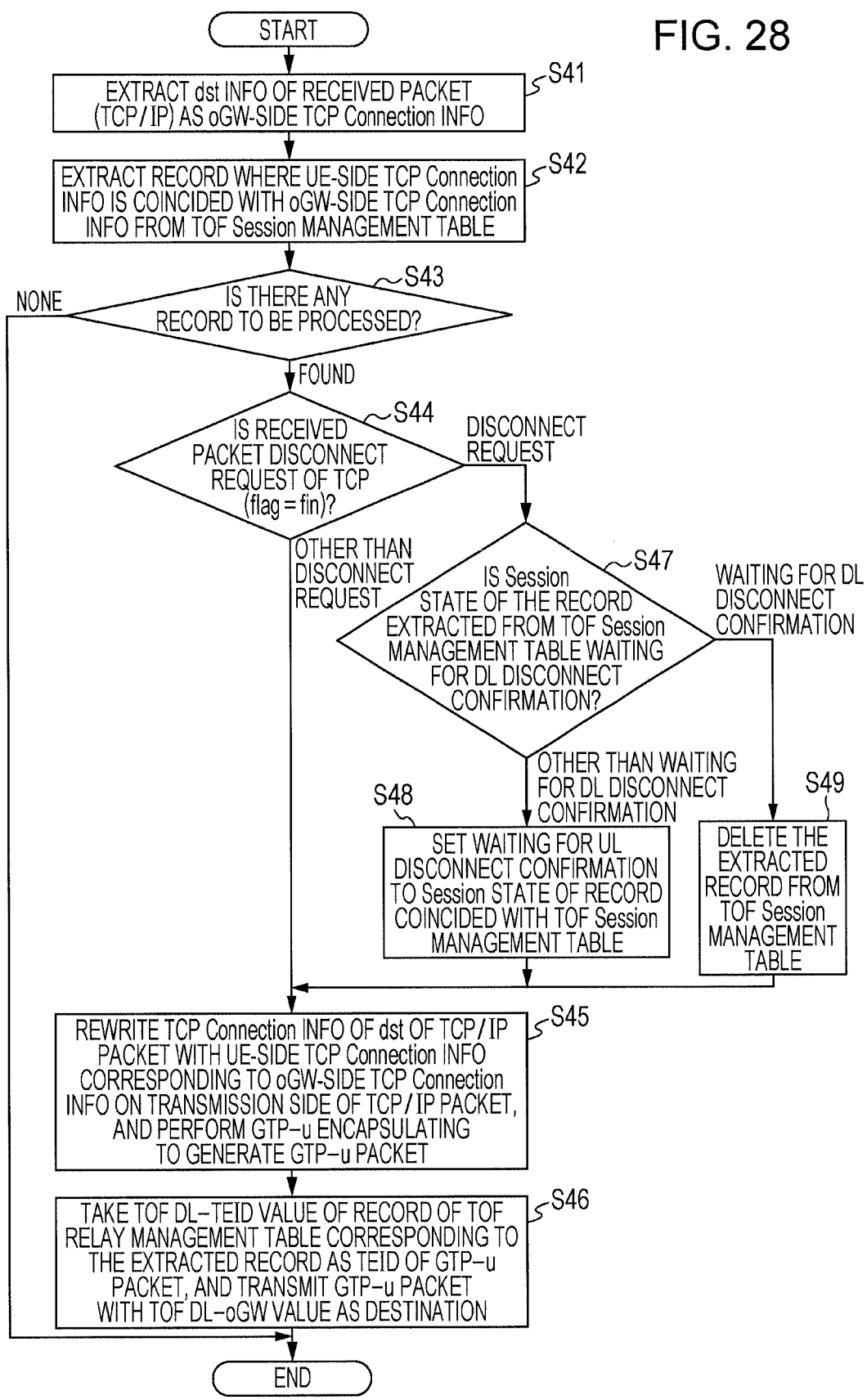
FIG. 28 illustrates a processing flow example at the time of receiving a packet addressed to an offload anchor point from an offload network.

FIG. 28 illustrates a processing flow example in the event that an offload GW 70 serving as an offload anchor point has received a packet addressed to an offload anchor point from the offload network 50. In S41 in FIG. 28, destination information (dst information) of the received packet (TCP/IP) is extracted as oGW-side TCP connection information (S41).

Next, of records of the TOF session management table 178b, a record where the UE-side TCP connection information is coincided with the oGW-side TCP connection information, is searched and extracted (S42).

Next, determination is made whether or not there is a record to be processed (S43). In the event that there is no record, the processing in FIG. 28 is ended. On the other hand, in the event that there is a record, the processing proceeds to S44.

In S44, determination is made whether or not the received packet indicates a TCP disconnect request. At this time, in the event of the disconnect request, the processing proceeds to S47. In the event of other than the disconnect request, the processing proceeds to S45.

In S45, the TCP connection information of the destination of a TCP/IP packet is rewritten with the UE-side TCP connection information corresponding to the oGW-side TCP connection information of the TCP/IP packet. Further, GTP-u capsulation is performed to generate a GTP-u packet (capsulated packet).

In S46, a TOF DL-TEID value (TOF sorting point position) of a record of the TOF relay management table 178a corresponding to the record extracted in S42 is set as the TEID of the GTP-u packet. The GTP-u packet is transmitted with the TOF DL-oGW value as the destination. Thereafter, the processing in FIG. 28 is ended.

In S47, determination is made whether or not the session state of the record extracted from the TOF session management table 178b is "waiting for DL disconnect confirmation". At this time, in the event that the session state is waiting for DL disconnect confirmation, the record extracted from the TOF session management table 178b is deleted (S49). On the other hand, in the event that the session state is other than waiting for DL disconnect confirmation, "waiting for UL disconnect confirmation" is set as the session state of the concerted record in the TOF session management table 178b. Thereafter, the processing in FIG. 28 is ended.

Figure 29:
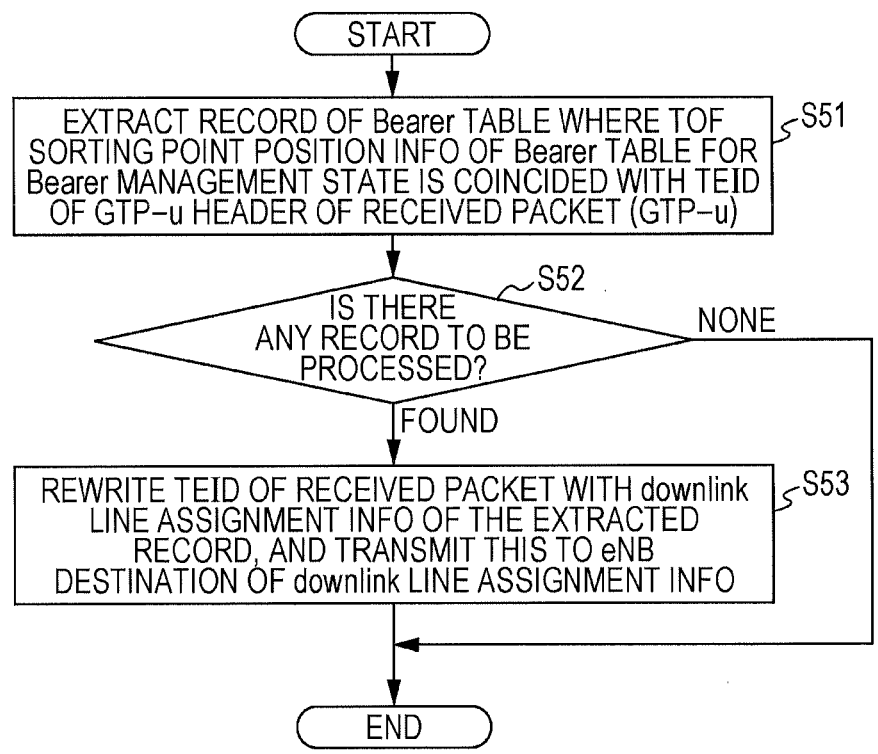
FIG. 29 illustrates a processing flow example at the time of receiving a packet addressed to a downlink offload sorting point.

FIG. 29 is a processing flow example in the event that an offload GW 70 serving as a sorting point has received a downlink packet addressed to User Equipment from an offload GW 70 serving as an offload anchor point.

First, a record where the TOF sorting point position information of the Bearer table 175B of the Bearer management state data 175 is coincided with the TEID of the GTP-u header of the received packet, is extracted from the Bearer table 175B (S51).

Next, determination is made whether or not there is a record to be processed (S52). In the event that there is no record, the processing in FIG. 29 is ended. On the other hand, in the event that there is a record, the TEID of the received packet is rewritten with downlink line assignment information of the record extracted in S51. A packet is then transmitted to the base station 11 (eNB) corresponding to the downlink line assignment information (S53). Thereafter, the processing in FIG. 29 is ended.

Figure 30A:
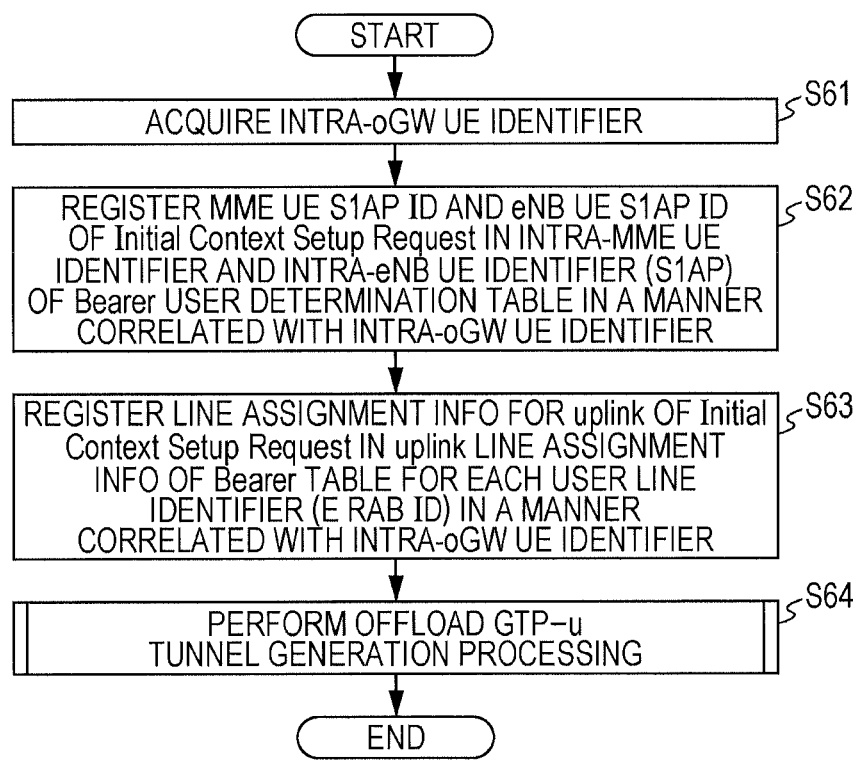
FIG. 30A illustrates a processing flow example at the time of intercepting an Initial Context Setup Request message.

FIG. 30A illustrates a processing flow example when intercepting an Initial Context Setup Request message (MME→eNB) to be executed by the S1AP interception processing 171 of the CPU 73. First, an intra-oGW UE identifier is acquired (S61).

Next, "MME UE S1AP ID" and "eNB UE S1AP ID" of the Initial Context Setup Request message are registered in the intra-MME UE identifier and intra-eNB UE identifier (S1AP) in the Bearer user determination table 175A in a manner correlated with the intra-oGW UE identifier, respectively (S62).

Next, the line assignment information for uplink of the Initial Context Setup message is registered in the uplink assignment information of the Bearer table 175B in a manner correlated with the intra-oGW UE identifier for each user line identifier (E RAB ID) (S63).

Thereafter, the offload GTP-u tunnel generation processing is performed (S64), the processing in FIG. 30A is ended.

FIG. 30B illustrates an example of the GTP-u tunnel generation processing illustrated in FIG. 30A (subroutine). As input of the subroutine, MME UE S1AP ID (UE identifier at the MME) and MMEID (device ID of the MME) are used.

In FIG. 30B, in S64a, the CPU 73 acquires the intra-oGW-anchor UE identifier at the anchor point. Subsequent processing (S64b through S64e) is repeatedly executed for each user line identifier to be offloaded of the user.

The CPU 73 acquires the TOF anchor point position (S64b). Next, the CPU 73 acquires the TOF sorting point position (S64c). Next, the CPU 73 stores the TOF sorting point position and TOF anchor point position in the record in the Bearer table 175B corresponding to the intra-MME UE identifier for each user line identifier as the TOF sorting point position information and TOF anchor point position information (S64d).

Next, the CPU 73 stores the intra-oGW-anchor UE identifier, and for each user line identifier, the TOF sorting point position and TOF anchor point position as the TOF sorting point position and TOF anchor point position within the record of the TOF relay management table 178a of the anchor point (S64e). According to the processing flow in FIG. 30B, a resource to transmit a packet to be offloaded between the sorting point and an offload GW serving as an offload anchor point is generated.

Figure 31:
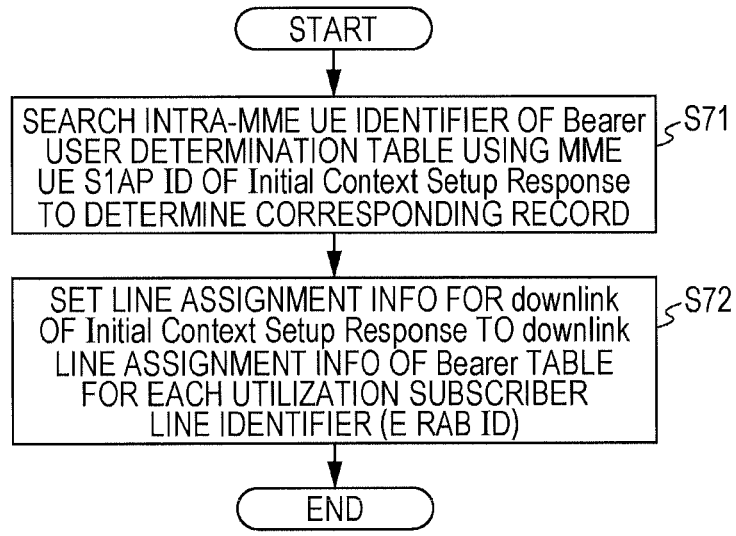
FIG. 31 illustrates a processing flow example at the time of intercepting an Initial Context Setup Response message.

FIG. 31 illustrates a processing flow example when intercepting an Initial Context Setup Response message (eNB→MME) to be executed by the S1AP interception processing 171 of the CPU 73. First, the CPU 73 searches the intra-MME UE identifier in the Bearer user determination table 175A using "MME UE S1AP ID" within the Initial Context Setup Response message to determine the corresponding record (S71).

Next, the CPU 73 sets the line assignment information for downlink within the Initial Context Setup Response message as the downlink assignment information in the Bearer table 175B for each user line identifier (E RAB ID) (S72). Thereafter, the processing in FIG. 31 is ended.

Figure 32:
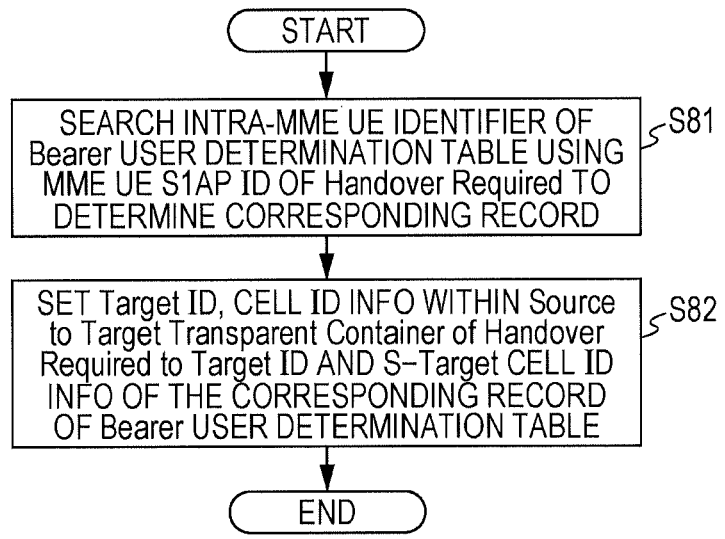
FIG. 32 illustrates a processing flow example at the time of intercepting a Handover Required message.

FIG. 32 illustrates a processing flow example when intercepting a Handover Required message (source eNB→source MME) to be executed by the S1AP interception processing 171 of the CPU 73 at the time of the S1-based handover.

First, the CPU 73 searches the intra-MME UE identifier of the Bearer user determination table 175A using "MME UE S1AP ID" within the Handover Required message to determine the corresponding record (S81).

Next, the CPU 73 sets "Target ID" within the Handover Required message, and the cell identification information within "Source to Target Transparent Container" as "Target ID" and "S-Target cell identification information" of the corresponding record at the Bearer user determination table 175A, respectively (S82). Thereafter, the processing in FIG. 32 is ended.

Figure 33:
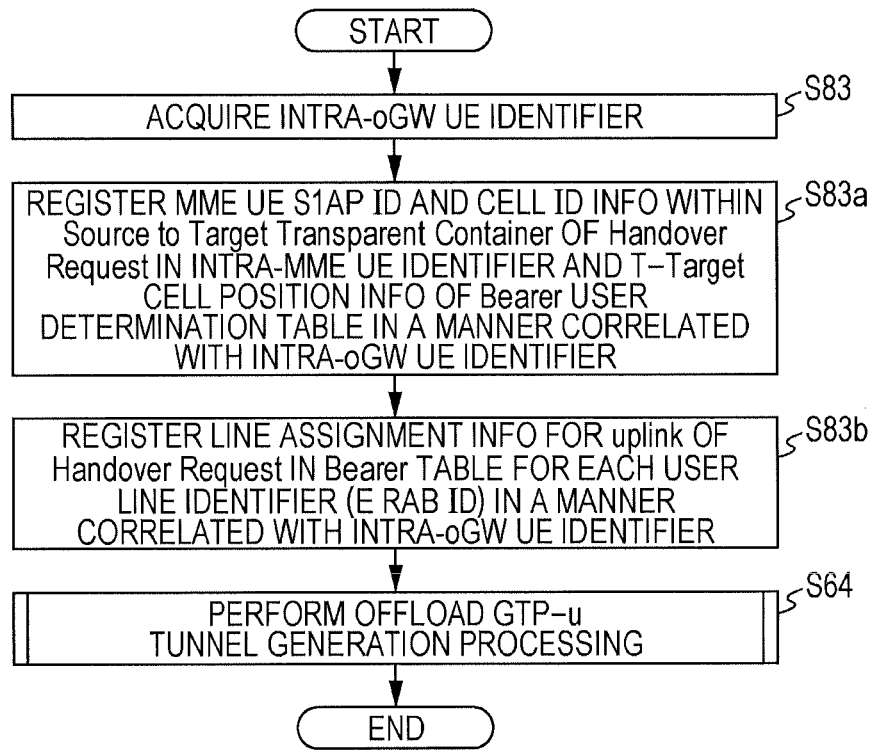
FIG. 33 illustrates a processing flow example at the time of intercepting a Handover Request message.

FIG. 33 illustrates a processing flow example when intercepting a Handover Request message (target MME→target eNB) to be executed by the S1AP interception processing 171 of the CPU 73 at the time of the S1-based handover.

In S83 illustrated in FIG. 33, the CPU 73 acquires the intra-oGW UE identifier. Next, in S83a, the CPU 73 registers "MME UE S1AP ID" within the Handover Request message, "Call ID" information within "Source to Target Transparent Container" in the intra-MME UE identifier and T-Target cell position information of the Bearer user determination table 175A in a manner correlated with the intra-oGW UE identifier.

Next, in S83b, the CPU 73 registers the line assignment information for uplink within the Handover Request message in the Bearer table 175B for each user line identifier in a manner correlated with the intra-oGW UE identifier.

Thereafter, the CPU 73 executes the offload GTP-u tunnel generation processing (S64). Thereafter, the processing in FIG. 33 is ended.

Figure 34:
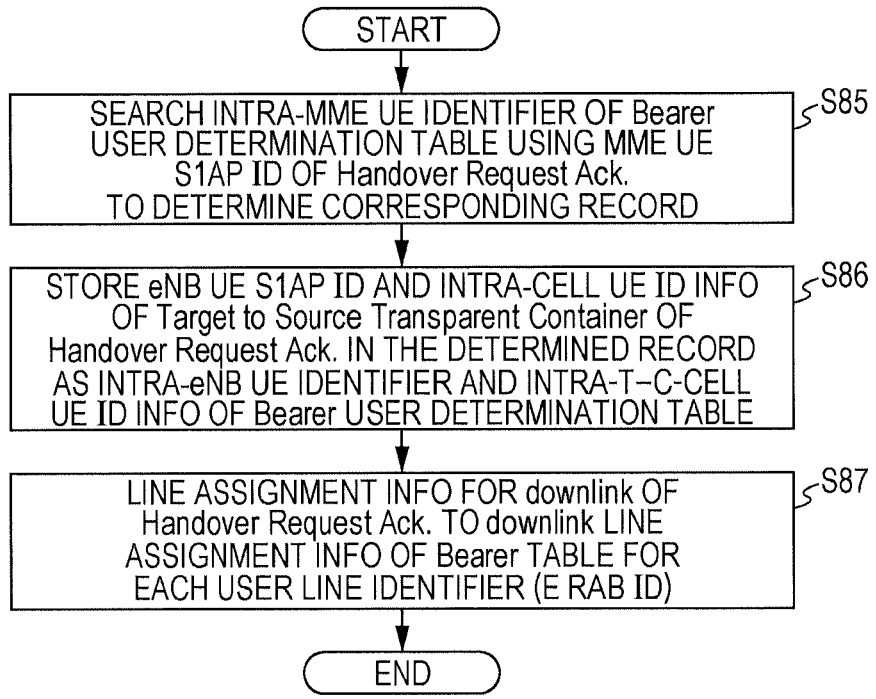
FIG. 34 illustrates a processing flow example at the time of intercepting a Handover Request Ack. message.

FIG. 34 illustrates a processing flow when intercepting a Handover Request Ack. message (target eNB→target MME) to be executed by the S1AP interception processing 171 of the CPU 73 at the time of the S1-based handover.

First, the CPU 73 searches the intra-MME UE identifier of the Bearer user determination table 175A using "MME UE S1AP ID" within the Handover Request Ack. message to determine the corresponding record (S85).

Next, the CPU 73 stores "eNB UE S1AP ID" within the Handover Request Ack. message, and the intra-cell UE identification information within "Target to Source Transparent Container" in the record determined in S85 as the intra-eNB UE identifier and intra-T-Target-cell UE identification information in the Bearer user determination table 175A (S86).

Next, the CPU 73 sets the line assignment information for downlink within the Handover Request Ack. message as the downlink line assignment information in the Bearer table 176B for each user line identifier (S87). Thereafter, the processing in FIG. 34 is ended.

Figure 35A:
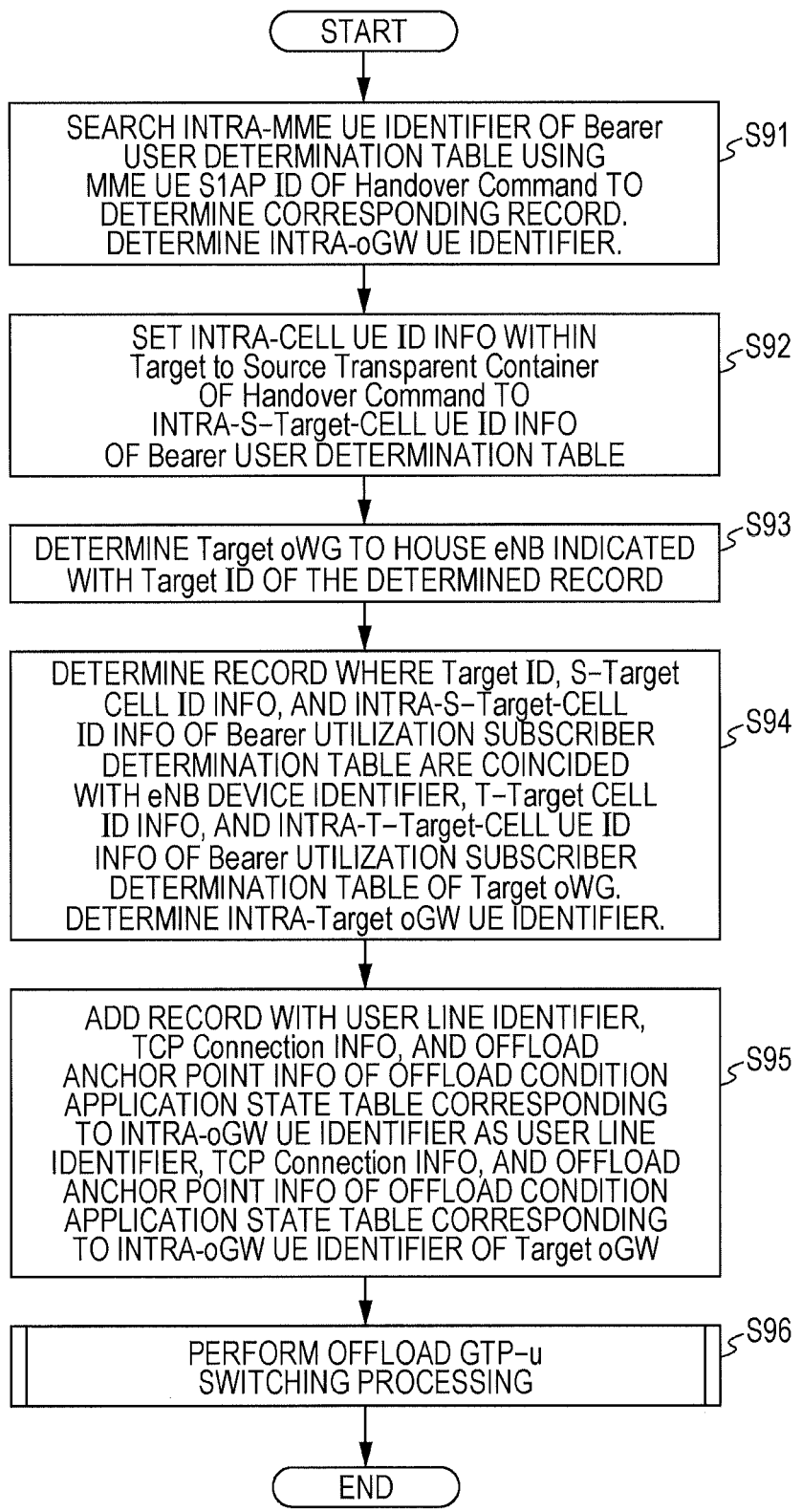
FIG. 35A illustrates a processing flow example at the time of intercepting a Handover Command message.

FIG. 35A illustrates a processing flow example when intercepting a Handover Command message (source MME→source eNB) to be executed by the S1AP interception processing 171 of the CPU 73 at the time of the S1-based handover.

First, the CPU 73 searches the intra-MME UE identifier of the Bearer user determination table 175A using "MME UE S1AP ID" within the Handover Command message to determine the corresponding record, and also to determine the intra-oGW UE identifier (S91).

Next, the CPU 73 sets the intra-cell UE identification information within "Target to Source Transparent Container" within the Handover Command message as the intra-S-Target-cell identification information in the Bearer user determination table 175A (S92).

Next, the CPU 73 determines a target offload GW 70 to house the base station 11 indicted with the Target ID of the determined record (S93).

Next, the CPU 73 determines a record where "Target ID", "S-Target cell identification information", and "intra-S-Target-cell UE identification information" in the Bearer user determination table 175A coincide with "eNB device identifier", "T-Target cell identification information", and "intra-T-Target-cell UE identification information" in the Bearer user determination table 175A in the target oGW 70. Also, the CPU 73 determines the target intra-oGW UE identifier (S94).

Next, the CPU 73 adds a record to the offload condition application state table 176A by taking "user line identifier", "TCP connection information", and "offload anchor point information" within the offload condition application state table 176A corresponding to the intra-oGW UE identifier as "user line identifier", "TCP connection information", and "offload anchor point information" corresponding to the intra-oGW UE identifier of the target offload GW 70 (S95).

Next, the CPU 73 performs the offload GTP-u switching processing (S96). Thereafter, the processing in FIG. 34 is ended.

FIG. 35B illustrates a processing flow example of a subroutine of the offload GTP-u switching processing illustrated in FIG. 35A. The processing in S96a through S96c illustrated in FIG. 35B is repeatedly executed regarding all of the records in the offload condition application state table 176A correlated with the UE of the target oGW.

In S96a, the CPU 73 extracts the TOF sorting point position information corresponding to the user line identifier as to the base station 11 from the Bearer table 175B of the target offload GW 70 to a base station 11.

In S96b, the CPU 73 determines the offload GW 70 serving as the anchor point that the offload anchor point information indicates.

Next, the CPU 73 sets the TOF sorting point position information as the TOF sorting point position of a record where the TOF anchor point position information stored in the TOF relay management table 175a of the anchor point of the anchor point offload GW 70 is coincided with the offload anchor point (S96c). Thereafter, the processing in FIG. 35B is ended.

According to the processing in FIG. 35B, along with handover of UE 60, the transmission destination of a packet that the offload GW 70 serving as the offload anchor point received from the offload network 50 may be switched to the offload GW 70 serving as the sorting point of the handover destination.

Figure 36:
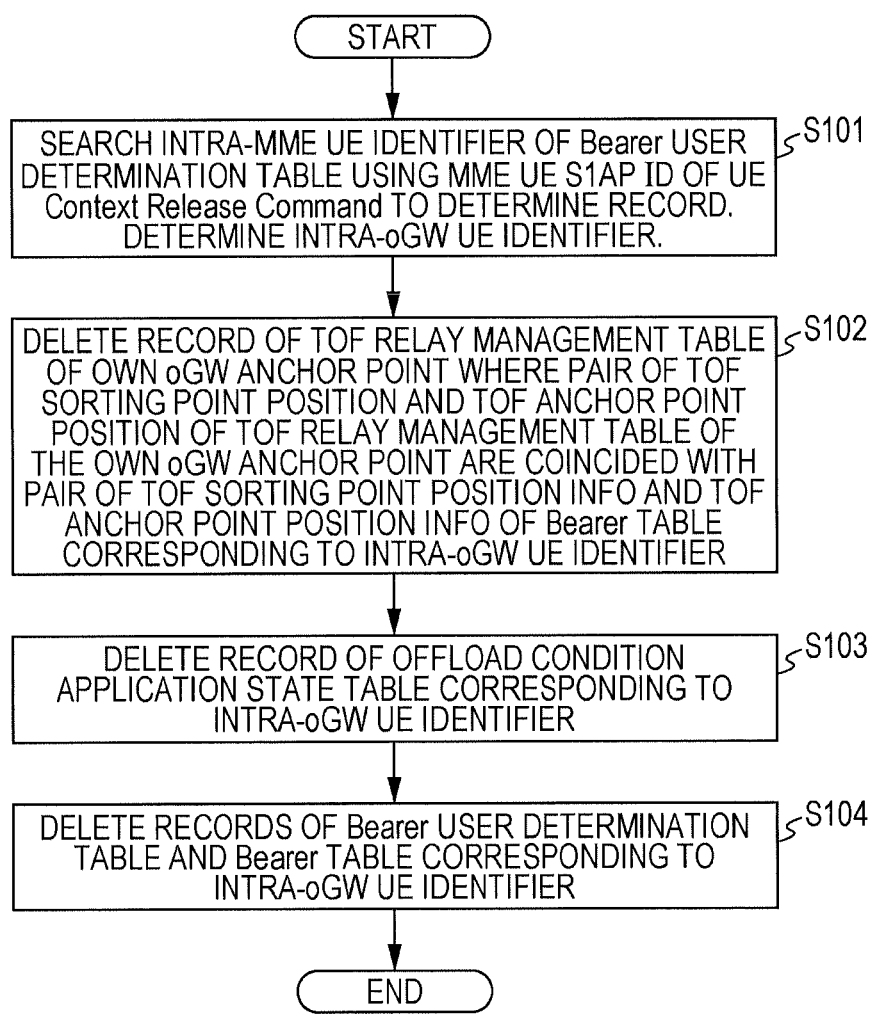
FIG. 36 illustrates a processing flow example at the time of intercepting a UE Context Release Command message.

FIG. 36 illustrates a processing flow example when intercepting a UE Context Release Command message (source MME→source eNB) to be executed by the S1AP interception processing 171 of the CPU 73 at the time of the S1-based handover.

First, the CPU 73 searches the intra-MME UE identifier of the Bearer user determination table 175A using "MME UE S1AP ID" within the UE Context Release Command message to determine the corresponding record, and also to determine the intra-offload-GW UE identifier (S101).

Next, the CPU 73 deletes the record of the TOF relay management table 178a of the own oGW anchor point where a pair of "TOF sorting point position" and "TOF anchor point position" in the TOF relay state management table 178a of the own anchor point coincide with a pair of "TOF sorting point position information" and "TOF anchor point position information" in the bearer table 175B corresponding to the intra-oGW UE identifier (S102).

Next, the CPU 73 deletes the record in the offload condition application state table 176A corresponding to the inter-oGW UE identifier (S103).

Next, the CPU 73 deletes records of the Bearer user determination table 175A and Bearer table 175B, corresponding to the intra-oGW UE identifier (S104). Thereafter, the processing in FIG. 36 is ended.

Figure 37:
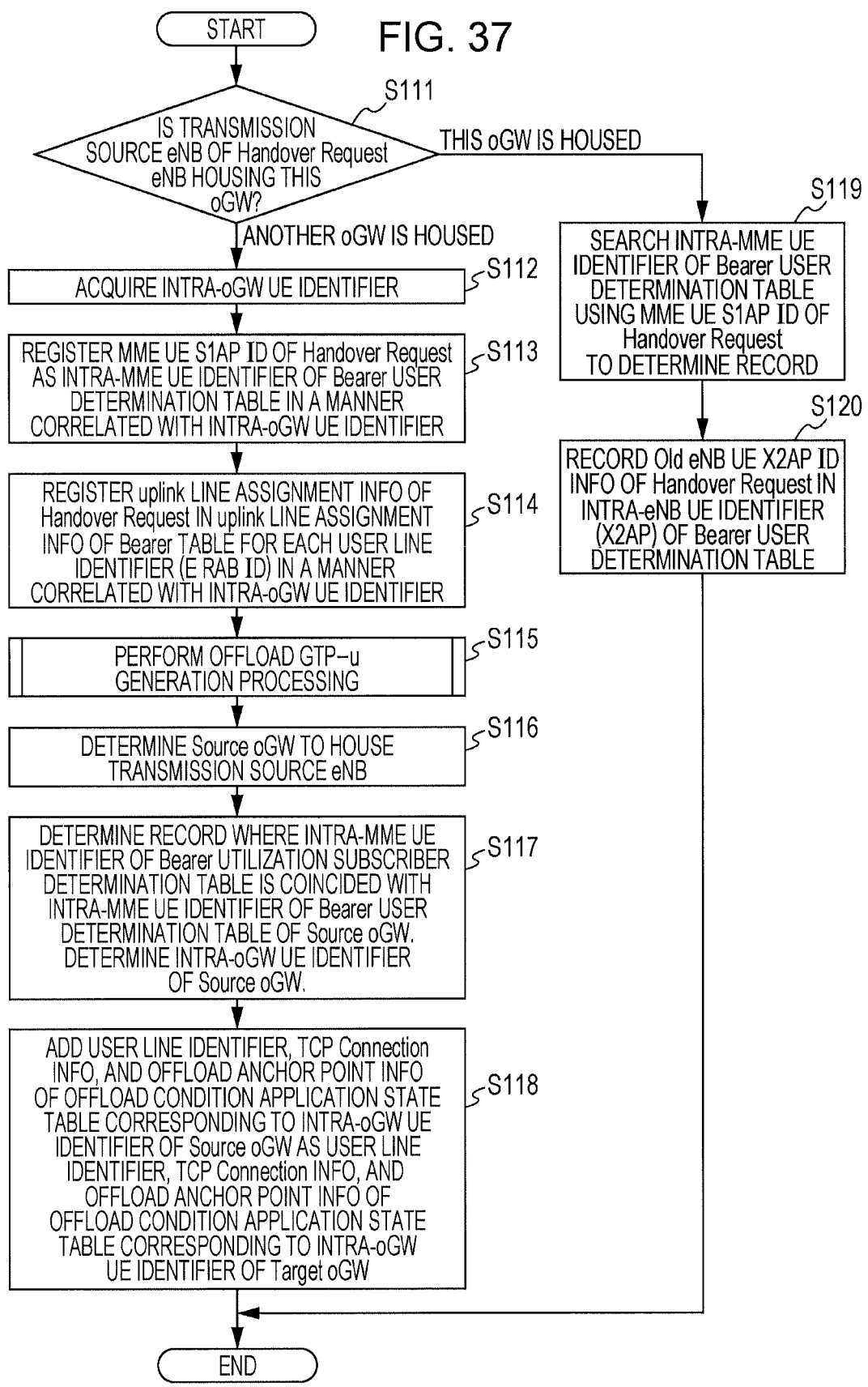
FIG. 37 illustrates a processing flow example at the time of intercepting an X2AP: Handover Request message.

FIG. 37 illustrates a processing flow example when intercepting an X2AP: Handover Request message (source eNB→target eNB) to be executed by the X2AP interception processing 172 of the CPU 73 at the time of the X2-based handover.

First, the CPU 73 determines whether or not the base station 11 serving as the Handover Request transmission source is a base station 11 which the own oGW houses (S111). In the event that the base station 11 is housed in the own oGW, the processing proceeds to S119. On the other hand, in the event that the base station 11 is housed in another oGW, the processing proceeds to S112.

In S112, the CPU 73 acquires the intra-oGW UE identifier. Next, the CPU 73 correlates "MME UE S1AP ID" within the Handover Request with the intra-oGW UE identifier. Further, the CPU 73 registers "MME UE S1AP ID" as the intra-MME UE identifier of the Bearer user determination table 175A (S113).

Next, the CPU 73 correlates the uplink line assignment information within the Handover Request with the intra-oGW UE identifier. Further, the CPU 73 registers the uplink line assignment information within the Handover Request in the uplink line assignment information in the Bearer table 175B for each user line identifier (S114).

Next, the CPU 73 performs the offload GTP-u tunnel generation processing (FIG. 30B) (S115).

Next, the CPU 73 determines the source offload GW 70 which houses the transmission source base station 11 (S116).

Next, the CPU 73 determines a record where the intra-MME UE identifier in the Bearer user determination table 175A is coincided with the intra-MME UE identifier information in the Bearer user determination table 175A of the source offload GW 70 (S117). Thus, the UE identifier within the source offload GW is determined (S117).

Next, the CPU 73 adds the user line identifier, TCP connection information, and offload anchor point information in the offload condition application state table 176A, correlated with the intra-oGW UE identifier of the source offload GW 70 as the user line identifier, TCP connection information, and offload anchor point information in the offload condition application state table 176A, correlated with the intra-oGW UE identifier of the target offload GW 70 (S118).

In S119, the CPU 73 searches the intra-MME UE identifier in the Bearer user determination table 175A using "MME UE S1AP ID" within the Handover Request message to determine the corresponding record.

In S120, the CPU 73 records "Old eNB UE X2AP ID" information within the Handover Request message in "intra-eNB UE identifier (X2AP)" in the Bearer user determination table 175A. Thereafter, the processing in FIG. 37 is ended.

Figure 38:
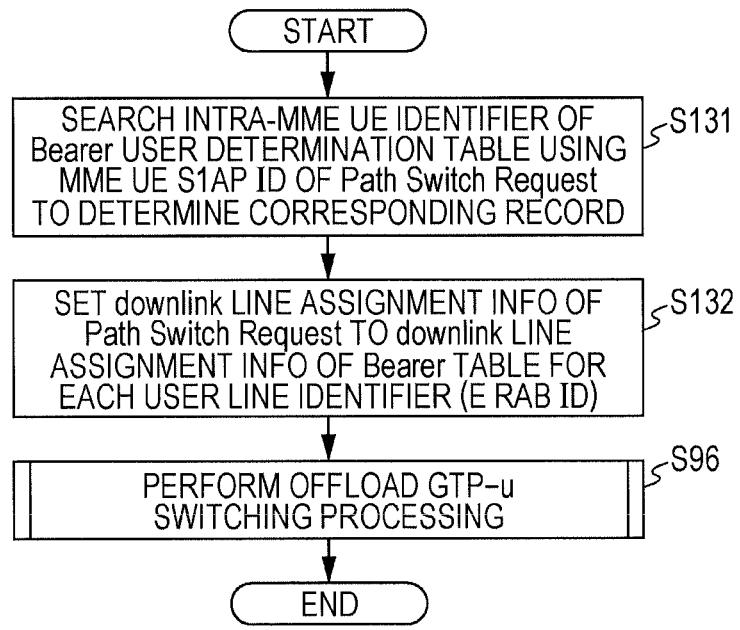
FIG. 38 illustrates a processing flow example at the time of intercepting a Path Switch Request message.

FIG. 38 illustrates a processing flow example when intercepting a Path Switch Request message (target eNB→MME) to be executed by the X2AP interception processing 172 of the CPU 73 at the time of the X2-based handover.

In FIG. 38, in S131, the CPU 73 searches the intra-MME UE identifier of the Bearer user determination table 175A using MME UE S1AP ID within the Path Switch Request message to determine the corresponding record.

In the next S132, the CPU 73 sets downlink line assignment information within the Path Switch Request message as the downlink line assignment information of the Bearer table 175B for each user line identifier. Thereafter, the offload GTP-u switching processing is executed (S96: see FIG. 35B).

Figure 39:
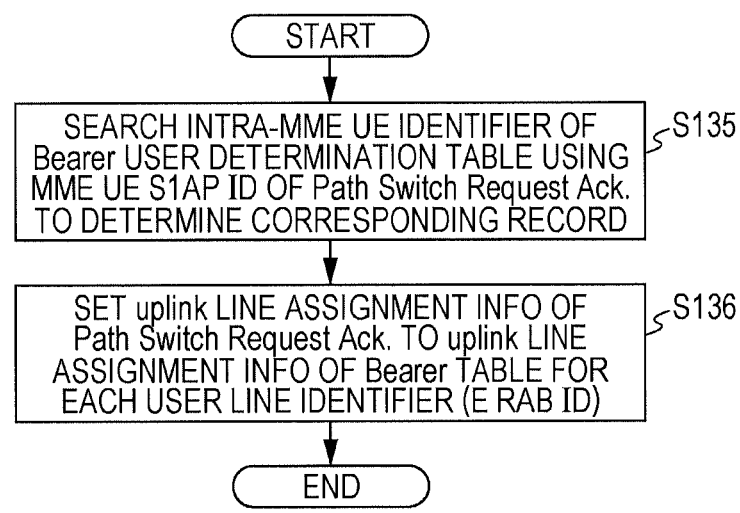
FIG. 39 illustrates a processing flow example at the time of intercepting a Path Switch Request Ack. message.

FIG. 39 illustrates a processing flow example when intercepting a Path Switch Request Ack. message (MME→target eNB) to be executed by the X2AP interception processing 172 of the CPU 73 at the time of the X2-based handover.

In FIG. 39, in S135, the CPU 73 searches the intra-MME UE identifier of the Bearer user determination table 175A using MME UE S1AP ID within the Path Switch Request Ack. message to determine the corresponding record.

In the next S136, the CPU 73 sets uplink line assignment information within the Path Switch Request Ack. message as the uplink line assignment information of the Bearer table 175B for each user line identifier. Thereafter, the processing in FIG. 39 is ended.

Figure 40:
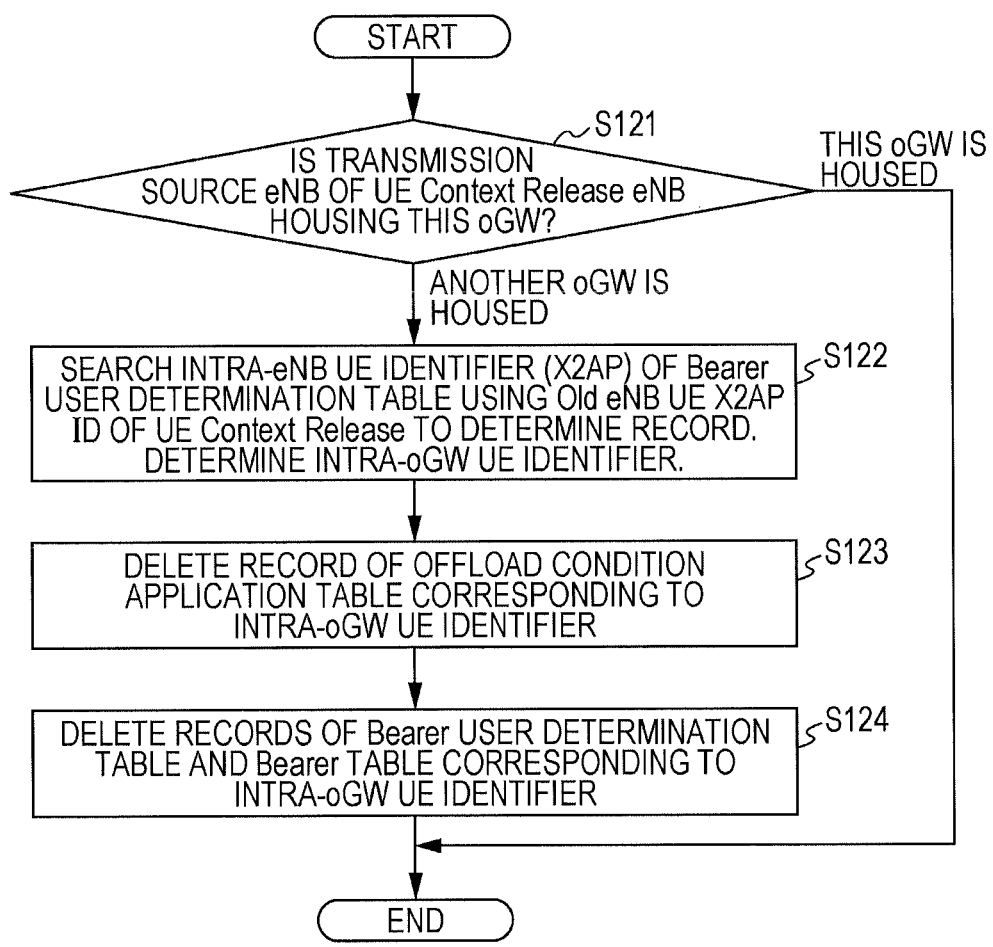
FIG. 40 illustrates a processing flow example at the time of intercepting an X2AP: UE Context Release message.

FIG. 40 illustrates a processing flow example when intercepting an X2AP: UE Context Release message (target eNB→source eNB) to be executed by the X2AP interception processing 172 of the CPU 73 at the time of the X2-based handover.

In FIG. 40, in S121, the CPU 73 determines whether or not the base station 11 serving as the UE Context Release transmission source is a base station which this offload GW 70 houses. At this time, in the event of a base station housed by this offload GW 70, the processing in FIG. 40 is ended.

On the other hand, in the event that the base station 11 is housed in another offload GW 70, the CPU 73 searches the intra-eNB UE identifier (X2AP) in the Bearer user determination table 175A using "Old eNB UE X2AP ID" within the UE Context Release to determine the corresponding record, and also to determine the intra-oGW UE identifier (S122).

In the next S123, the CPU 73 deletes the record in the offload condition application state table 176A corresponding to the intra-oGW UE identifier. In the next S124, the CPU 73 deletes records of the Bearer user determination table 175A and Bearer table 175B corresponding to the intra-oGW UE identifier. Thereafter, the processing in FIG. 40 is ended.

eNB Housing Table

FIG. 101 indicates a structure example of oGW information housing an eNB 11 that an oGW 70 holds at the storage device 74. The CPU 73 of the oGW 70 may calculate an oGW 70 which houses an eNB 11 using the eNB housing table indicated in FIG. 101. The eNB housing table is, with an oGW 70, used for determining an oGW 70 which becomes a sorting point due to handover of UE 60, for example.

OPERATION EXAMPLES

Hereafter, operation examples of the first embodiment will be described with reference to the drawings.

Operation Example 1

Generation of TCP Connection

First, description will be made regarding operation after User Equipment 60 is activated until TCP communication to be offloaded is offloaded.

Operation 1-1: With the sequence in FIG. 4B, upon User Equipment 60 (UE#x) being activated, the UE 60 performs an Attach procedure. Specifically, User Equipment transmits an Attach Request message which is a connection request message to a base station 11 (<1> in FIG. 4B). The Attach Request message is transmitted to an MME 21 (MME#1) via the base station 11 (eNB#1).

The MME 21 transmits a Create Session Request message to an S-GW (SGW) 22 (S-GW#1) (<2> in FIG. 4B). The MME 21 receives a Create Session Response message from the S-GW 22 (<3> in FIG. 4B).

Operation 1-2: The MME 21 which has received the Create Session Response message from the S-GW 22 generates an Initial Context Setup Request message (FIG. 14), and transmits this to the base station 11 (<4> in FIG. 4B). An offload GW (oGW) 70 intercepts the Initial Context Setup Request message (<5> in FIG. 4B).

Specifically, the offload GW executes the processing illustrated in FIGS. 30A and 30B. According to the processing illustrated in FIG. 30A, intra-oGW UE identifier (8000), intra-MME UE identifier (MME#1 UE S1AP ID#x), MME device identifier (MME#1), intra-eNB UE identifier (eNB UE S1AP ID#x), eNB device identifier (eNB#1), user line identifiers (1, 2), uplink line assignment information (1:

TEID#SGW-u1, SGW#1, 2: TEID#SGW-u2, SGW#1), TOF sorting point position information (1: offload non-application, 2: TOF DL-TEID#1), and TOF anchor point position information (TOF UL-TEID#1, oGW#1) are registered in the Bearer user determination table 175A and Bearer table 175B, and are determined (see the tables 175A and 175B indicated in FIG. 41).

Also, according to the processing illustrated in FIG. 30B, an offload GTP-u tunnel is established between a sorting point 75 and an anchor point 76 within the offload GW 70.

Operation 1-3: Also, according to the CPU 73 of the offload GW 70, the storage contents of the TOF relay management table 178a becomes the state illustrated in FIG. 42. Specifically, with the TOF relay management table 178a, the intra-oGW-anchor UE identifier, user line identifier, TOF anchor point position, and TOF sorting point position are determined.

Operation 1-4: The base station 11 which has received the Initial Context Setup Request message transmits an Initial Context Setup Response message which is a reply message (FIG. 15) (<6> in FIG. 4B). The offload GW 70 intercepts the Initial Context Setup Response message (<7> in FIG. 4B), and executes the processing illustrated in FIG. 31. Thus, downlink line assignment information (1: eNB-TEID#1, eNB#1, 2: eNB-TEID#2, eNB#1) is registered in the Bearer table 175B, and is determined (see FIG. 41).

Operation 1-5: Next, with the sequence in FIG. 4B, upon the UE 60 starting connection with a website (<8> in FIG. 4B), a GTP-u packet (FIG. 5) is transmitted from the based station 11 (eNB#1) to the S-GW 22 (S-GW#1) (<9> in FIG. 4B). Thereupon, the offload GW 70 (oGW#1) receives the GTP-u packet, and performs the processing illustrated in FIG. 26. At this time, the processing in S1 through S4 and S8 through S10 in FIG. 26 is executed.

Operation 1-6: According to the processing in S9 in FIG. 26, TCP connection information and offload anchor point information, corresponding to the intra-oGW UE identifier and user line identifier are stored in the offload condition application state table 176A (see the table 176A in FIG. 43).

Operation 1-7: According to the processing in S10 in FIG. 26, a packet for the offload anchor point illustrated in FIG. 8 is generated, and the packet is transmitted from an offload GW 70 serving as a sorting point to an offload GW 70 serving as an anchor point. Here, within the offload GW 70 (oGW#1), the packet is transferred from the sorting point 75 to the anchor point 76.

Operation 1-8: With the anchor point 76, the processing illustrated in FIG. 27 is executed. Here, the processing in S21 through S27 is executed, and a TCP/IP packet (FIG. 9) is transmitted to the offload network 50 toward the website (<11> in FIG. 4B).

According to the processing in S26, UE TCP connection information, oGW TCP connection information, and session state, corresponding to the intra-oGW-anchor UE identifier and user line identifier are stored in the TOF session management table 178b (see FIG. 42).

Operation 1-9: Upon the TCP/IP packet arriving at the website via the offload network 50, a downlink packet (FIG. 10) arrives at the anchor point 76 of the offload GW 70 (oGW#1) from the website via the offload network 50 (<12> in FIG. 4B). According to reception of the packet, the anchor point 76 performs the processing (S41 through S46) illustrated in FIG. 28.

Figure 44:
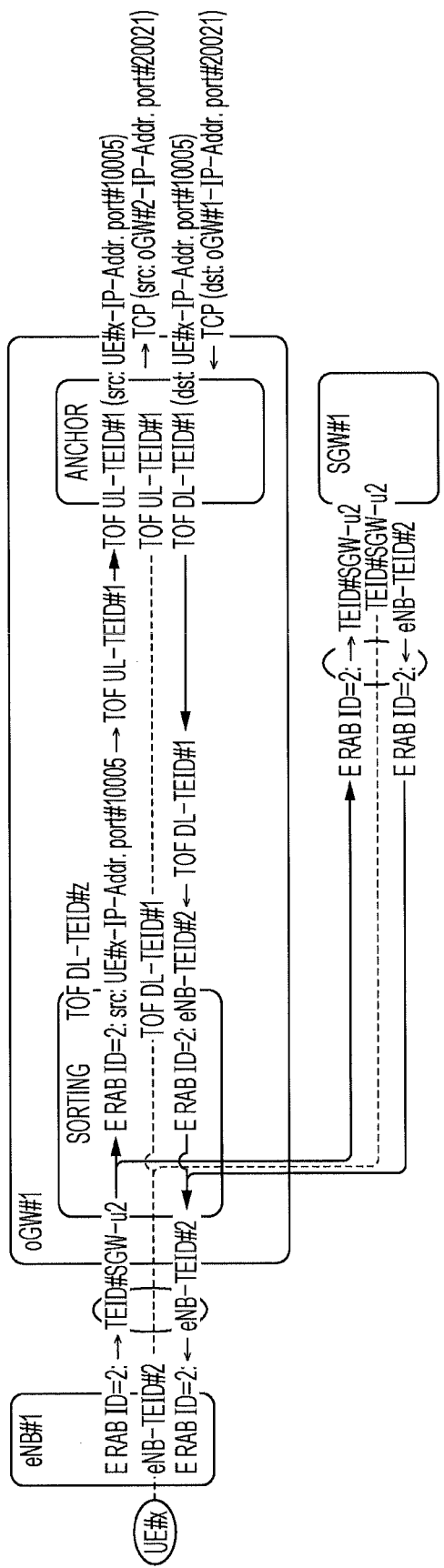
FIG. 44 illustrates an example (traffic flow) of an offload condition application state after generation of a TCP connection.

Operation 1-10: Next, upon the packet indicated in FIG. 11 being transmitted from the offload GW 70 serving as an offload anchor point (oGW#1: anchor point 76) to the offload GW 70 serving as a storing point (GW#1: sorting point 75) (<13> in FIG. 4B), the sorting point 75 (oGW#1) receives the packet, performs the processing illustrated in FIG. 29 (S51 through S53), and transmits the packet indicated in FIG. 7 to the base station 11 (eNB#1) (<14> in FIG. 4B). Thus, TCP communication is established via the offload network 50 such as illustrated in FIG. 44.

Operation 1-11: Uplink data toward the website from User Equipment 60 (hereafter, also referred to as UE#x) is transmitted as follows. Specifically, data from the UE #x received at the eNB#1 (<15> in FIG. 4B) is transmitted from the base station 11 (eNB#1) to the S-GW#1 using the GTP-u packet (FIG. 6) (<16> in FIG. 4B). Upon receiving the packet in FIG. 6, the sorting point 75 (oGW#1) performs the processing in FIG. 26 (including the sorting processing 174) to transmit the packet indicated in FIG. 8 to the anchor point 76 (oGW#1) (<17> in FIG. 4B). Upon receiving the packet indicated in FIG. 8, the anchor point 76 (oGW#1) performs the processing in FIG. 27 to transmit the packet in FIG. 9 to the website via the offload network 50 (<18> in FIG. 4B).

Operation 1-12: The data toward the UE (UE#x) from the website is transmitted as follows. Specifically, the packet indicated in FIG. 10 is transmitted from the website to the offload anchor point 76 (oGW#1) (<19> in FIG. 4B). Upon receiving the packet in FIG. 10, the anchor point 76 (oGW#1) performs the processing in FIG. 28 to transmit the packet in FIG. 11 to the sorting point 75 (oGW#1) (<20> in FIG. 4B). Upon receiving the packet in FIG. 11, the sorting point 75 (oGW#1) performs the processing in FIG. 29 (including the merging processing 173) to transmit the packet in FIG. 7 to the eNB#1 (<21> in FIG. 4B). The eNB#1 transmits the data to the UE#x (<22> in FIG. 4B).

Operation Example 2

Maintaining of TCP Connection for S1-Based Handover

Next, description will be made regarding operation until handover is performed from a handover source base station 11 (also referred to as "Source eNB") to a handover destination base station 11 (also referred to as "Target eNB") in accordance with movement of UE 60 (UE#x) while maintaining TCP communication at the UE 60, in accordance with a sequence that indicates an S1-based handover procedure in FIG. 4C.

Operation 2-1: Upon the Source eNB (eNB#1) starting the S1-based handover in accordance with movement of the UE#x, a Handover Required message (FIG. 16) is transmitted from the Source eNB (eNB#1) to a handover source MME21 (hereafter, referred to as "source MME (MME#1)") (<1> in FIG. 4C). Thereupon, a handover source offload GW (hereafter, referred to as "Source oGW (oGW#1)") intercepts the Handover Required message (<2> in FIG. 4C), and performs the processing illustrated in FIG. 32 (S81 and S82).

Operation 2-2: FIG. 45 illustrates handover of the offload condition application state at the S1-based handover. According to the processing in FIG. 32, the identifier of the handover destination base station 11 "Target ID=eNB#2" and the handover destination cell identification information "S-Target cell identification information=Cell ID#x" within the Handover Required message are registered in the Bearer user determination table 175b of the Source oGW (oGW#1), and determined.

Operation 2-3: The source MME (MME#1) transmits a Forward Relocation Request message to the handover destination MME21 (hereafter, also referred to as "Target MME (MME#2)") (<3> in FIG. 4C). Thereupon, the Target MME (MME#2) transmits the Handover Request message (FIG. 17) to the Target eNB#2 (<4> in FIG. 4C). The handover destination offload GW 70 (hereafter, also referred to as "Target oGW (oGW#2)") intercepts the Handover Request message (<5> in FIG. 4C), and executes the processing illustrated in FIGS. 33 and 30B.

Operation 2-4: According to interception of the Handover Request message, as illustrated in FIG. 45, the Target oGW (oGW#2) stores the intra-oGW UE identifier, intra-MME UE identifier, MME device identifier, eNB device identifier, user line identifier, uplink line assignment information, TOF sorting point position information, TOF anchor point position information, and T-target cell identification information in a Bearer user determination table 175A' (tables 175a' and 175b'), and determines these.

Operation 2-5: Also, the Target oGW (oGW#2) stores, as illustrated in FIG. 46, the intra-oGW-anchor UE identifier, user line identifier, TOF anchor point position, and TOF sorting point position in a TOF relay management table 178a', and determines these.

Operation 2-6: Next, the Target eNB (eNB#2) transmits a Handover Request Ack. message (FIG. 18) to the Target MME (MME#2) (<6> in FIG. 4C). Thereupon, the Target oGW (oGW#2) intercepts the Handover Request Ack. message, and performs the processing in FIG. 34 (<7> in FIG. 4C).

Operation 2-7: According to the processing in FIG. 34, the Target oGW (oGW#2) stores, as illustrated in FIG. 45, the downlink line assignment information in a Bearer table 175B', and determines this. Also, the Target oGW (oGW#2) stores the intra-T-Target-cell UE identification information obtained from the Handover Request Ack. message in the Bearer user determination table 175b', and determines this.

Operation 2-8: The Target MME (MME#2) which has received the Handover Request Ack. message transmits a Forward Relocation Response message to the Source MME (MME#1) (<8> in FIG. 4C). Thereupon, the Source MME (MME#1) transmits a Handover Command message (FIG. 19) to the Target eNB (eNB#1) (<9> in FIG. 4C). At this time, the Source oGW (oGW#1) intercepts the Handover Command message (<10> in FIG. 4C), and performs the processing in FIGS. 35A and 35B.

Operation 2-9: According to the processing in FIGS. 35A and 35B, the Source oGW (oGW#1) registers the intra-S-Target-cell UE identification information in the Bearer user determination table 175b, and determines this (see FIG. 45). Thus, the Target ID, S-Target cell identification information, and intra-S-target-cell UE identification information in the Bearer user determination table 175A of the Source oGW (oGW#1) coincide with the eNB device identifier, T-Target cell identification information, and intra-T-Target-cell UE identification information in the Bearer user determination table 175A' of the Target oGW (oGW#2). Accordingly, the intra-oGW UE identifier (8000) of the Source oGW (oGW#1) may be correlated with the intra-oGW UE identifier (8102) of the Target oGW (oGW#2) regarding the UE 60 (UE#x).

Operation 2-10: According to the processing in S95 in FIG. 35A, the oGW#1 registers, as illustrated in FIG. 47, a copy of the user line identifier, TCP connection information, and offload anchor point information corresponding to the intra-oGW UE identifier (8000) in the offload condition application table 176A of the oGW#1 in the offload condition application state table 176A' in a manner correlated with the intra-oGW UE identifier (8102) of the UE#x in the oGW#2 in collaboration with the oGW#2. Thus, the oGW#1 and oGW#2 may recognize offload anchor point information for each traffic to be offloaded.

Operation 2-11: Also, the oGW#1 switches the TOF sorting point position corresponding to the offload anchor point information (TOF UL-TEID#1) in the anchor point 76 of the oGW#1 to the TOF sorting point position information (TOF DL-TEID#2) of the oGW#2 based on the storage contents of the table 178a' (FIG. 46) (see FIG. 46).

Figure 48:
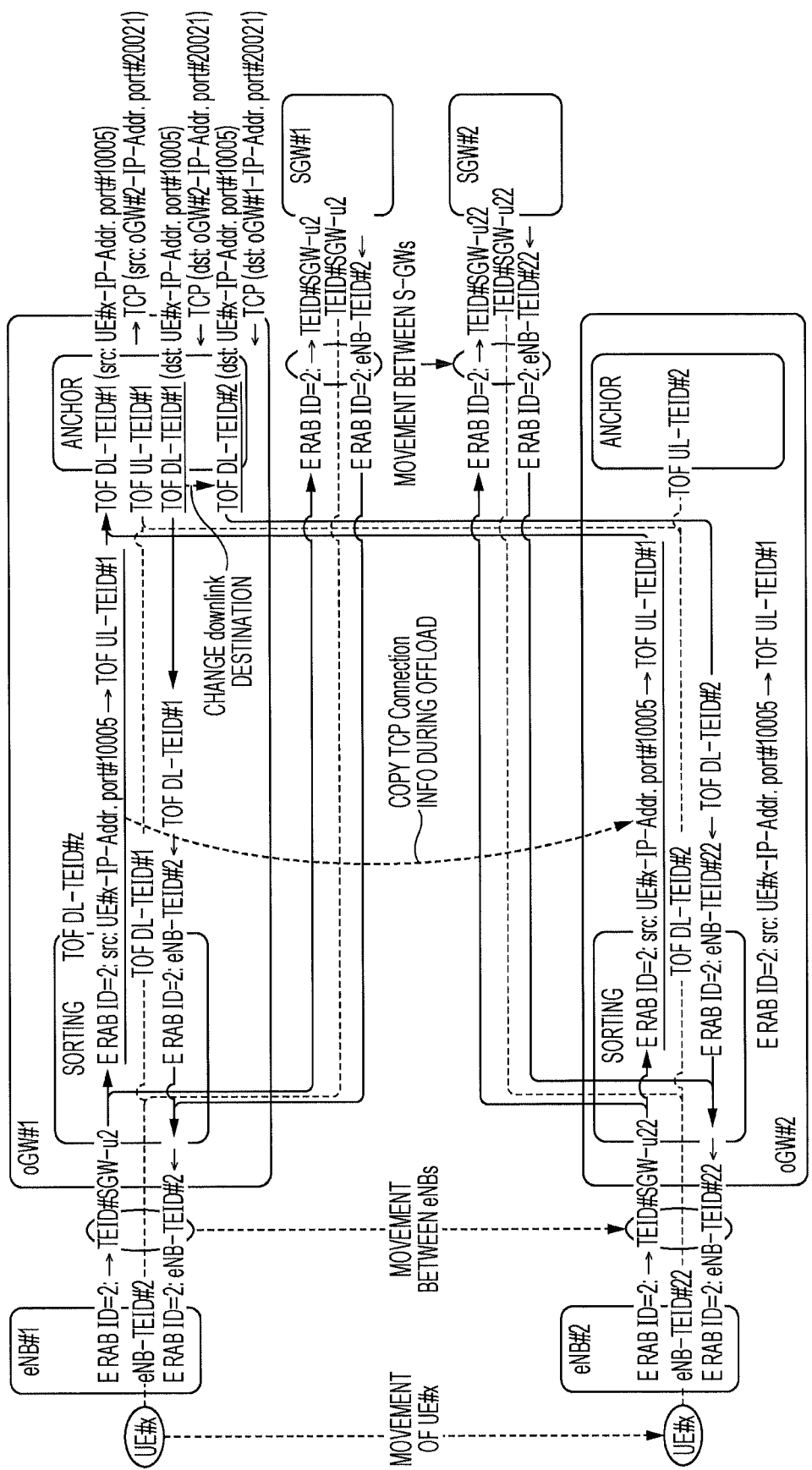
FIG. 48 illustrates an example (traffic flow) of handover of an offload condition application state at the S1-Based Handover.

Thus, as illustrated in FIG. 48, with the S1-based handover in accordance with movement of UE, there is made transition into a path of UE#x→eNB#2→sorting point 75 (oGW#2) →anchor point 76 (oGW#1)→website while maintaining the TCP connection.

Figure 4C:
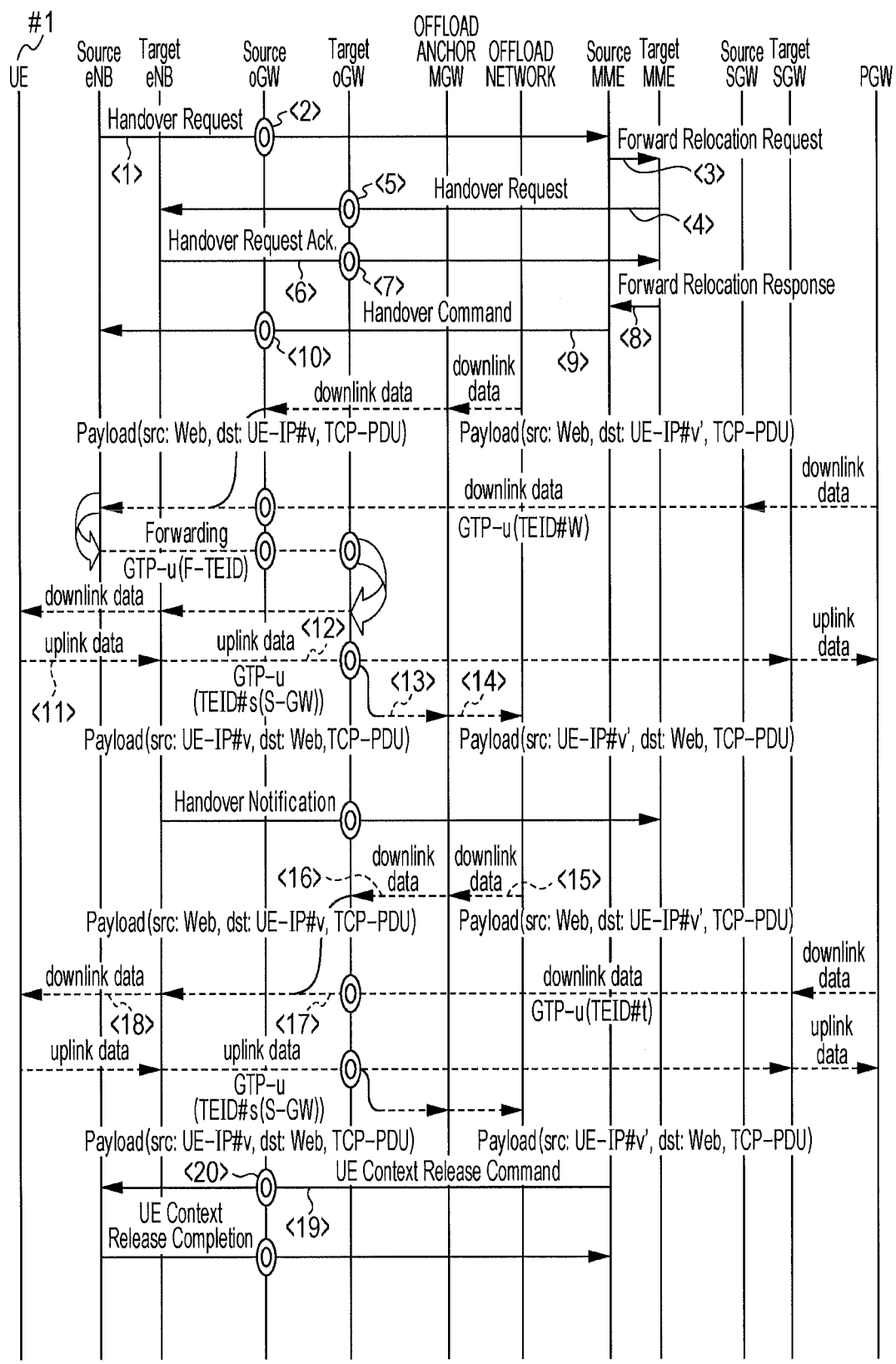
FIG. 4C illustrates a sequence example of S1-based handover during offload communication.
Figure 4D:
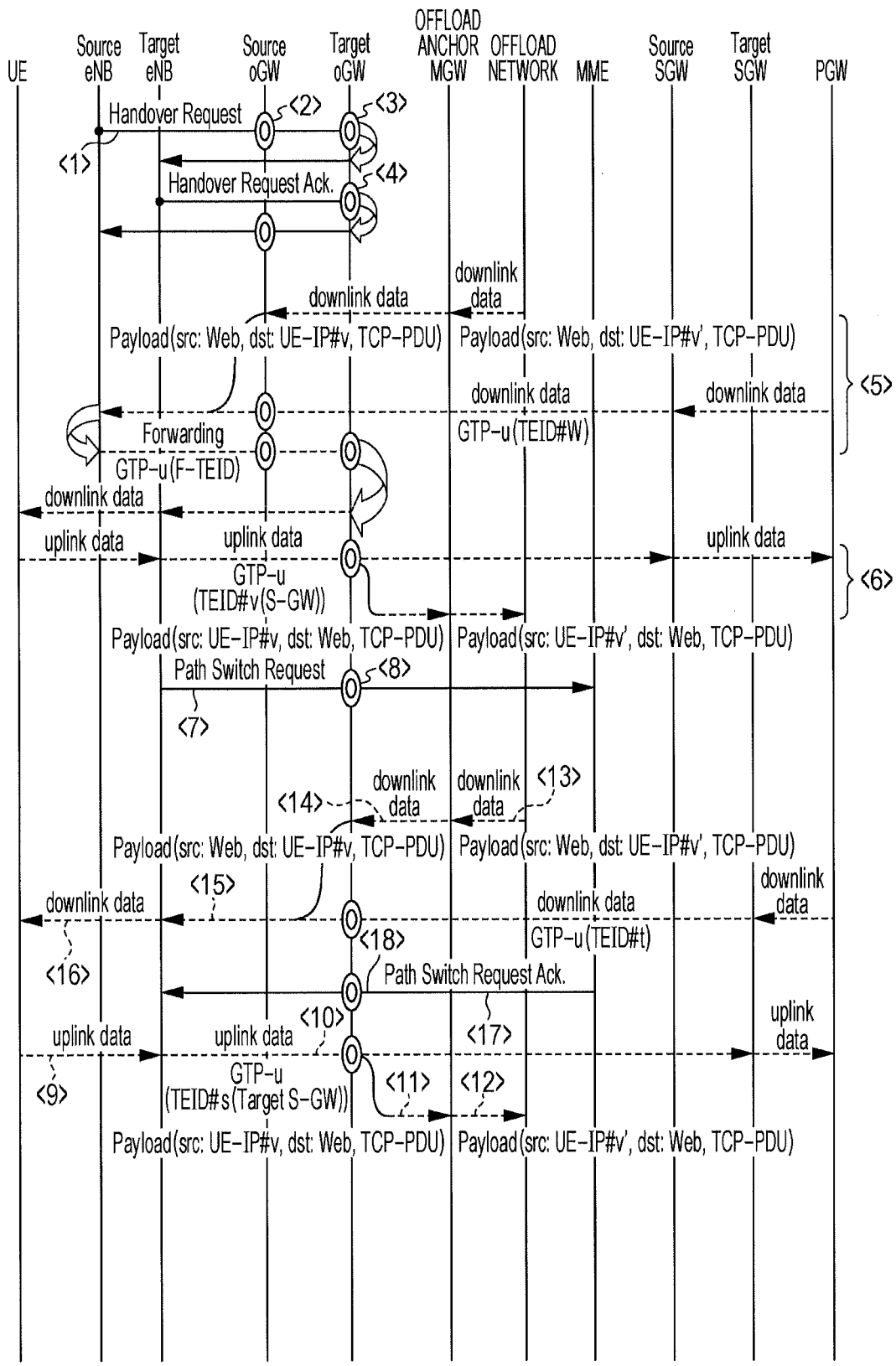
FIG. 4D illustrates a sequence example of X2-based handover during offload communication.

Note that, in FIG. 4C, upon the processing for the Handover Request being completed, the Target eNB transmits Handover Notification which is a completion message to the Target MME. Thus, the destination eNB of downlink data is switched from the Source eNB to the Target eNB.

Operation 2-12: The data from the UE#x that the eNB#2 receives after completion of the operation example 2 (<11> in FIG. 4C) is transmitted to the website as follows. Specifically, a GTP-u packet (FIG. 6) is transmitted from the eNB#2 to the S-GW#2 (<12> in FIG. 4C). Upon receiving a packet, the sorting point 75 (oGW#2) performs the processing in FIG. 26 (including the sorting processing 174) to transmit the packet indicated in FIG. 8 to the anchor point 76 (oGW#1) (<13> in FIG. 4C). Upon receiving the packet indicated in FIG. 8, the anchor point 76 (oGW#1) performs the processing in FIG. 27 to transmit the packet in FIG. 9 to the website via the offload network 50 (<14> in FIG. 4C).

Operation 2-13: On the other hand, the data from the website to the UE#x is transmitted as follows. Specifically, the downlink data from the website is transmitted to the anchor point 76 (oGW#1) via the offload network 50 using the packet indicated in FIG. 10 (<15> in FIG. 4C). Upon receiving the packet indicated in FIG. 10, the anchor point 76 (oGW#1) performs the processing in FIG. 28 to transmit the packet indicated in FIG. 11 to the sorting point 75 (oGW#2) (<16> in FIG. 4C). Upon receiving the packet indicated in FIG. 11, the sorting point 75 (oGW#2) performs the processing in FIG. 29 (including the merging processing 173) to transmit the packet in FIG. 7 to the eNB#2 (<17> in FIG. 4C). The eNB#2 transmits the downlink data to the UE#x (<18> in FIG. 4C).

Operation 2-14: The Source MME (MME#1) transmits, in order to release a resource secured for the UE#x, a UE Context Release Command message (FIG. 20) to the Source eNB (eNB#1) (<19> in FIG. 4C). Thereupon, the Source oGW (oGW#1) intercepts the UE Context Release Command message (<20> in FIG. 4C), and performs the processing illustrated in FIG. 36.

Operation 2-15: According to the processing in S101 through S104 illustrated in FIG. 36, the record corresponding to the intra-oGW UE identifier (8000) in the Source oGW (oGW#1) is deleted. Specifically, the corresponding records of the Bearer user determination table 175A, Bearer table 175B, and offload condition application state table are deleted (see FIGS. 49 and 50A). The resource of the sorting point 75 of the Source oGW (oGW#1) is released. Note that FIG. 50B illustrated an example of the offload condition application state after handover completion.

Figure 51:
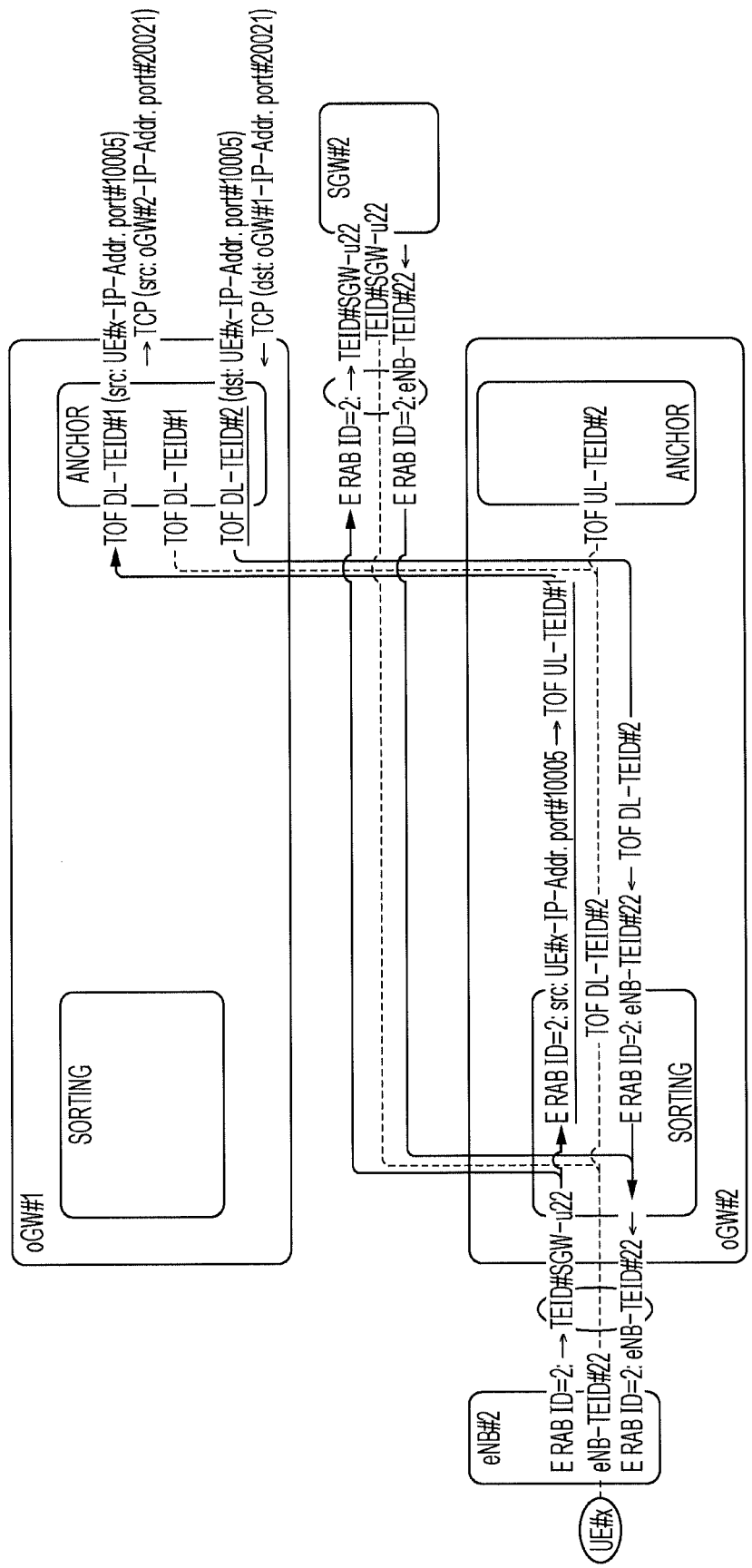
FIG. 51 illustrates an example (traffic flow) of an offload condition application state in the event that a TCP connection is maintained after Handover completion.

Thus, as illustrated in FIG. 51, as for the TCP connection, the resource of the anchor point 76 of the Source oGW (oGW#1) is held to maintain TCP communication.

Operation Example 3

Maintaining of TCP Connection for X2-Based Handover

Next, description will be made regarding operation until handover is performed from the Source eNB to the Target eNB in accordance with movement of the UE#x while maintaining TCP communication at the UE#x, with reference to the sequence illustrated in FIG. 4D.

Operation 3-1: Upon the Source eNB (eNB#1) starting the X2-based handover in accordance with movement of the UE#x, an X2AP: Handover Request message (FIG. 21) is transmitted from the Source eNB (eNB#1) to the Target eNB (eNB#2) (<1> in FIG. 4D). The Source oGW (oGW#1) intercepts the X2AP: Handover Request message (<2> in FIG. 4D), and performs the processing illustrated in FIG. 37 (S111, S119, and S120).

Operation 3-2: According to the processing illustrated in FIG. 37, the Source oGW (oGW#1) determines the intra-eNB UE identifier (X2AP) of the Bearer user determination table 175A (see FIG. 52).

Operation 3-3: The Target oGW (oGW#2) intercepts the X2AP: Handover Request message (<3> in FIG. 4D), and performs the processing illustrated in FIG. 37 (S111 through S118) and the offload GTP-u tunnel generation processing illustrated in FIG. 30B.

Operation 3-4: According to the processing in S111 through S118, with the Target oGW (oGW#2), as illustrated in FIG. 52, the intra-oGW UE identifier, intra-MME UE identifier, MME device identifier, eNB device identifier, user line identifier, uplink line assignment information, TOF sorting point position information, and TOF anchor point position information are determined, and are stored in the Bearer user determination table 175A' and Bearer table 175B'.

Operation 3-5: Also, with the Target oGW (oGW#2), as illustrated in FIG. 53, the intra-oGW-anchor UE identifier, user line identifier, TOF anchor point position, and TOF sorting point position are determined and stored in the TOF relay management table 178a'.

Operation 3-6: As described above, with the Bearer user determination table 175A' of the Target oGW (oGW#2), the intra-MME UE identifier is determined. At this time, as illustrated in FIG. 52, the intra-MME UE identifier of the Bearer user determination table 175A of the oGW#1 is coincided with the intra-MME UE identifier of the Bearer user determination table 175A' of the oGW#2. Thus, correlation between the intra-oGW UE identifier (8000) of the oGW#1 and the intra-oGW UE identifier (8102) of the oGW#2 for the UE#x may be completed.

Operation 3-7: As illustrated in FIG. 54, a copy of the user line identifier, TCP connection information, and offload anchor point information of the offload condition application state table 176A corresponding to the intra-oGW UE identifier (8000) of the oGW#1 is delivered from the oGW#1 to the oGW#2. The oGW#2 stores the copy in the offload condition application state table 176A' of the oGW#2. Thus, the oGW#2 can recognize offload anchor point information for each traffic to be offloaded.

Operation 3-8: Thereafter, an X2AP: Handover Request Ack. message is transmitted from the Target eNB (eNB#2), and arrives at the Source eNB (eNB#1) via the oGW#2 and oGW#1 (<4> in FIG. 4D). Thereafter, the downlink data from the offload network 50 and PGW 23 arrives at the UE#x via the Source eNB (eNB#1), oGW#1, oGW#2, and Target eNB (eNB#2) (<5> in FIG. 4D). The uplink data from the UE#x is transmitted to the offload network 50 (PGW 23) via the Target eNB (eNB#2) and oGW#2 (<6> in FIG. 4D).

Operation 3-9: Next, the Target eNB (eNB#2) transmits a Path Switch Request message (FIG. 24) to the MME (MME#1) (<7> in FIG. 4D). The Target oGW (oGW#2) intercepts the Path Switch Request message (<8> in FIG. 4D), and performs the processing in FIGS. 38 and 35B.

Operation 3-10: According to the processing in FIGS. 38 and 35B, the TOF sorting point position stored in the TOF relay management table 178a' of the oGW#2 is delivered to the oGW#1, and is set as the TOF point position of the TOF relay management table 178a of the oGW#1 (S96c in FIG. 35B). Thus, the TOF sorting point position at the Source oGW (oGW#1) is switched to the TOF sorting point position (TOF DL-TEID#2) of the oGW#2.

Operation 3-11: Thereafter, the MME (MME#1) transmits a Path Switch Request Ack. message (FIG. 25) to the Target eNB (eNB#2) (<8> in FIG. 4D). Thereupon, the Target eNB (eNB#2) intercepts the Path Switch Request Ack. message, and performs the processing illustrated in FIG. 39 (S135 and S136) (<9> in FIG. 4D).

Operation 3-12: According to the processing illustrated in FIG. 39, with the Bearer table 175B' of the Target oGW (oGW#2), the uplink line assignment information corresponding to the intra-oGW UE identifier (8102) is switched from the S-GW#1 to the S-GW#2 (see FIG. 52).

Figure 55:
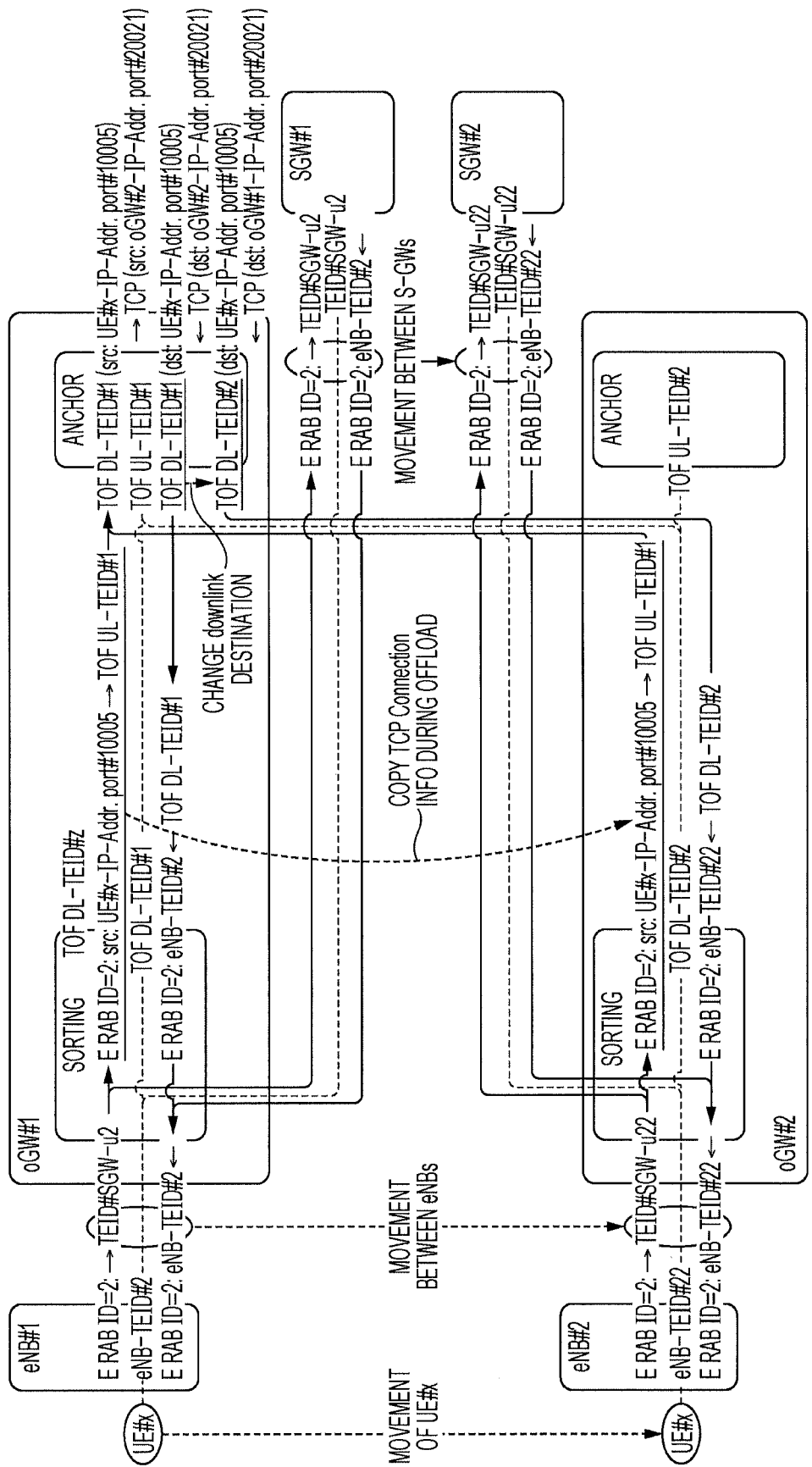
FIG. 55 illustrates an example (traffic flow) of handover of an offload condition application state at the X2-Based Handover.

Thus, as illustrated in FIG. 55, with the X2-based handover in accordance with movement of the UE#x, there is made transition into a path of UE#x→eNB#2→sorting point (oGW#2)→anchor point (oGW#1)→website while maintaining the TCP connection.

Operation 3-13: According to the operation example 3, uplink data toward the website from the UE#x is transmitted as follows. Specifically, uplink data from the UE #x received at the eNB#2 (<9> in FIG. 4D) is transmitted from the base station 11 (eNB#1) using the GTP-u packet addressed to the S-GW#1 (FIG. 6) (<10> in FIG. 4D). Upon receiving the packet in FIG. 6, the sorting point 75 (oGW#2) performs the processing in FIG. 26 (including the sorting processing 174) to transmit the packet indicated in FIG. 8 to the anchor point 76 (oGW#1) (<11> in FIG. 4D). Upon receiving the packet indicated in FIG. 8, the anchor point 76 (oGW#1) performs the processing in FIG. 27 to transmit the packet in FIG. 9 to the website (<12> in FIG. 4D).

Operation 3-14: On the other hand, the downlink data from the website to UE is transmitted as follows. Specifically, the packet in FIG. 10 is transmitted to the anchor point 76 (oGW#1) from the web site (<13> in FIG. 4D). Upon receiving the packet in FIG. 10, the anchor point 76 (oGW#1) performs the processing in FIG. 28 to transmit the packet in FIG. 11 to the sorting point 75 (oGW#2) (<14> in FIG. 4D). Upon receiving the packet in FIG. 11, the sorting point 75 (oGW#2) performs the processing in FIG. 29 to transmit the packet in FIG. 7 to the eNB#2 (<15> in FIG. 4D). The eNB#2 transmits the downlink data to the UE#x (<16> in FIG. 4D).

Operation 3-15: Thereafter, though not illustrated in FIG. 4D, the Target eNB (eNB#2) transmits an X2AP: UE Context Release message to the Source eNB (eNB#1). Thereupon, the Source oGW (oGW#1) intercepts the X2AP: UE Context Release message, and performs the processing illustrated in FIG. 40 (S121 through S124). Thus, the record corresponding to the intra-oGW UE identifier (8000) of the Source oGW (oGW#1) is deleted from the Bearer user determination table 175A and Bearer table 175B (see FIG. 49), and also deleted from the offload condition application state table 176A (see FIG. 50A). The resource of the sorting point 75 of the Source oGW (oGW#1) is then released. In this way, as illustrated in FIG. 51, as for the TCP connection, the resource of the anchor point 76 of the Source oGW (oGW#1) is held to maintain TCP communication.

Operation Example 4

Generation of New TCP Connection After Handover

Next, description will be made regarding a case where in a state in which the UE#x maintains the TCP connection, a new TCP connection is generated after handover.

Operation 4-1: Upon the UE#x starting new connection with the website, a GTP-u packet (FIG. 6) including a TCP connection request (syn) is transmitted from the Target eNB (eNB#2) to the Target S-GW (S-GW#2). Thereupon, the Target oGW (oGW#2) receives the GTP-u packet, and performs illustrated in FIG. 26. As a result of this processing, the packet indicated in FIG. 8 is transmitted to the offload anchor point (the anchor point 76 of the oGW#2).

Operation 4-2: New TCP connection information and offload anchor point information thereof, corresponding to the intra-oGW UE identifier and user line identifier, are stored in the offload condition application state table 176A' of the Target oGW (oGW#2) (see FIG. 56).

Operation 4-3: Next, upon the anchor point 76 (oGW#2) receiving the packet (FIG. 8) transmitted to the anchor point 76 of the Target oGW (oGW#2) from the sorting point 75 of the Target oGW (oGW#2), the processing illustrated in FIG. 27 is executed, and the packet indicated in FIG. 9 is transmitted to the website via the offload network 50.

Operation 4-4: The UE TCP connection information, oGW TCP connection information, and session state corresponding to the intra-oGW-anchor UE identifier (8102) and user line identifier (2) are stored in the TOF session management table 178b' of the Target oGW (oGW#2) (see FIG. 57).

Operation 4-5: Next, upon the packet indicated in FIG. 9 arriving at the website via the offload network 50, the packet indicated in FIG. 10 arrives at the anchor point 76 (oGW#2) from the website via the offload network 50. The anchor point 76 (oGW#2) receives the packet indicated in FIG. 10, and performs the processing illustrated in FIG. 28.

Figure 58A:
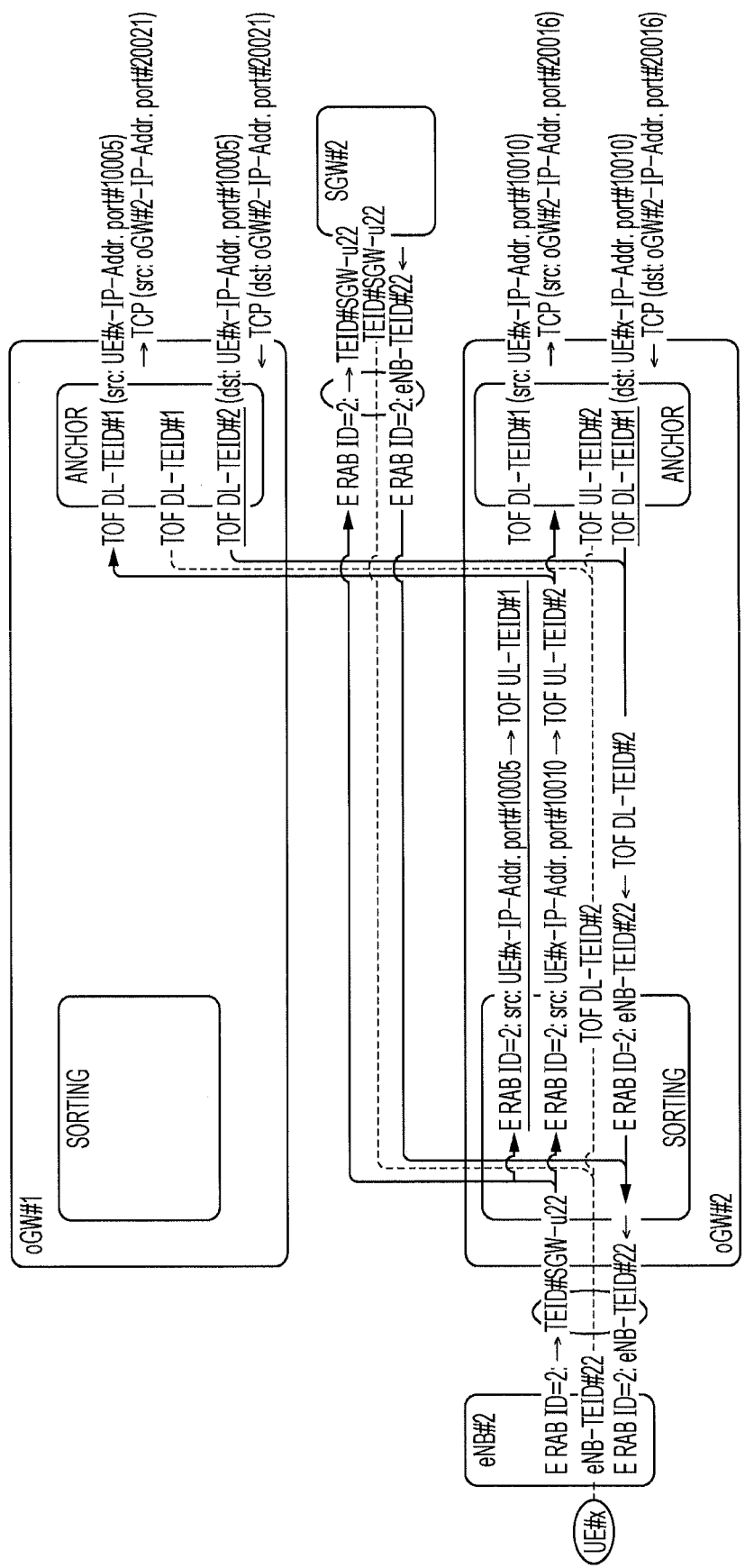
FIG. 58A illustrates an example (traffic flow) of an offload condition application state after generation of a new TCP connection after Handover.

Operation 4-6: Next, the packet indicated in FIG. 11 is transmitted from the anchor point 76 (oGW#2) to the sorting point 75 (oGW#2). The sorting point 75 (oGW#2) which has received this packet performs the processing illustrated in FIG. 29 to transmit the packet in FIG. 7 to the Target eNB (eNB#2). Thus, as illustrated in FIG. 58A, new TCP communication is established via the offload network 50. Note that FIG. 58B indicates Bearer state data after establishment of a new TCP connection.

Operation 4-7: The transmission path of uplink data and downlink data between the UE#x and website according to the maintained TCP connection and the processes at the oGW#1 and oGW#2 are not changed from the case of the operation examples 2 and 3, and accordingly, description will be omitted.

Correspondingly, uplink data toward the website from the UE#x of the new TCP connection is transmitted as follows. Specifically, the uplink data is transmitted from the eNB#2 using a GTP-u packet (FIG. 6) addressed to the 5-GW#2. Upon receiving the packet indicated in FIG. 6, the sorting point 75 (oGW#2) performs the processing illustrated in FIG. 26 to transmit the packet indicated in FIG. 8 to the anchor point 76 (oGW#2). Upon receiving the packet indicated in FIG. 8, the anchor point 76 (oGW#2) performs the processing in FIG. 27 to transmit the packet indicated in FIG. 9 to the website.

On the other hand, downlink data toward the website from the UE#x of the new TCP connection is transmitted as follows. Specifically, the downlink data is transmitted from the website to the anchor point 76 (oGW#2) using the packet indicated in FIG. 10. Upon receiving the packet indicated in FIG. 10, the anchor point 76 (oGW#2) performs the processing in FIG. 28 to transmit the packet indicated in FIG. 11 to the sorting point 75 (oGW#2). Upon receiving the packet indicated in FIG. 11, the sorting point 75 (oGW#2) performs the processing in FIG. 29 to transmit the packet indicated in FIG. 7 to the eNB#2. The downlink data is then transmitted from the eNB#2 to the UE#x.

In this way, the offload anchor point of the new TCP connection (TCP session) generated after handover is, at the time of generation thereof, set to the anchor point 76 of the oGW 70 intermediating between the eNB and S-GW to which the UE#x is connected.

Operation Example 5

Disconnection of TCP Connection After Handover

Description will be made regarding a case where in a state in which the UE#x maintains the TCP connection, the TCP connection is disconnected after handover.

Operation 5-1: Upon the UE#x disconnecting the TCP connection with the website, a GTP-u packet (FIG. 6) including a TCP connection request (fin) is transmitted from the Target eNB (eNB#2) to the Target S-GW (S-GW#2). The Target oGW (oGW#2) receives the GTP-u packet, and performs the processing illustrated in FIG. 26 to transmit the packet indicated in FIG. 8 to the anchor point 76 (oGW#1).

Operation 5-2: According to the processing illustrated in FIG. 26 (S5 and S6), as illustrated in FIG. 59, a record (intra-oGW UE identifier, user line identifier, TCP connection information, and offload anchor point information) corresponding to the TCP connection is deleted from the offload condition application state table 176N of the Target oGW (oGW#2).

Operation 5-3: Next, the packet indicated in FIG. 8 is transmitted from the sorting point 75 of the Target oGW (oGW#2) to the anchor point 76 of the Source oGW (oGW#1). Upon receiving the packet indicated in FIG. 8, the anchor point 76 (oGW#1) performs the processing illustrated in FIG. 27 to transmit the packet indicated in FIG. 9 to the website.

Operation 5-4: According to the processing illustrated in FIG. 27 (S28 through S30), as illustrated in FIG. 60, "waiting for DL disconnect confirmation" is stored as the session state of the corresponding record of the TOF session management table 178b at the anchor point 76 of the Source oGW (oGW#1).

Operation 5-5: Upon the packet indicated in FIG. 9 arriving at the website via the offload network 50, the packet indicated in FIG. 10 arrives at the anchor point 76 (oGW#1) from the website via the offload network 50. Upon receiving the packet indicated in FIG. 10, the anchor point 76 (oGW#1) performs the processing illustrated in FIG. 28 (S44, S47, and S49).

Thus, as illustrated in FIG. 60, a record corresponding to the TOF session management table 178b of the Source oGW (oGW#1) is deleted. Also, according to deletion of the record, the CPU 73 may recognize from the TOF session management table 178b that all of the TCP connections corresponding to the intra-oGW-anchor UE identifier which pass through the anchor point 76 of the Source oGW (oGW#1) have been disconnected. In accordance with this, the CPU 73 deletes a record of the TOF relay management table 178a corresponding to the intra-oGW UE identifier (8000) of the Source oGW (oGW#1), and releases the offload resource corresponding to the intra-oGW-anchor UE identifier.

Figure 61:
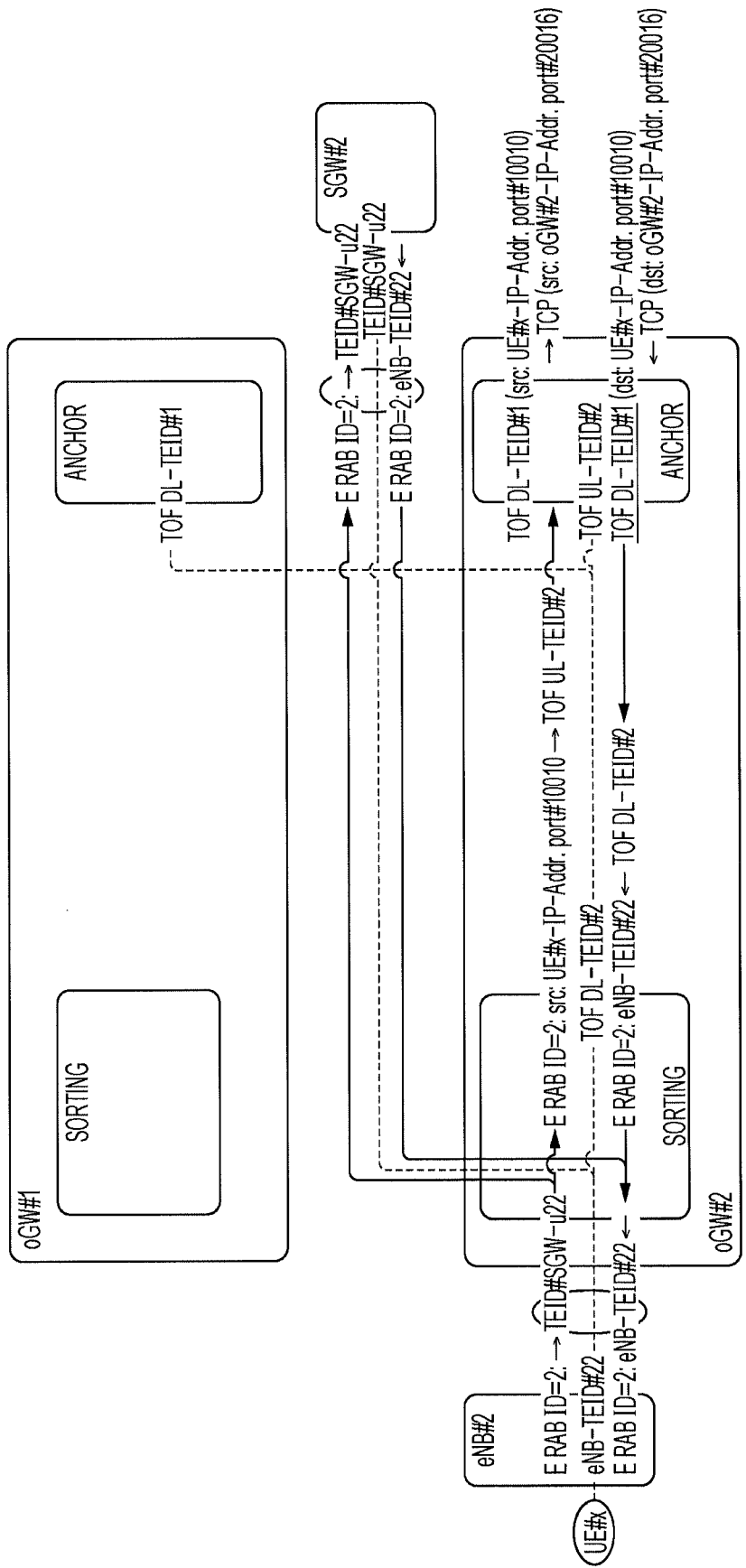
FIG. 61 illustrates an example (traffic flow) of an offload condition application state after disconnection of a TCP connection after Handover.

Operation 5-6: Next, upon the packet indicated in FIG. 11 being transmitted from the anchor point 76 (oGW#1) to the sorting point 75 (oGW#2), the sorting point 75 (oGW#2) receives this packet, and performs the processing illustrated in FIG. 29 to transmit the packet indicated in FIG. 7 to the Target eNB (eNB#2). Thus, disconnect confirmation of a TCP connection arrives at the UE#x. In this way, as illustrated in FIG. 61, the path for the TCP connection is deleted. However, the path for the new TCP connection is maintained.

Operation 5-7: The path of uplink and downlink according to a new TCP connection has not been changed since establishment of the new TCP connection, and accordingly, description will be omitted. The path is abolished due to disconnection of a TCP connection. Note that FIG. 62 indicates Bearer state data after disconnection of a TCP connection.

According to the first embodiment, the target oGW receives, with handover as a trigger, user line information, TCP connection information (an example of communication identification information), and offload anchor point position information from a source oGW, and serves as a sorting point (relay point) using these information. Thus, ongoing TCP communication may be maintained. On the other hand, at the time of end of communication, an anchor point may be released by deleting information according to the anchor point. Also, at the time of generation of a new TCP connection, the own device may serve as an anchor point.

In this way, it may be avoided that a new TCP connection is established via an offload anchor point which has been set first. Thus, for example, in FIG. 1, in a state in which UE 60 is connected to a base station 11D, a new TCP connection with a website #b may be established via the offload network 50. In this case, heretofore, though offload traffic from an offload GW#C to an offload GW#A has to be provided, such offload traffic may be deleted. Therefore, according to effective reduction in offload traffic in the EPC network 20 (core network: mobile transmission network), improvement in traffic reduction, load reduction of the EPC network 20, and effective utilization of resources may be realized.

Second Embodiment

Next, a second embodiment will be described. The second embodiment has common points with the first embodiment, and accordingly, description regarding the common points will be omitted, and a different point will principally be described. While the first embodiment handles a TCP connection, the second embodiment handles UDP, which is a different point between both.

Network Configuration

Figure 63:
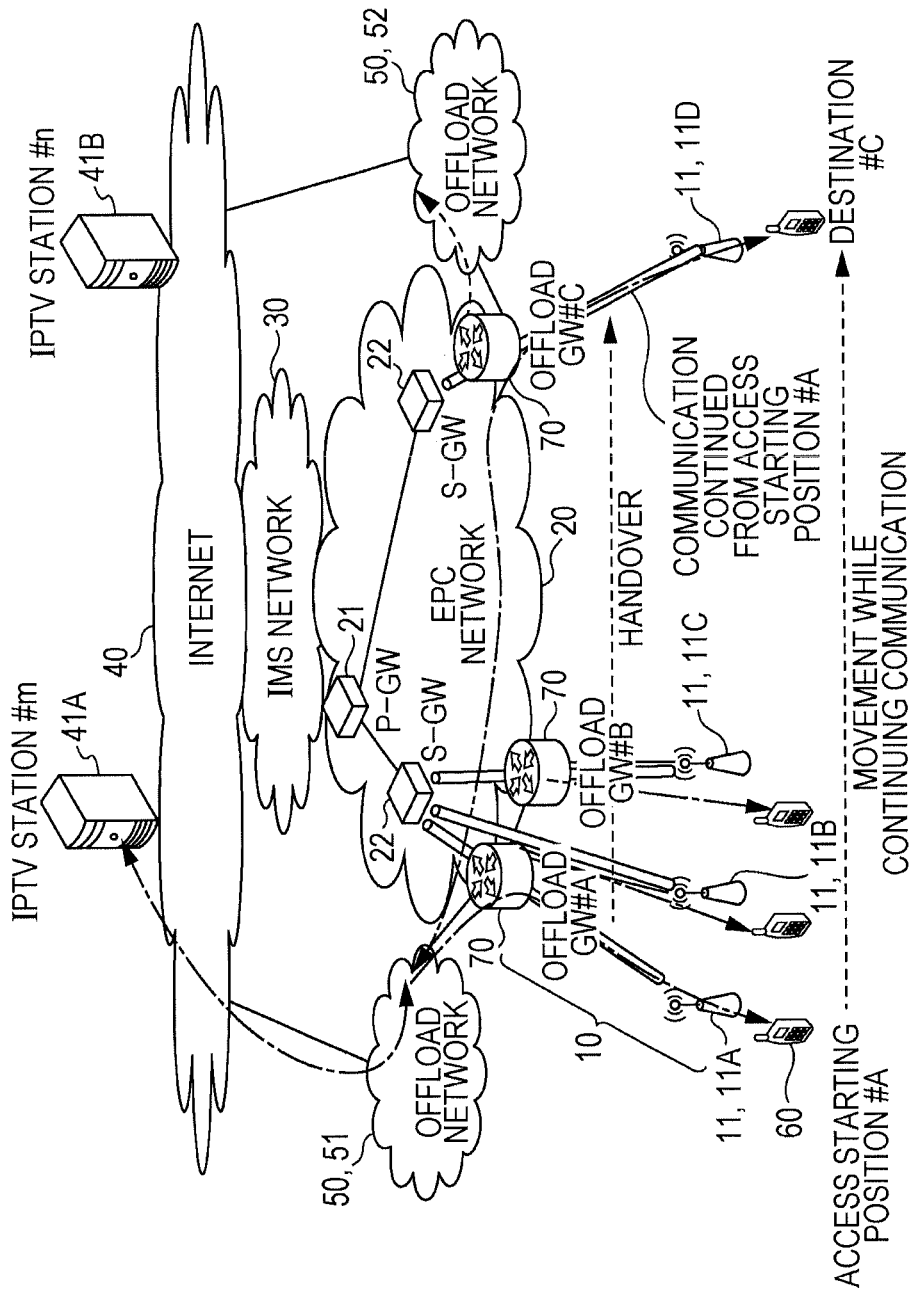
FIG. 63 illustrates a configuration example of a network system according to a second embodiment.

FIG. 63 illustrates a network configuration example of the second embodiment. It is a different point with the first embodiment (FIG. 1) that content distribution servers 41A and 41B which serve as IPTV stations are disposed instead of the web servers 41 and 42 which provide a website.

In FIG. 63, let us say that UE 60 has first performed connection with a base station 11A (access starting position #A), and has performed communication with an IPTV station #m via an offload network 50 (51). Thereafter, let us say that handover to a base station 11C (movement destination C) has been performed according to movement of the UE 60 while continuing communication. Now, let us say that communication with an IPTV station #n is started.

In this case, there is a session#1 which has been started at the access starting position #A, and accordingly, at a movement destination #C, a session#2 for communication with an IPTV station (contents distribution server) 41B also passes through an offload anchor point (oGW#A) determined regarding the session#1. Therefore, not only the communication path is extended, but also a communication path within an IP mobile transmission network (EPC network 20) is extended, which deteriorates traffic reduction effects of the EPC network 20.

In other words, the offload anchor point has been set to the offload GW 70 (oGW#A) which has first been connected, and accordingly, traffic between an offload GW 70 (oGW#C) and the oGW#A occurs. Further, even when the shortest path between the oGW#C and IPTV station #n is a path X in FIG. 63, offload traffic passes through the oGW#A. Therefore, the path becomes an extended path such as a path Y in FIG. 63. The second embodiment will provide a solution for such a problem.

Specifically, with the second embodiment, with regard to Multicast communication to be traffic-offloaded, an offload device (oGW) which has started communication is taken as an anchor point device with the ISP network (Internet), "Multicast viewing information to be traffic offloaded and the position (device) of an offload anchor point thereof" are managed for each Multicast communication. Further, in accordance with movement of User Equipment (UE), "Multicast viewing information to be traffic offloaded and the position (device) of an offload anchor point thereof" are informed to a handover destination offload device. Thus, with secession from Multicast viewing (message indicating end of communication) as a trigger, the offload anchor point with the Internet of the Multicast communication is released.

Configuration of Offload GW (oGW)

As the configuration of the offload GW 70 illustrated in FIG. 63, the configuration of the offload GW 70 described with reference to FIGS. 2, 3, and 4A may be applicable. Therefore, detailed description will be omitted. Also, the S1-based handover sequence (FIG. 4C) and the X2-based handover sequence (FIG. 4C) are also common.

However, the communication partner "website" in FIGS. 4B and 4C corresponds to "IPTV station" in the second embodiment. Uplink data (payload) from UE to website corresponds to IGMP-join or IGMP-leave in the second embodiment. On the other hand, downlink data (payload) from IPTV station to UE in the second embodiment is broadcast content data to be IP-multicast with UDP/IP.

Figure 64:
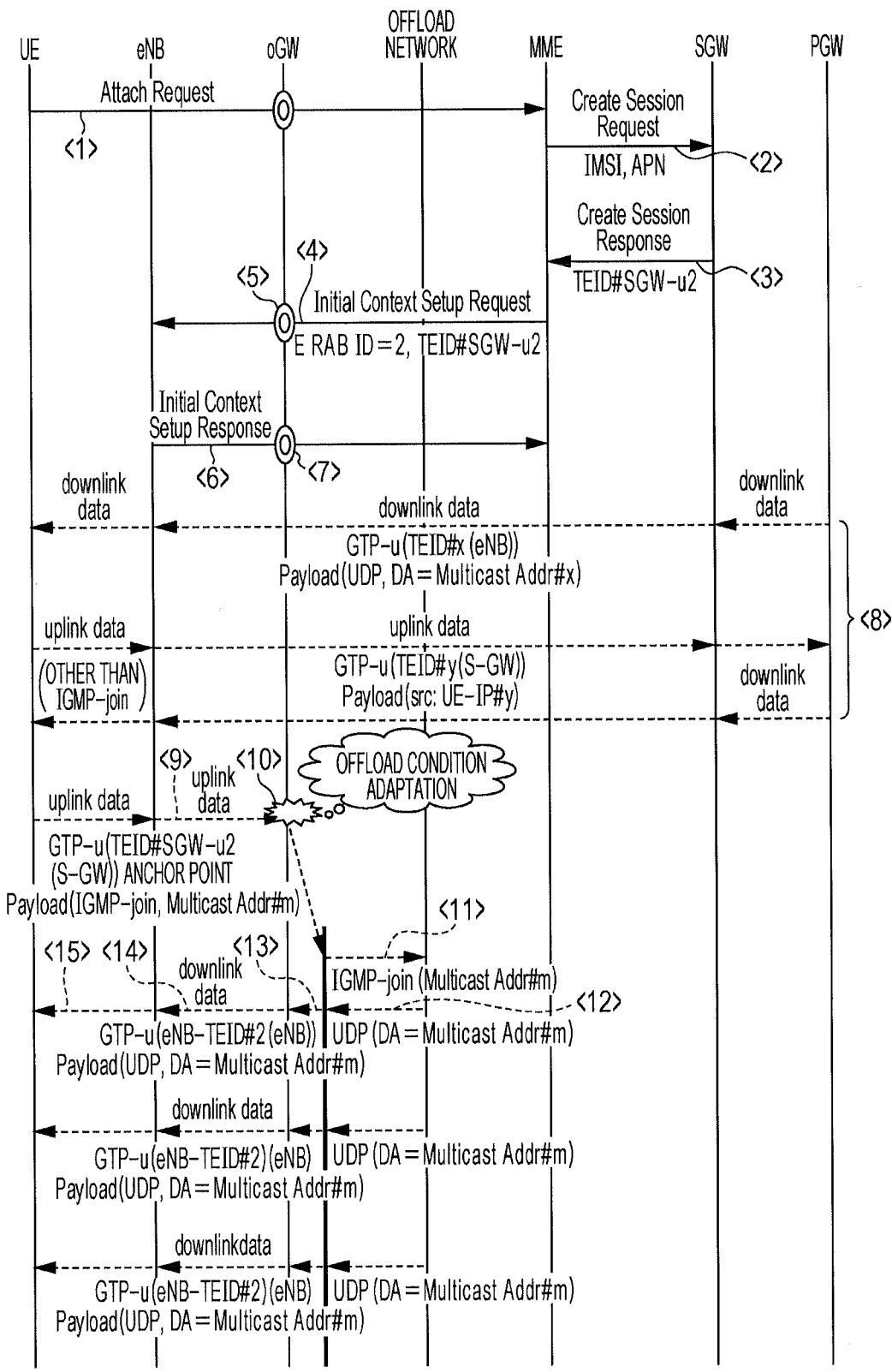
FIG. 64 illustrates sequence example in the event of activating User Equipment, starting viewing of an IPTV broadcast, and offloading Multicast packet communication.

FIG. 64 illustrates a sequence from activation of UE 60 to starting of offload communication in the second embodiment. A great difference with the first embodiment (FIG. 4B) is that downlink data from an IPTV station is distributed by UDP. A detailed procedure will be described later.

Offload Condition Application State Data

FIG. 65 indicates a data structure example of an offload condition application state table 276A which holds the offload condition application state data 176 indicated in FIG. 4A. As illustrated in FIG. 65, the offload condition application state table 276A stores one or more records including an intra-oGW UE identifier, a user line identifier (E RAB ID), Multicast viewing information, and offload anchor point information.

"intra-oGW UE identifier" is information to uniquely identify a mobile station (UE) 60 using this offload GW (oGW). "user line identifier" is information to uniquely identify a line within UE 60, and is sync with the line identifier at UE 60 (E RAB ID). Multicast address to be offloaded is stored as "Multicast viewing information" regarding a content that UE 60 obtains from an IPTV station. "offload anchor point information" is position information of an offload anchor point at a position where viewing at the Multicast address to be offloaded has been started.

Packets

Figure 66:
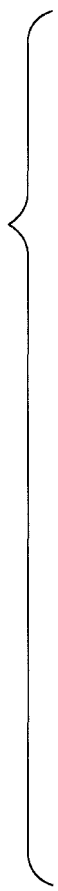
FIG. 66 indicates a structure example of a packet (IGMP-join, IGMP-leave) of GTP-u toward an S-GW from an eNB.

FIG. 66 indicates a data structure example of a GTP-u packet (IGMP (Internet Group Management Protocol)-join, IGMP-leave) toward an S-GW 21 from an eNB 11. The IGMP is a protocol to control a host group that receives distribution of packets by IP multicast. The IGMP-join is a group participation request of a host, and the IGMP-leave is a secession request from the group.

FIG. 67 indicates a data structure example of a GTP-u packet (IPTV broadcast distribution) toward the eNB 11 from the S-GW 21. Also, FIG. 67 is also a structure example of a GTP-u packet in the event of transmitting a packet to an eNB 11 via the offload network 50 from an oGW 70 serving as a sorting point.

Figure 68:
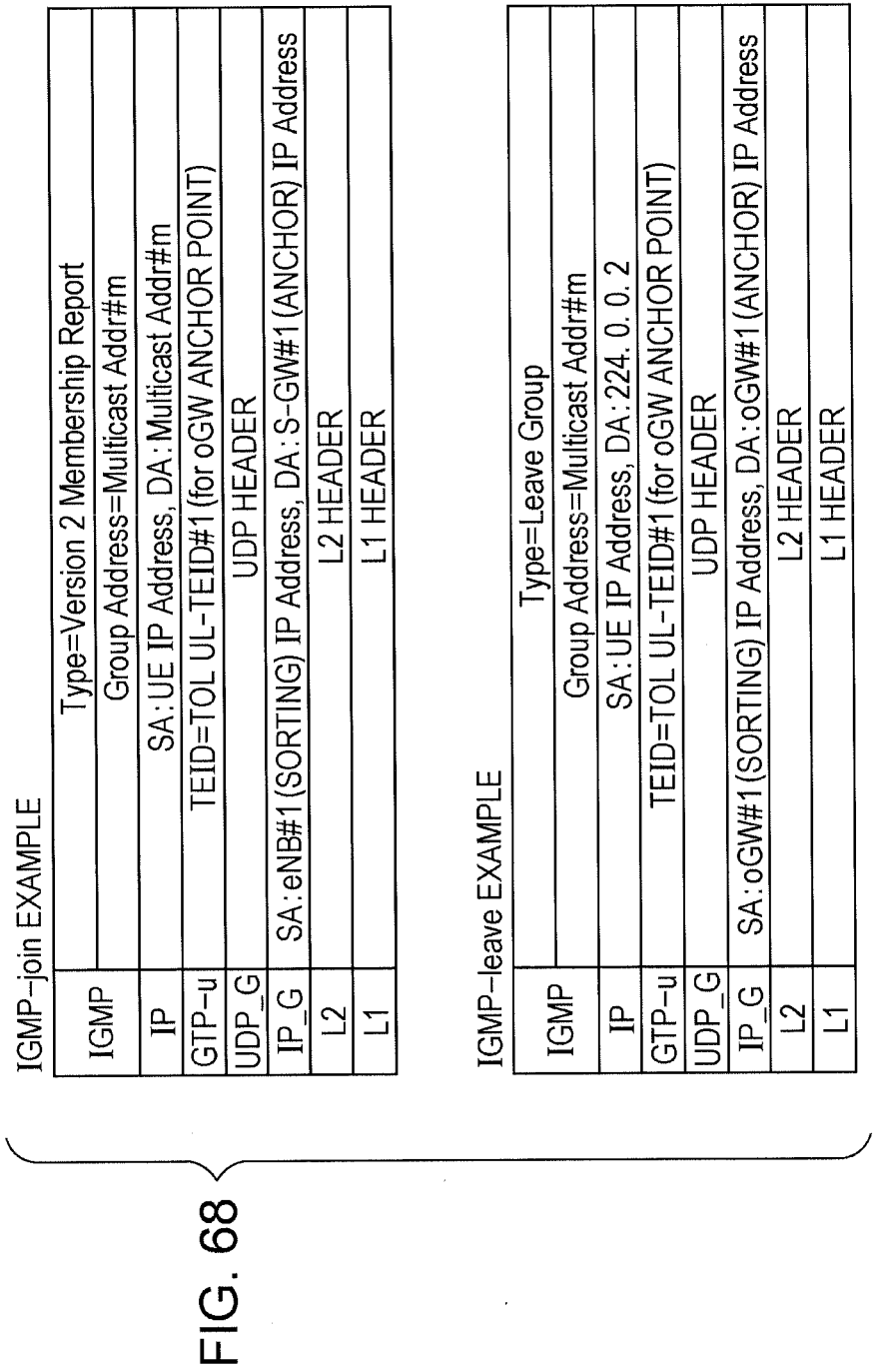
FIG. 68 indicates a structure example of a packet (IGMP-join, IGMP-leave) to be used when transmitting an uplink packet to be offloaded from an oGW serving as a sorting point to an oGW serving as an anchor point.

FIG. 68 indicates a data structure example of a packet (IGMP-join, IGMP-leave) to be used at the time of transmitting an uplink packet to be offloaded from an oGW 70 serving as a sorting point to an oGW 70 serving as an anchor point. In order to simplify description, the GTP-u is taken as the basis.

FIG. 69 indicates a data structure example of a packet (IGMP-join, IGMP-leave) to be used at the time of transmitting an uplink packet (IGMP-join, IGMP-leave) to be offloaded from an oGW 70 serving as an anchor point to the offload network 50.

FIG. 70 indicates a data structure example of a packet (IPTV broadcast distribution) to be arrived at an offload anchor point form an IPTV station via the offload network 50. FIG. 71 indicates a data structure example of a packet (IPTV broadcast distribution) to be used at the time of transmitting data from an oGW 70 serving as an offload anchor point to an oGW 70 serving as a sorting point. In order to simplify description, the GTP-u is taken as the basis.

Bearer State Management Data

With the second embodiment as well, each of the oGWs 70 has a Bearer user determination table 175A (175a and 175b) and a Bearer table 175B as the Bearer state management data 175. The data structures of both tables 175A and 175B are the same as those in the first embodiment (FIG. 12), and accordingly, description will be omitted.

FIG. 72 indicates a data structure example of the TOF relay state management data 178 at an offload anchor point, according to the second embodiment. The data structure of the TOF relay management table 278a indicated in FIG. 72 is the same as the TOF relay management table 178a (FIG. 12) according to the first embodiment, and accordingly, description will be omitted.

The TOF session management table 278b indicated in FIG. 72 has the following structure, which differs from the TOF session management table 178b according to the first embodiment. Specifically, "intra-oGW-anchor UE identifier" stores information to uniquely identify UE 60 within the anchor point of an oGW 70. With regard to the same UE 60, the same value as with the intra-oGW-anchor UE identifier stored in the TOF relay management table 278a is stored.

"user line identifier" stores information to uniquely identify a line within UE 60, and is sync with a line identifier (E RAB ID) at the UE 60. Multicast viewing information for each Multicast viewing at UE 60 (e.g., Multicast address) is stored as "Multicast viewing identification".

Messages

With the second embodiment, the Initial Context Setup Request message (FIG. 14), Initial Context Setup Response message (FIG. 15), and Handover Required message (FIG. 16), described in the first embodiment may be applicable. Also, with the second embodiment, the Handover Request message (FIG. 17) and Handover Request Ack. message (FIG. 18) according to the first embodiment may be applicable. Also, with the second embodiment, the Handover Command message (FIG. 19) and UE Context Release Command message (FIG. 20), according to the first embodiment may be applicable. Also, with the second embodiment, the X2AP: Handover Request message (FIG. 21), X2AP: Handover Request Ack. message (FIG. 22), and X2AP: UE Context Release message (FIG. 23), according to the first embodiment may be applicable. Further, with the second embodiment, the Path Switch Request message (FIG. 24) and Path Switch Request Ack. message (FIG. 25) according to the first embodiment may be applicable.

Processing Flows

Figure 73:
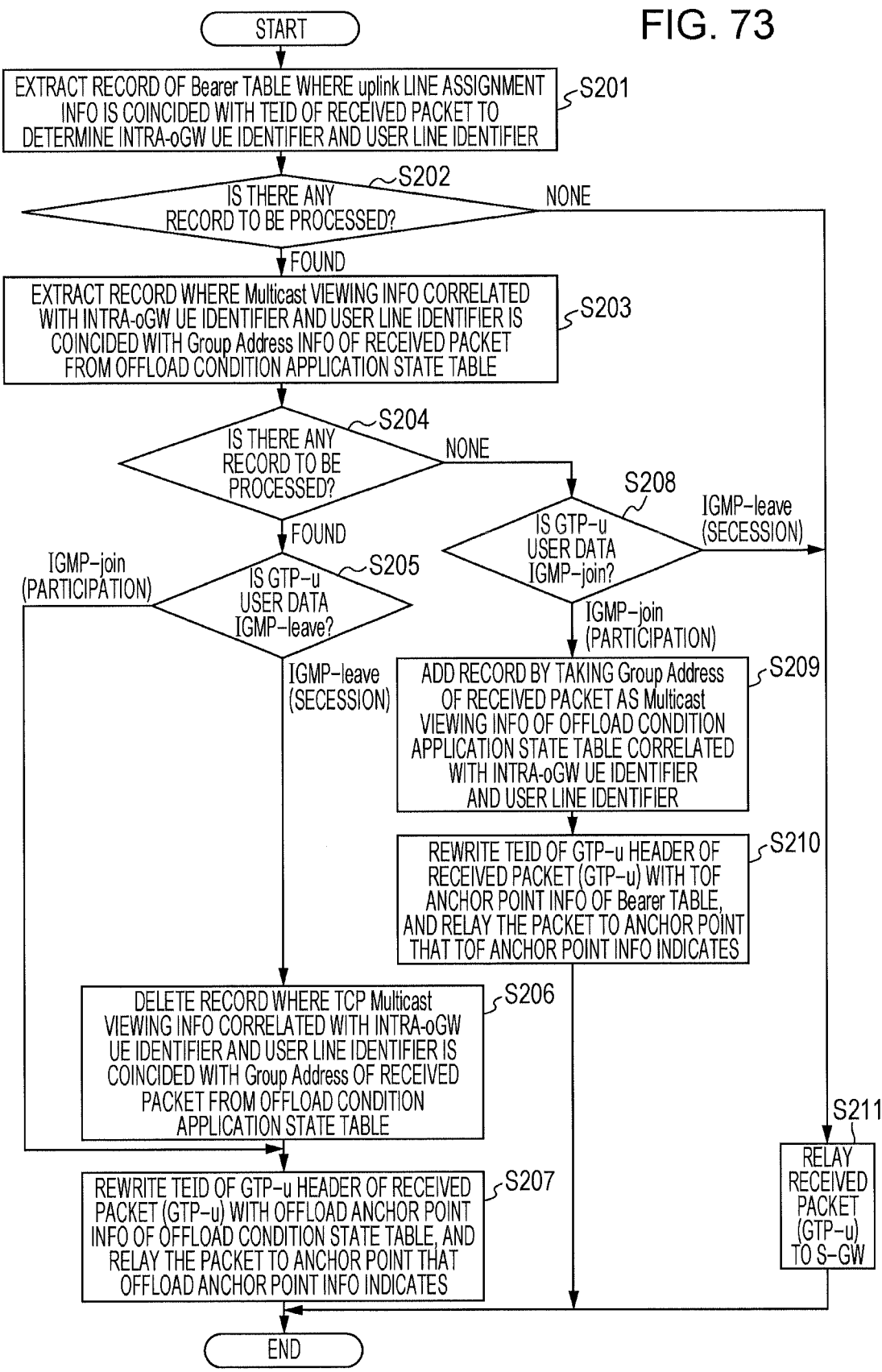
FIG. 73 illustrates a processing flow example in the event of a sorting point oGW having received an uplink GTP-u packet (IGMP-join/IGMP-leave) toward an S-GW from an eNB.

Next, processing flows at an offload oGW 70 according to the second embodiment will be described. The following processing is executed by the CPU 73 (FIG. 2). FIG. 73 illustrates a processing flow example in the event that an oGW 70 serving as a sorting point has received a uplink GTP-u packet (IGMP-join/IGMP-leave: FIG. 66) toward an S-GW 22 from an eNB 11.

In FIG. 73, the processes in S201 and S202 are the same processes as S1 and S2 in the first embodiment (FIG. 26). In S202, in the event that there is no record, the processing proceeds to S211, and the received packet (GTP-u) is relayed to the S-GW 22, and the processing in FIG. 73 is ended. On the other hand, in the event that there is a record, the processing proceeds to S203.

In S203, the CPU 73 extracts a record from the offload condition application state table 276A (FIG. 65), which corresponds to the intra-oGW UE identifier and user line identifier, and also of which the Multicast viewing information is coincided with the group address (Group Address) information of the received packet.

In S204, the CPU 73 determines whether or not there is a record. In the event that there is a record, the processing proceeds to S205, and in the event that there is no record, the processing proceeds to S208.

In S205, the CPU 73 determines whether or not the GTP-u user data is IGMP-leave (secession request). At this time, in the event that the GTP-u user data is IGMP-leave (secession request), the processing proceeds to S206, and in the event of IGMP-join (participation request), the processing proceeds to S207.

In S206, the CPU 73 deletes a record a record from the offload condition application state table 276A (FIG. 65), which corresponds to the intra-oGW UE identifier and user line identifier, and also of which the Multicast viewing information is coincided with the group address (Group Address) information of the received packet.

In S207, the CPU 73 rewrites the TEID of the GTP-u header of the received packet (GTP-u) with the offload anchor point information in the offload condition application state table 276A, and replays the packet to an anchor point that the offload anchor point information indicates. Thereafter, the processing in FIG. 73 is ended.

In S208, the CPU 73 determines whether or not the GTP-u user data is IGMP-join (participation request). At this time, in the event that the GTP-u user data is IGMP-join (participation request), the processing proceeds to S209, and in the event of IGMP-leave (secession request), the processing proceeds to S211.

In S209, the CPU 73 adds a record including the group address of the received packet to the offload condition application state table 276A along with the corresponding intra-oGW UE identifier and user line identifier.

In S210, the CPU 73 rewrites the TEID of the GTP-u header of the received packet (GTP-u) with the TOF anchor point position information in the Bearer table 175B (FIG. 12). Further, the CPU 73 relays the packet to an anchor point that the TOF anchor point position information indicates. Thereafter, the processing in FIG. 73 is ended.

Figure 74:
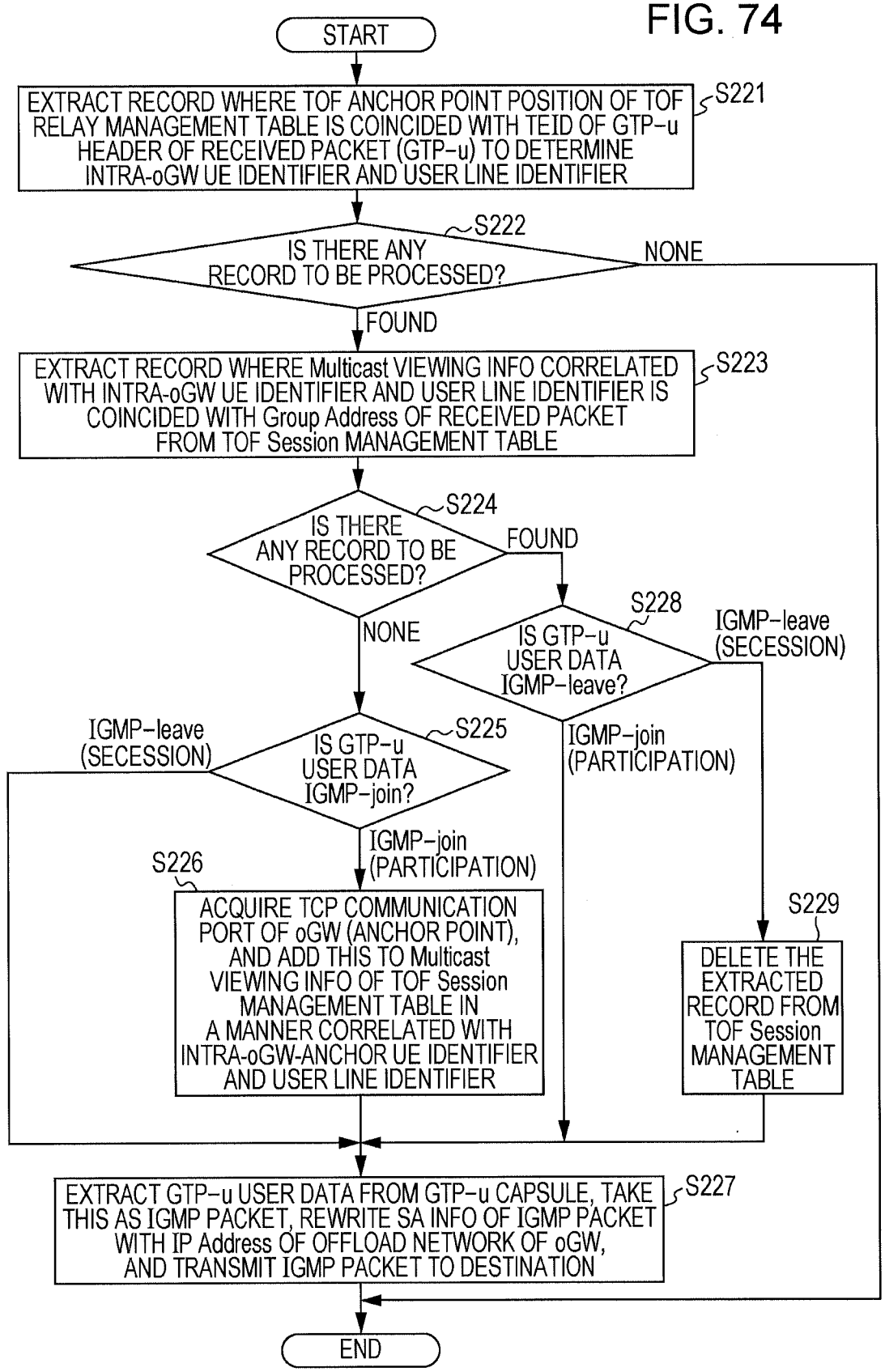
FIG. 74 illustrates a processing flow example in the event of an offload anchor point oGW having received a uplink packet to be offloaded (IGMP-join/IGMP-leave) from a sorting point oGW.

FIG. 74 illustrates a processing flow example in the event that an oGW 70 serving as an offload anchor point has received a uplink packet (IGMP-join/IGMP-leave) for offload from an oGW 70 serving as a sorting point.

In FIG. 74, the processes in S221 and S222 are processes similar to S21 and S22 in the first embodiment (FIG. 27). In S222, when there is no record, the processing in FIG. 74 is ended. On the other hand, when there is a record, the processing proceeds to S223.

In S223, the CPU 73 extracts a record of the TOF session management table 278b, wherein the group address of the received packet is coincided with the intra-oGW-anchor UE identifier, user line identifier, and Multicast viewing information in the TOF session management table 278b (FIG. 72).

In S224, the CPU 73 determines whether or not there is a record. In the event that there is a record, the processing proceeds to S228, and in the event that there is no record, the processing proceeds to S225.

In S225, the CPU 73 determines whether or not the GTP-u user data is IGMP-join (participation request). At this time, in the event that the GTP-u user data is IGMP-join (participation request), the processing proceeds to S226, and in the event of IGMP-leave (secession request), the processing proceeds to S227.

In S226, the CPU 73 acquires the TCP communication port of the oGW (anchor point), and adds a record correlated with the intra-oGW-anchor UE identifier and user line identifier to the TOF session management table 278b. At this time, the TCP communication port of the anchor point is stored as the Multicast viewing information.

In S227, the CPU 73 obtains an IGMP packet by extracting the GTP-u user data from the GTP-u capsule. Next, the CPU 73 rewrites the source address (SA) information of the IGMP packet with the IP address of the offload network of the oGW 70. The CPU 73 then transmits the IGMP packet to the destination, and ends the processing in FIG. 74.

In S228, the CPU 73 determines whether or not the GTP-u user data is IGMP-leave (secession request). At this time, in the event that the GTP-u user data is IGMP-leave (secession request), the processing proceeds to S229, and in the event of IGMP-join (participation request), the processing proceeds to S227.

In S229, the CPU 73 deletes the record extracted from the TOF session management table 278b, and ends the processing in FIG. 74.

Figure 75:
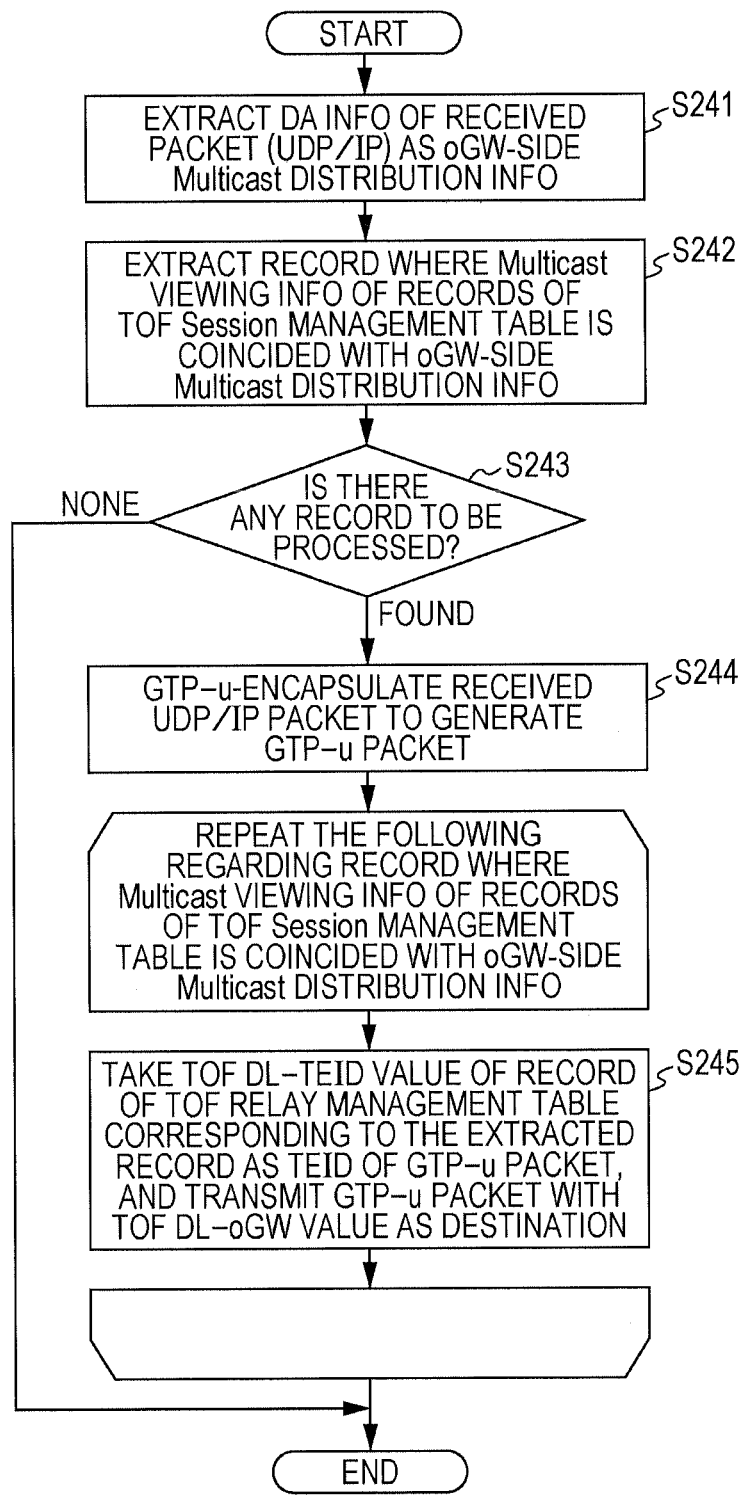
FIG. 75 illustrates a processing flow example in the event of an offload anchor point oGW having received a Multicast packet of IPTV broadcast distribution from the offload network.

FIG. 75 illustrates a processing flow example in the event that an oGW 70 serving as an offload anchor point has received a Multicast packet for IPTV broadcast distribution from the offload network 50.

In FIG. 75, in S241, the CPU 73 extracts the destination address information (DA information) of the received packet (UDP/IP) as oGW-side Multicast distribution information.

In the next S242, the CPU 73 searches a record of the TOF session management table 278b of which the Multicast viewing information value is coincided with the oGW-side Multicast distribution information, and extracts this.

In the next S243, the CPU 73 determines whether or not there is a record. In the event that there is no record, the processing in FIG. 75 is ended. On the other hand, in the event that there is a record, the processing proceeds to S244.

In S244, the CPU 73 performs GTP-u capsulation of the received packet (UDP/IP) to generate a GTP-u packet (capsulated packet).

In S245, the CPU 73 sets the TOF DL-TEID value (TOF Sorting point position) of a record of the TOF relay management table 278a corresponding to the record extracted in S242 as the TEID of the GTP-u packet. Next, the CPU 73 transmits the GTP-u packet with the TOF DL-oGW value as a destination. The processing in S245 is repeated until there is no record wherein the Multicast viewing information value is coincided with the oGW-side Multicast distribution information. Thereafter, the processing in FIG. 75 is ended.

With the second embodiment, a processing flow in the event that an oGW 70 serving as a sorting point has received a downlink packet addressed to UE 60 from an oGW 70 serving as an offload anchor point is the same as with the first embodiment (FIG. 29), and accordingly, description will be omitted.

Also, with the second embodiment, as for a processing flow when intercepting an Initial Context Setup Request message (MME→eNB), a processing flow when intercepting an Initial Context Setup Response message (eNB→MME), and the offload GTP-u tunnel generation processing, the exemplifications (FIGS. 30A, 31, and 30B) of the first embodiment may be applicable. Therefore, description will be omitted.

Also, with the second embodiment, as for a processing flow when intercepting a Handover Required message (source eNB→source MME), a processing flow when intercepting a Handover Request message (target MME→target eNB), and a processing flow when intercepting a Handover Request Ack. message (target eNB→target MME), the exemplifications (FIGS. 32 and 33) of the first embodiment may be applicable. Therefore, description will be omitted.

FIG. 76 illustrates a processing flow example when intercepting a Handover Command message (source MME→source eNB), according to the second embodiment. In FIG. 76, the processes in S291 through S294 are the same as the processes in S91 through S94 in the first embodiment (FIG. 35A), and accordingly, description will be omitted. In S295, the CPU 73 adds a record to the offload condition application state table 276A of a target oGW 70 with "user line identifier", "TCP connection information", and "offload anchor point information" of the offload condition application state table 276A corresponding to the intra-oGW UE identifier being taken as "user line identifier", "TCP connection information", and "offload anchor point information" corresponding to the intra-oGW UE identifier of the target oGW 70. The processing in S296 is similar to S96 in the first embodiment (offload GTP-u switching processing: FIG. 35B), and accordingly, description will be omitted. After completion of S296, the processing in FIG. 76 is ended.

With the second embodiment, as for a processing flow when intercepting a UE Context Release Command message (source MME→source eNB), and a processing flow when intercepting an X2AP: UE Context Release message (target eNB→source eNB), the exemplifications (FIGS. 36 and 40) of the first embodiment may be applicable. Therefore, description will be omitted.

FIG. 77 illustrates a processing flow example when intercepting an X2AP: Handover Request message (source eNB→target eNB), according to the second embodiment. In FIG. 77, the processes in S301 through S307, S309, and S310 are the same as S111 through S117, S119, and S120 with the first embodiment (FIG. 37), and accordingly, description will be omitted.

In S308, the CPU 73 adds a record including the user line identifier, Multicast viewing information, and a copy of offload anchor point information, in the offload condition application state table 276A corresponding to the intra-oGW UE identifier of the Source oGW 70 to the offload condition application state table 276A of the Target oGW 70 in a manner correlated with the intra-oGW UE identifier. Thereafter, the processing in FIG. 77 is ended.

Further, with the second embodiment, as for a processing flow when intercepting a Path Switch Request message (target eNB→MME), and a processing flow when intercepting a Path Switch Request Ack. message (MME→target eNB), the exemplifications (FIGS. 38 and 39) of the first embodiment may be applicable. Therefore, description will be omitted.

OPERATION EXAMPLES

Hereafter, operation examples of the second embodiment will be described with reference to the drawings.

Operation Example 6

Starting Viewing of IPTV Broadcast

First, operation after User Equipment (UE) 60 is activated until distribution of an IPTV broadcast to be offloaded is offloaded will be described with reference to the sequence in FIG. 64.

Operation 6-1: In FIG. 64, upon User Equipment 60 (UE#x) being activated, the UE#x transmits an Attach Request message to an eNB 11 (eNB#1) (<1> in FIG. 64). The Attach Request message arrives at an MME 21 (MME#1) via the eNB#1.

The MME 21 transmits a Create Session Request message to an S-GW (SGW) 22 (S-GW#1) (<2> in FIG. 64). The MME 21 receives a Create Session Response message from the S-GW 22 (<3> in FIG. 64).

Operation 6-2: The MME 21 which has received the Create Session Response message from the S-GW 22 generates an Initial Context Setup Request message (FIG. 14), and transmits this to the eNB 11 (<4> in FIG. 64). An oGW 70 intercepts the Initial Context Setup Request message (<5> in FIG. 64). Specifically, the oGW 70 executes the processing illustrated in FIGS. 30A and 30B.

According to the processing illustrated in FIG. 30A, intra-oGW UE identifier (8000), intra-MME UE identifier (MME#1 UE S1AP ID#x), MME device identifier (MME#1), intra-eNB UE identifier (eNB UE S1AP ID#x), eNB device identifier (eNB#1), user line identifiers (1, 2), uplink line assignment information (1: TEID#SGW-u1, SGW#1, 2: TEID#SGW-u2, SGW#1), TOF sorting point position information (1: offload non-application, 2: TOF DL-TEID#1), and TOF anchor point position information (TOF UL-TEID#1, oGW#1) are registered in the Bearer user determination table 175A and Bearer table 175B, and are determined (see the tables 175A and 175B indicated in FIG. 41). Also, according to the processing illustrated in FIG. 30B, an offload GTP-u tunnel is established between the sorting point 75 and anchor point 76 within the oGW 70.

Operation 6-3: Also, according to the CPU 73 of the oGW 70, the storage contents of the TOF relay management table 278a becomes the state indicated in FIG. 79. Specifically, with the TOF relay management table 278a, the intra-oGW-anchor UE identifier, user line identifier, TOF anchor point position, and TOF sorting point position are determined.

Operation 6-4: The eNB 11 which has received the Initial Context Setup request message transmits an Initial Context Setup Response message (FIG. 15) which is a response message (<6> in FIG. 64). The oGW 70 intercepts the Initial Context Setup Response message (<7> in FIG. 64), and executes the processing illustrated in FIG. 31. Thus, downlink line assignment information (1: eNB-TEID#1, eNB#1, 2: eNB-TEID#2, eNB#1) is registered in the Bearer table 175B, and is determined (see FIG. 78).

Operation 6-5: Next, with the sequence in FIG. 64, upon the UE 60 starting connection with an IPTV station (<8> in FIG. 64), a GTP-u packet (FIG. 66: IGMP-join packet) including uplink data of the UE 60 is transmitted from the eNB 11 (eNB#1) to the S-GW 22 (S-GW#1) (<9> in FIG. 64). Thereupon, the oGW 70 (oGW#1) receives the IGMP-join packet, and performs the processing illustrated in FIG. 73. At this time, the processing in S201 through S204 and S208 through S210 in FIG. 73 is executed.

Operation 6-6: According to the processing in S209 in FIG. 73, the Multicast viewing information and offload anchor point information corresponding to the intra-oGW UE identifier and user line identifier are stored in the offload condition application state table 276A (see the table 276A in FIG. 80).

Operation 6-7: According to the processing in S210 in FIG. 73, a GTP-u (IGMP-join) packet toward the offload anchor point indicated in FIG. 68 is generated, and is transmitted from an oGW 70 serving as a sorting point to an oGW 70 serving as an anchor point. Here, within the oGW 70 (oGW#1), the packet is transferred from the sorting point 75 to the anchor point 76.

Operation 6-8: At the anchor point 76, the processing illustrated in FIG. 74 is executed. Here, the processing in S221 through S227 is executed, and the IGMP-join packet (FIG. 69) is transmitted to the offload network 50 (<11> in FIG. 64). According to the processing in S226, the Multicast viewing information corresponding to the intra-oGW-anchor UE identifier and user line identifier is stored in the TOF session management table 278b (see FIG. 79).

Operation 6-9: Upon the IGMP-join packet arriving at an IPTV station (contents distribution server) via the offload network 50, a downlink packet (FIG. 70) arrives at the anchor point 76 of the oGW 70 (oGW#1) from the IPTV station via the offload network 50 (<12> in FIG. 64). At the anchor point 76, the processing illustrated in FIG. 75 is performed according to reception of the packet.

Figure 81:
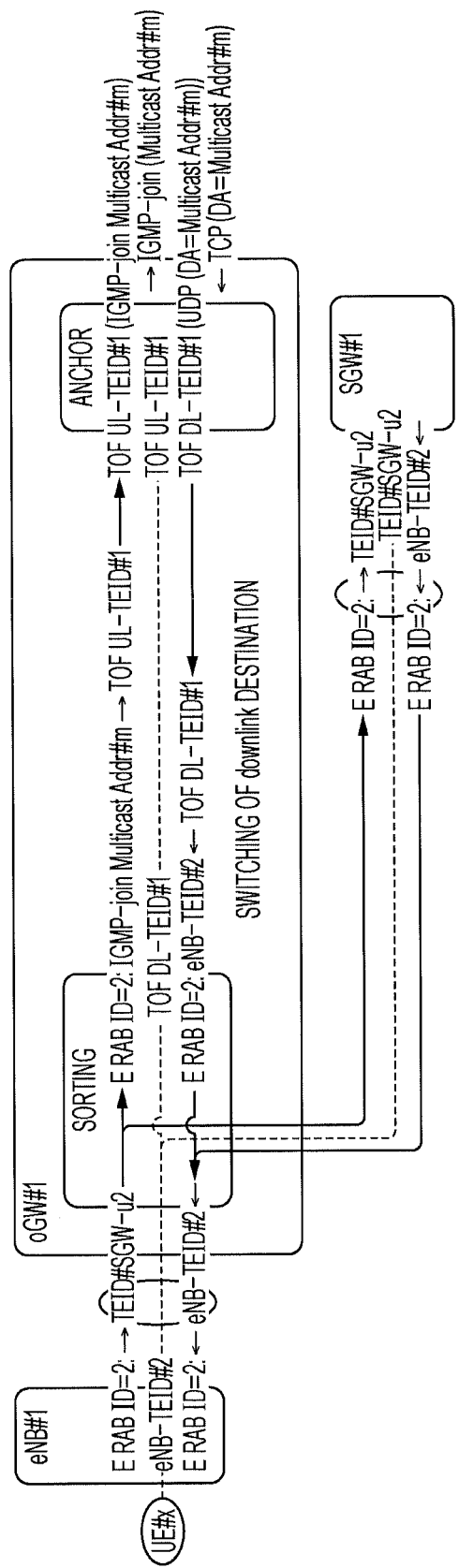
FIG. 81 illustrates an example (traffic flow) of an offload condition application state after start of IPTV broadcast viewing.

Operation 6-10: Next, upon the packet indicated in FIG. 71 being transmitted from the oGW 70 serving as an offload anchor point (oGW#1: anchor point 76) to the oGW 70 serving as a sorting point (oGW#1: sorting point 75) (<13> in FIG. 64), the sorting point 75 (oGW#1) receives the packet, and performs the processing illustrated in FIG. 29 (S51 through S53) to transmit the packet indicated in FIG. 67 to the base station 11 (eNB#1) (<14> in FIG. 64). The downlink data (IPTV broadcast content) is then arrived at the UE 60 (<15> in FIG. 64). Thus, Multicast viewing via the offload network 50 as illustrated in FIG. 81 is established, and the user of the UE 60 may view the broadcast content distributed from the IPTV station.

Operation 6-11: Data (IGMP-join) toward the IPTV station from the UE 60 (UE#x) is transmitted as follows. Specifically, the data (participation request) from the UE#x received at the eNB 11 (eNB#1) is transmitted using a GTP-u packet (IGMP-join) addressed to the S-GW#1 from the base station 11 (eNB#1). Upon receiving the GTP-u packet (IGMP-join), the sorting point 75 (oGW#1) performs the processing in FIG. 73 (including the sorting processing 174) to transmit the packet indicated in FIG. 68 to the anchor point 76 (oGW#1). Upon receiving the packet indicated in FIG. 68, the anchor point 76 (oGW#1) performs the processing illustrated in FIG. 74 to transmit the IGMP-join packet in FIG. 69 to the IPTV station via the offload network 50.

Operation 6-12: On the other hand, data (broadcast content) toward the UE#x from the IPTV station is distributed as follows. Specifically, the packet in FIG. 70 is transmitted to the anchor point 76 (oGW#1) from the IPTV station. Upon receiving the packet in FIG. 70, the anchor point 76 (oGW#1) performs the processing in FIG. 75 to transmit the packet in FIG. 71 to the sorting point 75 (oGW#1). Upon receiving the packet in FIG. 71, the sorting point 75 (oGW#1) performs the processing in FIG. 29 to transmit the packet in FIG. 67 to the eNB#1. The eNB#1 transmits the broadcast content data to the UE#x.

Operation Example 7

Maintaining of IPTV Broadcast for S1-Based Handover

Next, description will be made regarding operation until handover from the Source eNB to the Target eNB is performed in accordance with movement of UE 60 (UE#x) while maintaining viewing of an IPTV broadcast at the UE#x, in accordance with a sequence indicating the S1-based handover procedure in FIG. 4C.

Operation 7-1: Upon the Source eNB (eNB#1) starting the S1-based handover in accordance with movement of the UE#x, a Handover Required message (FIG. 16) is transmitted from the Source eNB (eNB#1) to a handover source MME 21 (hereafter, referred to as "source MME (MME#1)") (<1> in FIG. 4C). Thereupon, the Source oGW (oGW#1) intercepts the Handover Required message (<2> in FIG. 4C), and performs the processing illustrated in FIG. 32 (S81 and S82).

Operation 7-2: FIG. 82 illustrates an example of handover of an offload condition application state at the S1-based handover. According to the processing in FIG. 32, the identifier "Target ID=eNB#2" of a handover destination eNB 11 and the handover destination cell identification information "S-Target cell identification information=Cell ID#x" within the Handover Required message are registered in the Bearer user determination table 175b of the Source oGW (oGW#1), and are determined.

Operation 7-3: The source MME (MME#1) transmits a Forward Relocation Request message to the Target MME (MME#2) (<3> in FIG. 4C). Thereupon, the Target MME (MME#2) transmits a Handover Request message (FIG. 17) to Target eNB#2 (<4> in FIG. 4C). The Target oGW (oGW#2) intercepts the Handover Request message (<5> in FIG. 4C), and executes the processing illustrated in FIGS. 33 and 30B.

Operation 7-4: According to interception of the Handover Request message, as illustrated in FIG. 82, the Target oGW (oGW#2) stores the intra-oGW UE identifier, intra-MME UE identifier, MME device identifier, eNB device identifier, user line identifier, uplink line assignment information, TOF sorting point position information, TOF anchor point position information, and T-target cell identification information in the Bearer user determination table 175A' (tables 175a' and 175b'), and determines these.

Operation 7-5: Also, the Target oGW (oGW#2) stores, as illustrated in FIG. 83, the intra-oGW-anchor UE identifier, user line identifier, TOF anchor point position, and TOF sorting point position in the TOF relay management table 278a', and determines these.

Operation 7-6: Next, the Target eNB (eNB#2) transmits a Handover Request Ack. message (FIG. 18) to the Target MME (MME#2) (<6> in FIG. 4C). Thereupon, the Target oGW (oGW#2) intercepts the Handover Request Ack. message, and performs the processing in FIG. 34 (<7> in FIG. 4C).

Operation 7-7: According to the processing in FIG. 34, the Target oGW (oGW#2) stores, as illustrated in FIG. 82, the downlink line assignment information in the Bearer table 175B', and determines this. Also, the Target oGW (oGW#2) stores the intra-T-Target-cell UE identification information obtained from the Handover Request Ack. message in the Bearer user determination table 175A', and determines this.

Operation 7-8: The Target MME (MME#2) which has received the Handover Request Ack. message transmits a Forward Relocation Response message to the Source MME (MME#1) (<8> in FIG. 4C). Thereupon, the Source MME (MME#1) transmits a Handover Command message (FIG. 19) to the Target eNB (eNB#1) (<9> in FIG. 4C). At this time, the Source oGW (oGW#1) intercepts the Handover Command message (<10> in FIG. 4C), and performs the processing in FIG. 76.

Operation 7-9: According to the processing in FIG. 76, the Source oGW (oGW#1) registers the intra-S-Target-cell UE identification information in the Bearer user determination table 175A, and determines this (see FIG. 82). Thus, the Target ID, S-Target cell identification information, and intra-S-Target-cell UE identification information in the Bearer user determination table 175A of the Source oGW (oGW#1) is coincided with the eNB device identifier, T-Target cell identification information, and intra-T-Target-cell UE identification information in the Bearer user determination table 175A' of the Target oGW (oGW#2). Accordingly, the intra-oGW UE identifier (8000) of the Source oGW (oGW#1) may be correlated with the intra-oGW UE identifier (8102) of the Target oGW (oGW#2) for the User Equipment 60 (UE#x).

Operation 7-10: According to the processing in S295 in FIG. 76, the oGW#1 registers, as illustrated in FIG. 84, a copy of the user line identifier, TCP connection information, and offload anchor point information corresponding to the intra-oGW UE identifier (8000) in the offload condition application state table 176A of the oGW#1 in the offload condition application state table 176A' of the oGW#2 in a manner correlated with the intra-oGW UE identifier (8102) of the UE#x in the oGW#2 in collaboration with the oGW#2. Thus, the oGW#1 and oGW#2 may recognize offload anchor point information for each traffic to be offloaded.

Operation 7-11: Also, the oGW#1 switches, based on the storage contents of the table 278a' (FIG. 83), the TOF sorting point position corresponding to the offload anchor point information (TOF UL-TEID#1) at the anchor point 76 of the oGW#1 to the TOF sorting point position information (TOF DL-TEID#2) of the oGW#2 (see FIG. 83).

Figure 85:
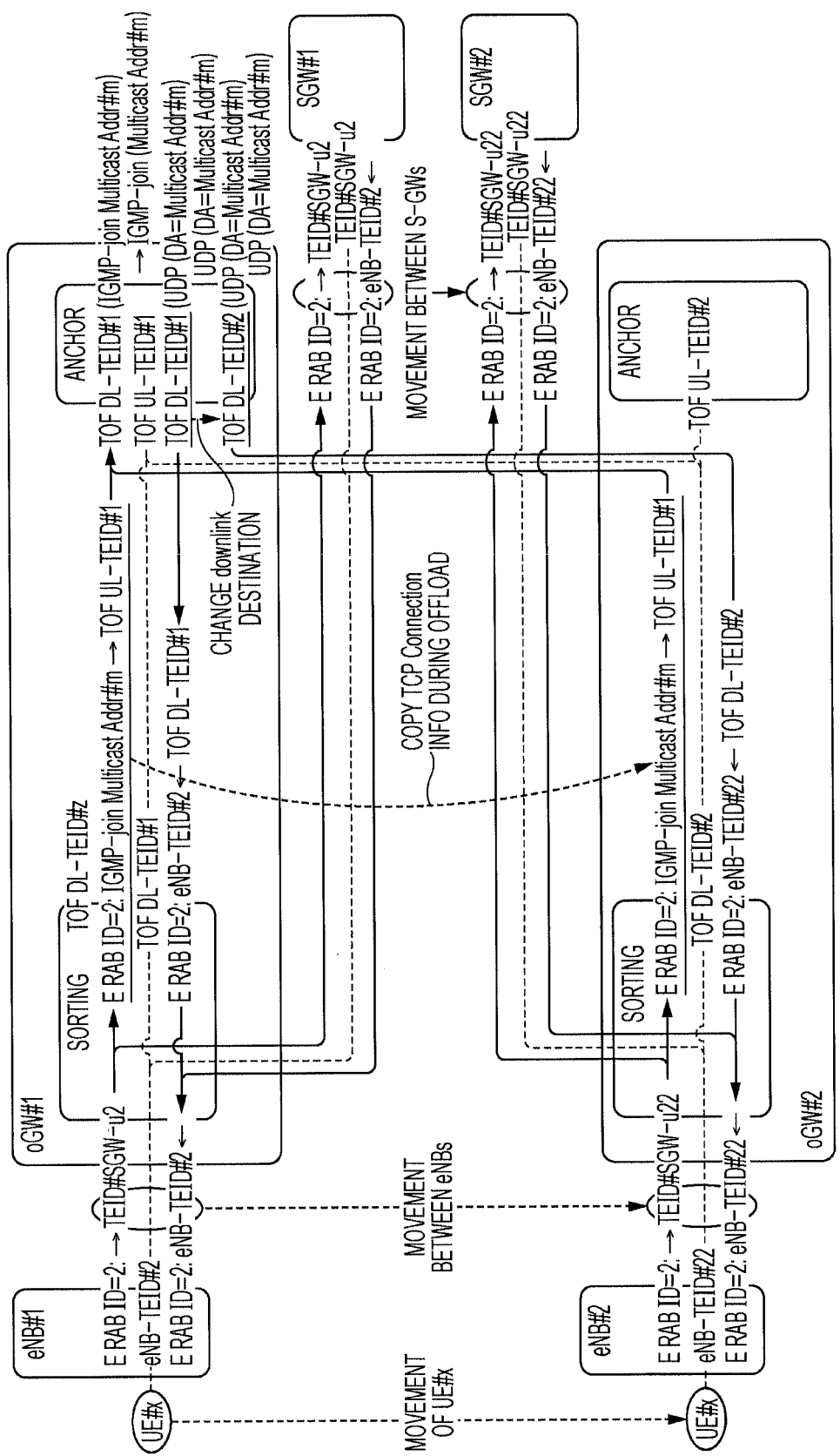
FIG. 85 illustrates an example (traffic flow) of handover of an offload state application state (IPTV broadcast viewing information) at the S1-based Handover.

Thus, as illustrated in FIG. 85, with the S1-based handover in accordance with movement of the UE#x, there is made transition into a path of UE#x→eNB#2→sorting point 75 (oGW#2)→anchor point 76 (oGW#1)→IPTV broadcast station while maintaining viewing of an IPTV broadcast.

Operation 7-12: Data (IGMP-join) from the UE#X that the eNB#2 receives after completion of the operation 7-11 is transmitted to the IPTV station as follows. Specifically, the GTP-u packet (IGMP-join) is transmitted from the eNB#2 to the S-GW#2. Upon receiving the packet, the sorting point 75 (oGW#2) performs the processing in FIG. 73 to transmit the packet indicated in FIG. 68 to the anchor point 76 (oGW#1). Upon receiving the packet indicated in FIG. 68, the anchor point 76 (oGW#1) performs the processing in FIG. 74 to transmit the packet in FIG. 69 to the IPTV station via the offload network 50.

Operation 7-13: On the other hand, data toward the UE#x from the IPTV station is transmitted as follows. The downlink data (broadcast content) from the IPTV station is transmitted to the anchor point 76 (oGW#1) via the offload network 50 using the packet indicated in FIG. 70. Upon receiving the packet indicated in FIG. 70, the anchor point 76 (oGW#1) performs the processing in FIG. 75 to transmit the packet in FIG. 71 to the sorting point 75 (oGW#2). Upon receiving the packet indicated in FIG. 71, the sorting point 75 (oGW#2) performs the processing illustrated in FIG. 29 (including the merging processing 173) to transmit the packet in FIG. 67 to the eNB#2. The eNB#2 transmits the downlink data to the UE#x.

Operation 7-14: The Source MME (MME#1) transmits a UE Context Release Command message (FIG. 20) to the Source eNB (eNB#1) (<19> in FIG. 4C). Thereupon, the Source oGW (oGW#1) intercepts the UE Context Release Command message (<20> in FIG. 4C), and performs the processing illustrated in FIG. 36.

Operation 7-15: According to the processing in S101 through S104 illustrated in FIG. 36, a record corresponding to the intra-oGW UE identifier (8000) at the Source oGW (oGW#1) is deleted. Specifically, the corresponding records of the Bearer user determination table 175A, Bearer table 175B, and offload condition application state table are deleted (see FIGS. 86 and 87). The resource of the sorting point 75 of the Source oGW (oGW#1) is released. Note that FIG. 89B indicates an example of the offload condition application state after handover completion.

Figure 88:
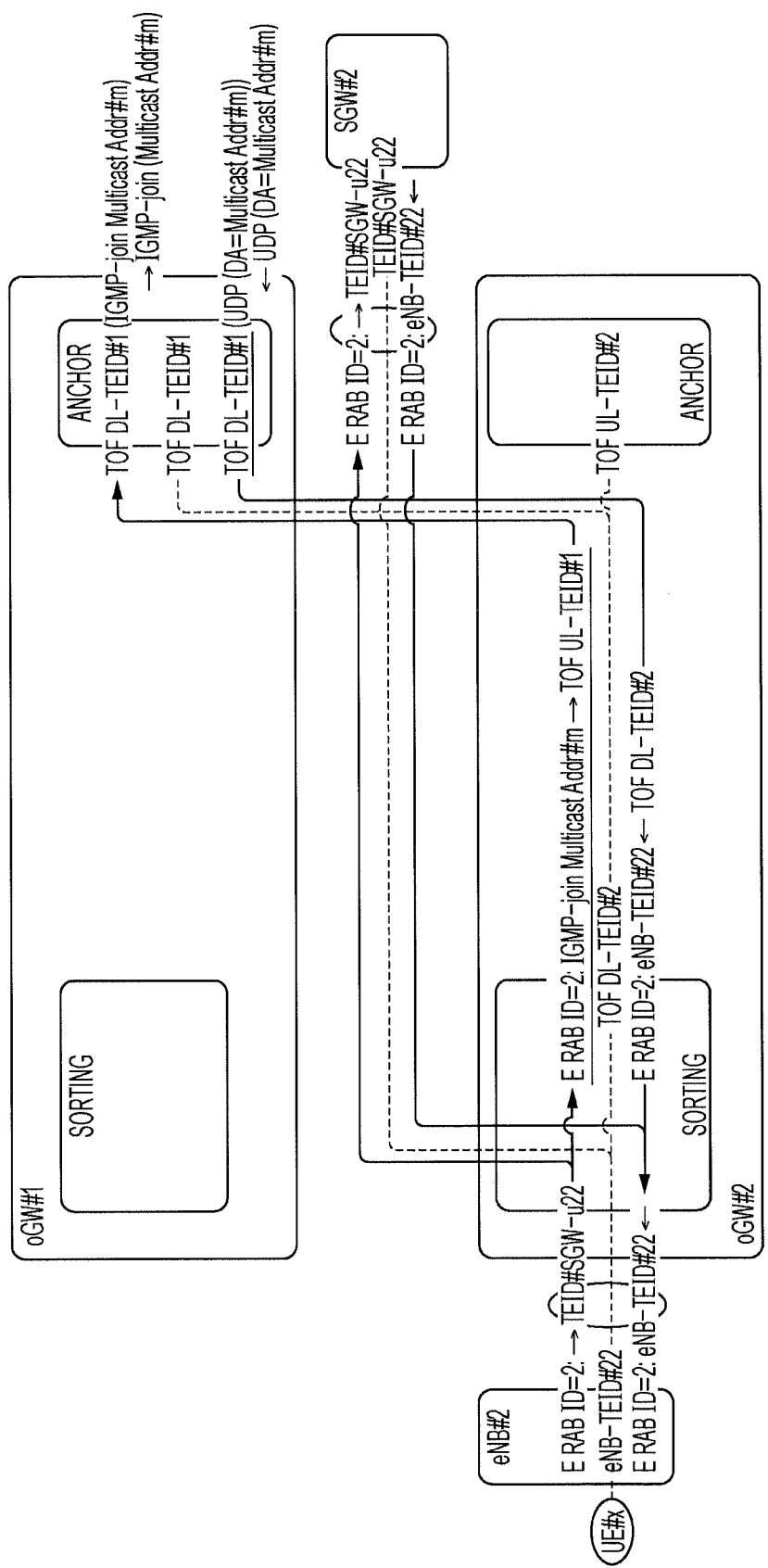
FIG. 88 illustrates an example (traffic flow) of an offload state application state maintaining IPTV broadcast viewing at the time of Handover completion.

Thus, as illustrated in FIG. 88, the resource of the anchor point 76 of the Source oGW (oGW#1) is held to maintain viewing of an IPTV broadcast.

Operation Example 8

Maintaining of IPTV Broadcast for X2-Based Handover

Next, operation until handover from the Source eNB to the Target eNB is performed in accordance with movement of the UE#x while maintaining TCP communication at the UE#x will be described in accordance with the sequence illustrated in FIG. 4D.

Operation 8-1: Upon the Source eNB (eNB#1) starting the X2-based handover in accordance with movement of the UE#x, an X2AP: Handover Request message (FIG. 21) is transmitted from the Source eNB (eNB#1) to the Target eNB (eNB#2) (<1> in FIG. 4D). The Source oGW (oGW#1) intercepts the X2AP: Handover Request message (<2> in FIG. 4D), and performs the processing illustrated in FIG. 77 (S301, S309, and S310).

Operation 8-2: According to the processing illustrated in FIG. 77, the Source oGW (oGW#1) determines the intra-eNB UE identifier (X2AP) in the Bearer user determination table 175A (see FIG. 89A).

Operation 8-3: The Target oGW (oGW#2) intercepts the X2AP: Handover Request message (<3> in FIG. 4D), and performs the processing illustrated in FIG. 77 (S301 through S308) and the offload GTP-u tunnel generation processing illustrated in FIG. 30B.

Operation 8-4: According to the processing in S301 through S308, with the Target oGW (oGW#2), as illustrated in FIG. 89A, the intra-oGW UE identifier, intra-MME UE identifier, MME device identifier, eNB device identifier, user line identifier, uplink line assignment information, TOF sorting point position information, and TOF anchor point position information are determined and stored in the Bearer user determination table 175A' and Bearer table 175B'.

Operation 8-5: Also, with the Target oGW (oGW#2), as illustrated in FIG. 90, the intra-oGW-anchor UE identifier, user line identifier, TOF anchor point position, and TOF sorting point position are determined and stored in the TOF relay management table 278a'.

Operation 8-6: As described above, with the Bearer user determination table 175A' of the Target oGW (oGW#2), the intra-MME UE identifier is determined. At this time, as illustrated in FIG. 89A, the intra-MME UE identifier in the Bearer user determination table 175A of the oGW#1 is coincided with the intra-MME UE identifier in the Bearer user determination table 175A' of the oGW#2. Thus, correlation between the intra-oGW UE identifier (8000) of the oGW#1 and the intra-oGW UE identifier (8102) of the oGW#2 for the UE#x may be realized.

Figure 91:
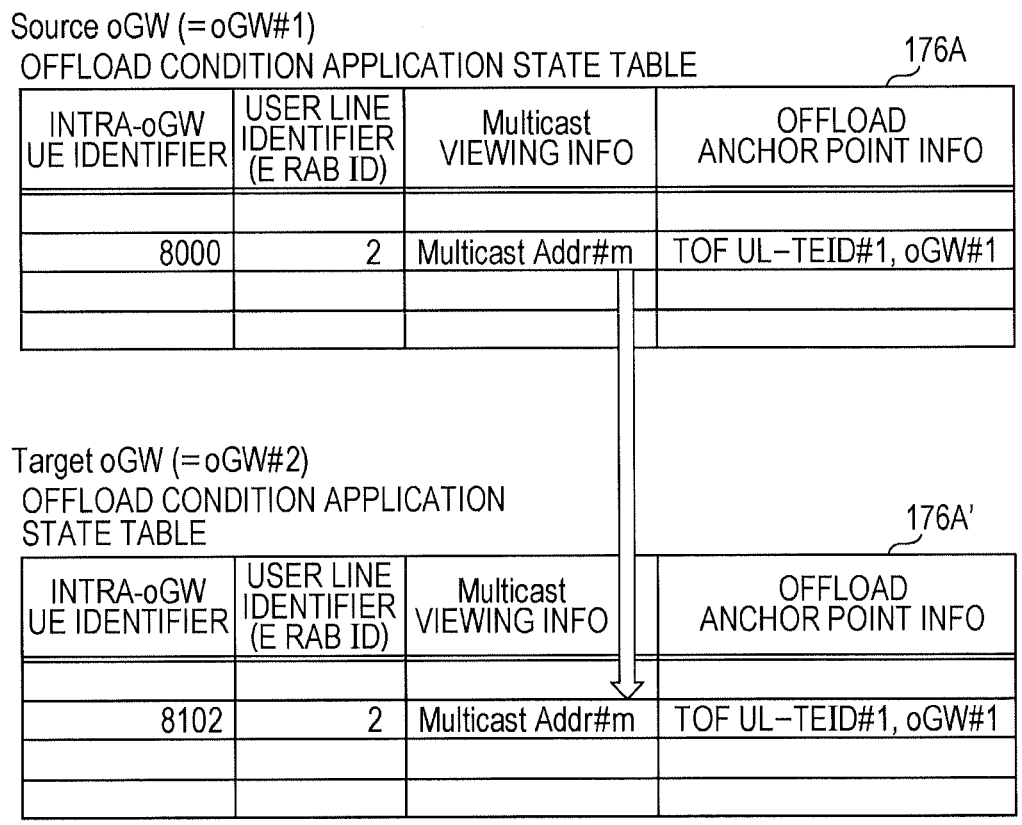
FIG. 91 indicates an example (offload condition application state data setting example) of handover of an offload state application state (IPTV broadcast viewing information) at the X2-based Handover.

Operation 8-7: As illustrated in FIG. 91, a copy of the user line identifier, Multicast viewing information, and offload anchor point information in the offload condition application state table 176A corresponding to the inter-oGW UE identifier (8000) of the oGW#1 is delivered from the oGW#1 to the oGW#2. The oGW#2 stores the copy in the offload condition application state table 176A' of the oGW#2. Thus, the oGW#2 may recognize offload anchor point information for each traffic to be offloaded.

Operation 8-8: Thereafter, an X2AP: Handover Request Ack. message is transmitted from the Target eNB (eNB#2), and arrived at the Source eNB (eNB#1) via the oGW#2 and oGW#1 (<4> in FIG. 4D). Thereafter, downlink data from the offload network 50 and PGW 23 arrives at the UE#x via the Source eNB (eNB#1), oGW#1, oGW#2, and Target eNB (eNB#2) (<5> in FIG. 4D). Uplink data from the UE#x is transmitted to the offload network 50 (PGW 23) via the Target eNB (eNB#2) and oGW#2 (<6> in FIG. 4D).

Operation 8-9: Next, the Target eNB (eNB#2) transmits a Path Switch Request message (FIG. 24) to the MME (MME#1) (<7> in FIG. 4D). The target oGW (oGW#2) intercepts the Path Switch Request message (<8> in FIG. 4D), and performs the processing in FIGS. 38 and 35B.

Operation 8-10: According to the processing in FIGS. 38 and 35B, the TOF sorting point position stored in the TOF relay management table 178a' of the oGW#2 is delivered to the oGW#1, and is set as the TOF point position in the TOF relay management table 178a of the oGW#1 (S96c in FIG. 35B). Thus, the TOF sorting point position at the Source oGW (oGW#1) is switched to the TOF sorting point position (TOF DL-TEID#2) of the oGW#2.

Operation 8-11: Thereafter, the MME (MME#1) transmits a Path Switch Request Ack. message (FIG. 25) to the Target eNB (eNB#2) (<17> in FIG. 4D). Thereupon, the Target eNB (eNB#2) intercepts the Path Switch Request Ack. message, and performs the processing illustrated in FIG. 39 (S135 and S136) (<18> in FIG. 4D).

Operation 8-12: According to the processing illustrated in FIG. 39, with the Bearer table 175B' of the Target oGW (oGW#2), the uplink line assignment information corresponding to the intra-oGW UE identifier (8102) is switched from the S-GW#1 to the S-GW#2 (see FIG. 89A).

Figure 92:
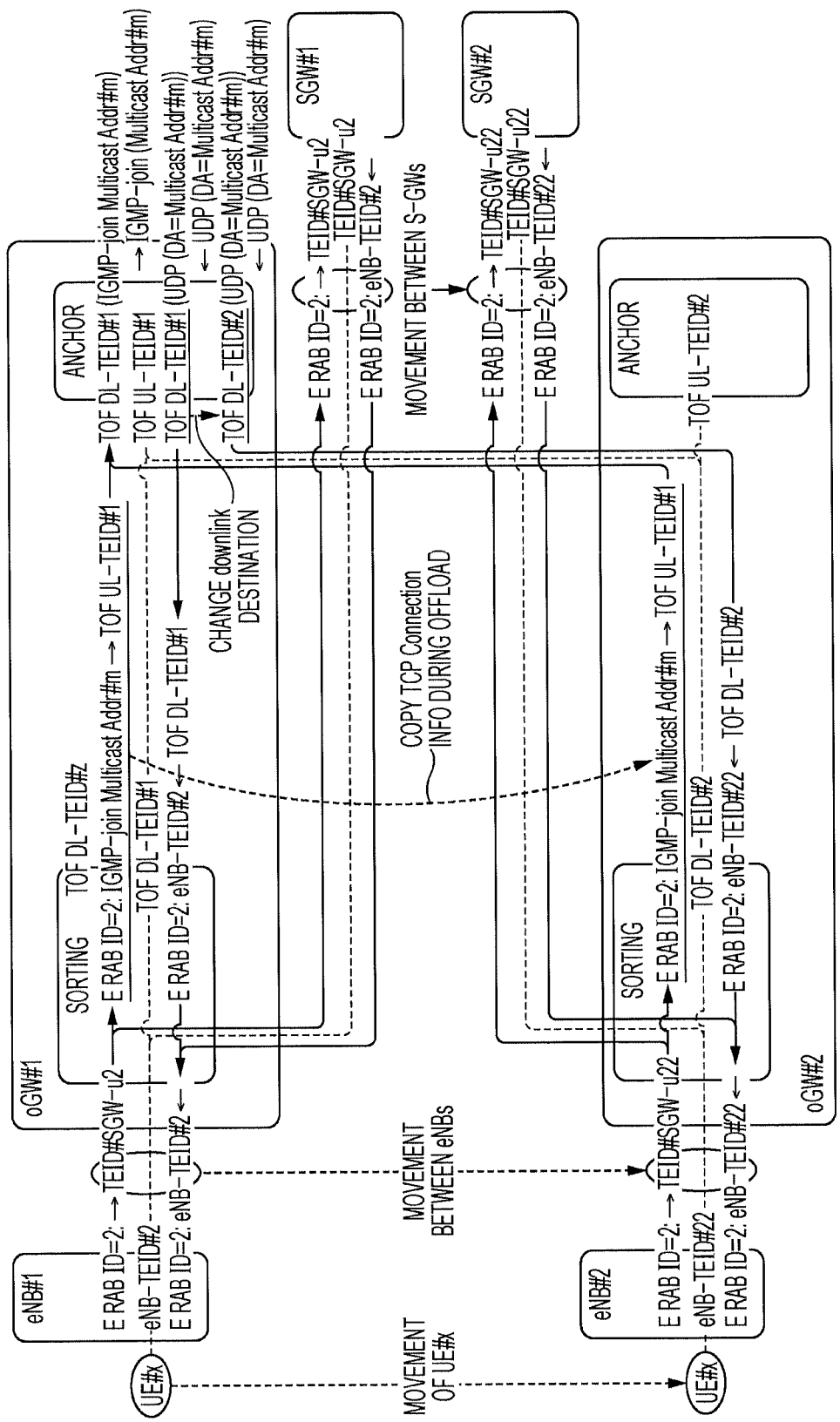
FIG. 92 illustrates an example (traffic flow) of handover of an offload state application state (IPTV broadcast viewing information) at the X2-based Handover.

Thus, as illustrated in FIG. 92, with the X2-based handover in accordance with movement of the UE#x, there is made transition into a path of UE#x→eNB#2→sorting point (oGW#2)→anchor point (oGW#1)→IPTV station while maintaining viewing of IPTV.

Operation 8-13: According to the operation example 3, uplink data (IGMP-join or IGMP-leave) toward the website from the UE#x is transmitted as follows. Specifically, uplink data (participation or secession request) from the UE#x to be received at the eNB#2 is transmitted using a GTP-u packet (IGMP-join or IGMP-leave) addressed to the S-GW#1. Upon receiving the packet in FIG. 66, the sorting point 75 (oGW#2) performs the processing in FIG. 73 to transmit the packet indicated in FIG. 68 to the anchor point 76 (oGW#1). Upon receiving the packet in FIG. 68, the anchor point 76 (oGW#1) performs the processing in FIG. 74 to transmit the packet in FIG. 69 to the IPTV station.

Operation 8-14: On the other hand, downlink data (broadcast content) toward the UE#x from the IPTV station is transmitted as follows. Specifically, the packet in FIG. 70 is transmitted from the IPTV station to the anchor point 76 (oGW#1). Upon receiving the packet in FIG. 70, the anchor point 76 (oGW#1) performs the processing in FIG. 75 to transmit the packet in FIG. 71 to the sorting point 75 (oGW#2) (<14> in FIG. 4D). Upon receiving the packet in FIG. 71, the sorting point 75 (oGW#2) performs the processing in FIG. 29 to transmit the packet in FIG. 67 to the eNB#2 (<15> in FIG. 4D). The downlink data is then transmitted from the eNB#2 to the UE#x (<16> in FIG. 4D).

Operation 8-15: Thereafter, through not illustrated in FIG. 4D, the Target eNB (eNB#2) transmits an X2AP: UE Context Release message to the Source eNB (eNB#1). Thereupon, the Source oGW (oGW#1) intercepts the X2AP: UE Context Release message, and performs the processing (S121 through S124) illustrated in FIG. 40. Thus, a record corresponding to the intra-oGW UE identifier (8000) of the Source oGW (oGW#1) is deleted from the Bearer user determination table 175A and Bearer table 175B (see FIG. 49), and also the offload condition application state table 176A is deleted (see FIG. 50A). The resource of the sorting point 75 of the Source oGW (oGW#1) is then released. In this way, as illustrated in FIG. 51, the resource of the anchor point 76 of the Source oGW (oGW#1) is held to maintain IPTV viewing.

Operation Example 9

Starting Viewing of New IPTV After Handover

Next, description will be made regarding a case where in a state in which the UE#x maintains IPTV viewing, viewing of a new IPTV broadcast is started after handover.

Operation 9-1: Upon the UE#x starting viewing of a new IPTV broadcast, a GTP-u packet (IGMP-join) is transmitted from the Target eNB (eNB#2) to the Target S-GW (S-GW#2). Thereupon, the Target oGW (oGW#2) receives the GTP-u packet (IGMP-join), and performs the processing illustrated in FIG. 73. As a result of this processing, the packet indicated in FIG. 68 is transmitted from the sorting point 75 of the Target oGW (oGW#2) to the anchor point 76 of the Target oGW (oGW#2).

Operation 9-2: New Multicast viewing information and offload anchor point information thereof, corresponding to the intra-oGW UE identifier and user line identifier, are stored in the offload condition application state table 176A' of the Target oGW (oGW#2) (see FIG. 93).

Operation 9-3: Next, upon the anchor point 76 (oGW#2) receiving the packet indicated in FIG. 68, the processing illustrated in FIG. 74 is executed, and the packet indicated in FIG. 69 is transmitted to the IPTV station via the offload network 50.

Operation 9-4: With the TOF session management table 278b' of the Target oGW (oGW#2), the Multicast viewing information corresponding to the intra-oGW-anchor UE identifier (8102) and user line identifier (2) is stored (see FIG. 94).

Operation 9-5: Next, the packet indicated in FIG. 69 arrives at the IPTV station (may be the same/differ as/from the IPTV station (content distribution server) where viewing is maintained) via the offload network 50. Thereupon, the packet indicated in FIG. 70 arrives at the anchor point 76 (oGW#2) from the IPTV station via the offload network 50. The anchor point 76 (oGW#2) receives the packet indicted in FIG. 70, and performs the processing illustrated in FIG. 75.

Figure 95:
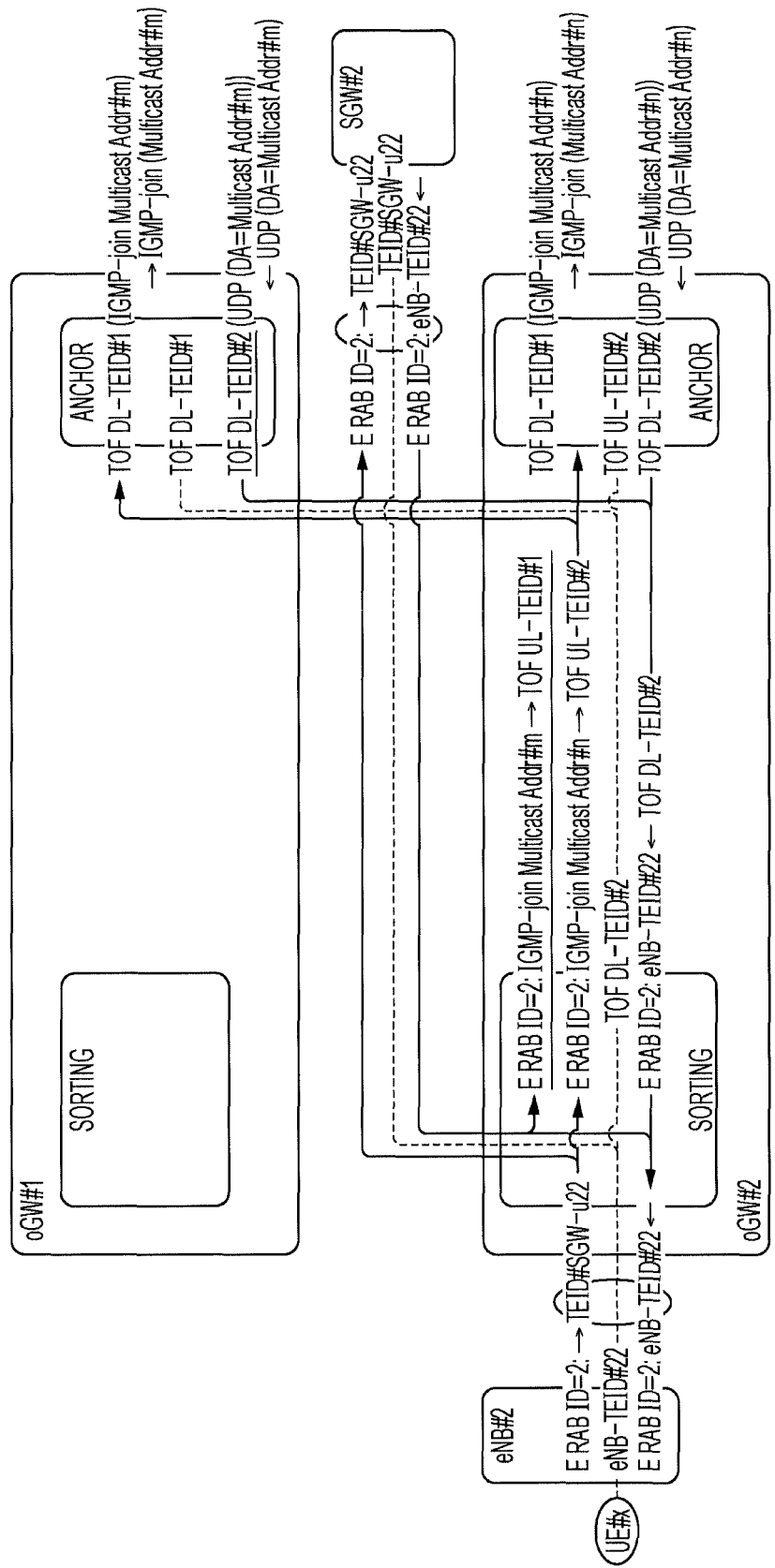
FIG. 95 illustrates an example (traffic flow) of an offload condition application state after start of new IPTV broadcast viewing after Handover.

Operation 9-6: Next, the packet indicated in FIG. 71 is transmitted from the anchor point 76 (oGW#2) to the sorting point 75 (oGW#2). The sorting point 75 (oGW#2) which has received this packet performs the processing illustrated in FIG. 29 to transmit the packet in FIG. 67 to the Target eNB (eNB#2). Thus, as illustrated in FIG. 95, viewing of a new IPTV broadcast is started via the offload network 50. Note that FIG. 96 indicates Bearer state data after starting viewing of a new IPTV broadcast.

Operation 9-7: The transmission path of uplink data and downlink data between the UE#x and IPTV station and processing at the oGW#1 and oGW#2 according to the maintained IPTV viewing are not changed from the cases of the operation examples 7 and 8, and accordingly, description will be omitted.

On the other hand, with regard to new IPTV broadcast viewing, uplink data (IGMP) toward the IPTV station from the UE#x is transmitted as follows. Specifically, the uplink data is transmitted from the eNB#2 to the S-GW#2 using a GTP-u packet (IGMP-join or IGMP-leave). Upon receiving the packet indicated in FIG. 66, the sorting point 75 (oGW#2) performs the processing illustrated in FIG. 73 to transmit the packet indicated in FIG. 68 to the anchor point 76 (oGW#2). Upon receiving the packet indicated in FIG. 68, the anchor point 76 (oGW#2) performs the processing in FIG. 74 to transmit the packet indicated in FIG. 69 to the IPTV station.

On the other hand, downlink data (broadcast content) toward the UE#x from the IPTV station according to new IPTV broadcast viewing is transmitted as follows. Specifically, the downlink data is transmitted from the IPTV station to the anchor point 76 (oGW#2) using the packet indicated in FIG. 70. Upon receiving the packet indicated in FIG. 70, the anchor point 76 (oGW#2) performs the processing in FIG. 75 to transmit the packet indicated in FIG. 71 to the sorting point 75 (oGW#2). Upon receiving the packet in FIG. 71, the sorting point 75 (oGW#2) performs the processing in FIG. 29 to transmit the packet in FIG. 67 to the eNB#2. The downlink data (broadcast content) is then transmitted from the eNB#2 to the UE#x.

In this way, an offload anchor point according to new IPTV viewing generated after handover is set to the anchor point 76 of an oGW which intermediates between an eNB and an S-GW to which the UE#x is connected at the time of starting thereof.

Operation Example 10

Secession from IPTV Broadcast Viewing After Handover

Description will be made regarding a case where in a state maintaining viewing of an IPTV broadcast, the UE#x secedes from this viewing state after handover.

Operation 10-1: Upon the UE#x stopping viewing of an IPTV broadcast (seceding from IPTV broadcast viewing), the GTP-u packet of IGMP-leave (FIG. 66) is transmitted from the Target eNB (eNB#2) to the Target S-GW (S-GW#2). The Target oGW (oGW#2) receives the GTP-u packet (IGMP-leave), and performs the processing indicated in FIG. 73 to transmit the packet indicated in FIG. 68 to the anchor point 76 (oGW#1).

Figure 97:
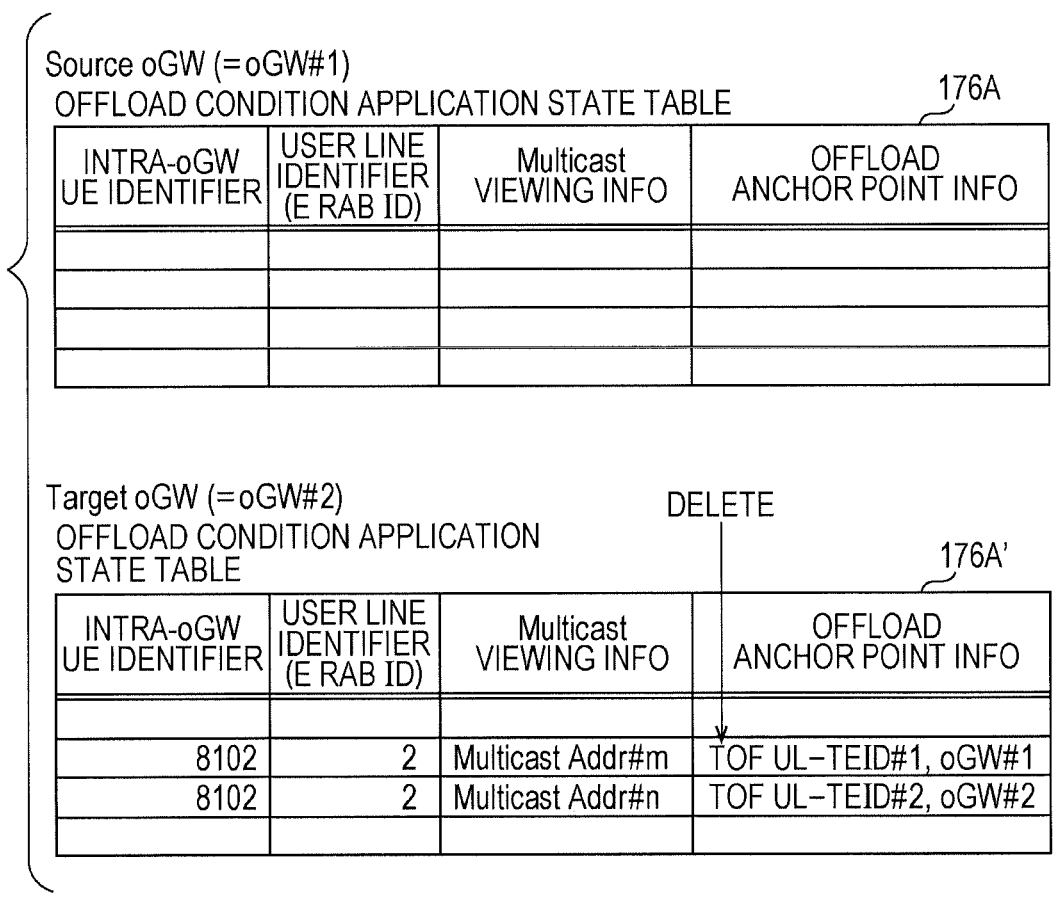
FIG. 97 indicates an example (offload condition application state data setting example) of an offload condition application state after start of new IPTV broadcast viewing after Handover.

Operation 10-2: According to the processing illustrated in FIG. 73 (S205 and S206), as illustrated in FIG. 97, a record (intra-oGW UE identifier, user line identifier, Multicast viewing information, and offload anchor point information) corresponding to IPTV broadcast viewing is deleted from the offload condition application state table 176A' of the Target oGW (oGW#2).

Operation 10-3: Next, the packet indicated in FIG. 68 is transmitted from the sorting point 75 of the Target oGW (oGW#2) to the anchor point 76 of the Source oGW (oGW#1). Upon receiving the packet indicated in FIG. 68, the anchor point 76 (oGW#1) performs the processing illustrated in FIG. 74 to transmit the packet indicated in FIG. 69 to the IPTV station.

Figure 98:
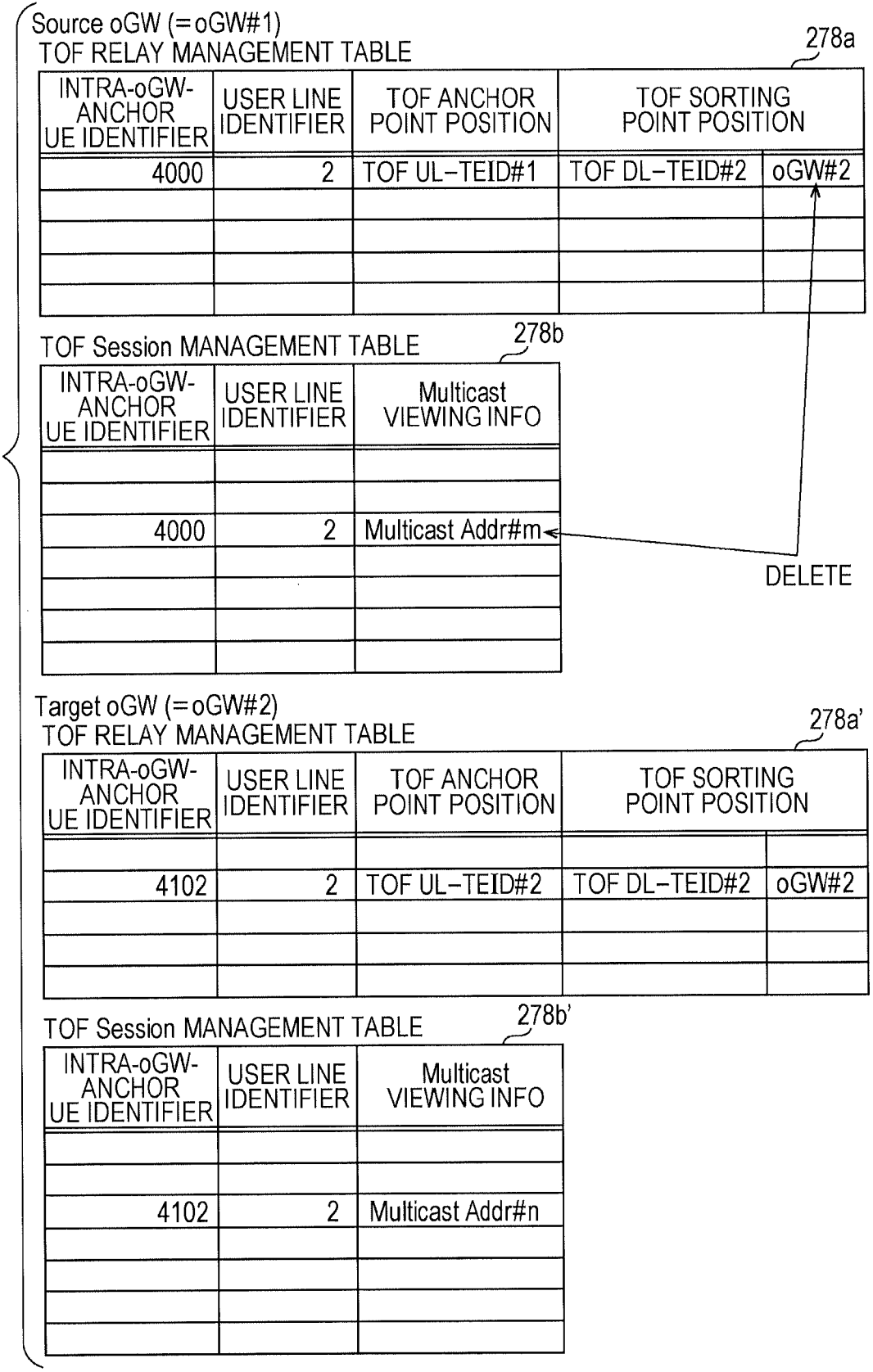
FIG. 98 indicates an example (TOF relay state management data setting example) of an offload condition application state after start of IPTV broadcast viewing after Handover.

Operation 10-4: According to the processing illustrated in FIG. 74 (S228 and S229), as illustrated in FIG. 98, the corresponding record of the TOF session management table 278b at the anchor point 76 of the Source oGW (oGW#1) is deleted. Also, the corresponding record of the TOF relay management table 278a is also deleted.

Operation 10-5: Upon the packet indicated in FIG. 69 arriving at the IPTV station via the offload network 50, the packet indicated in FIG. 70 arrives at the anchor point 76 (oGW#1) from the IPTV station via the offload network 50. Upon receiving the packet indicated in FIG. 70, the anchor point 76 (oGW#1) performs the processing illustrated in FIG. 75. At this moment, the UE#x has seceded from the multicast group. Therefore, distribution of a multicast packet for the UE#x is not carried out.

Figure 99:
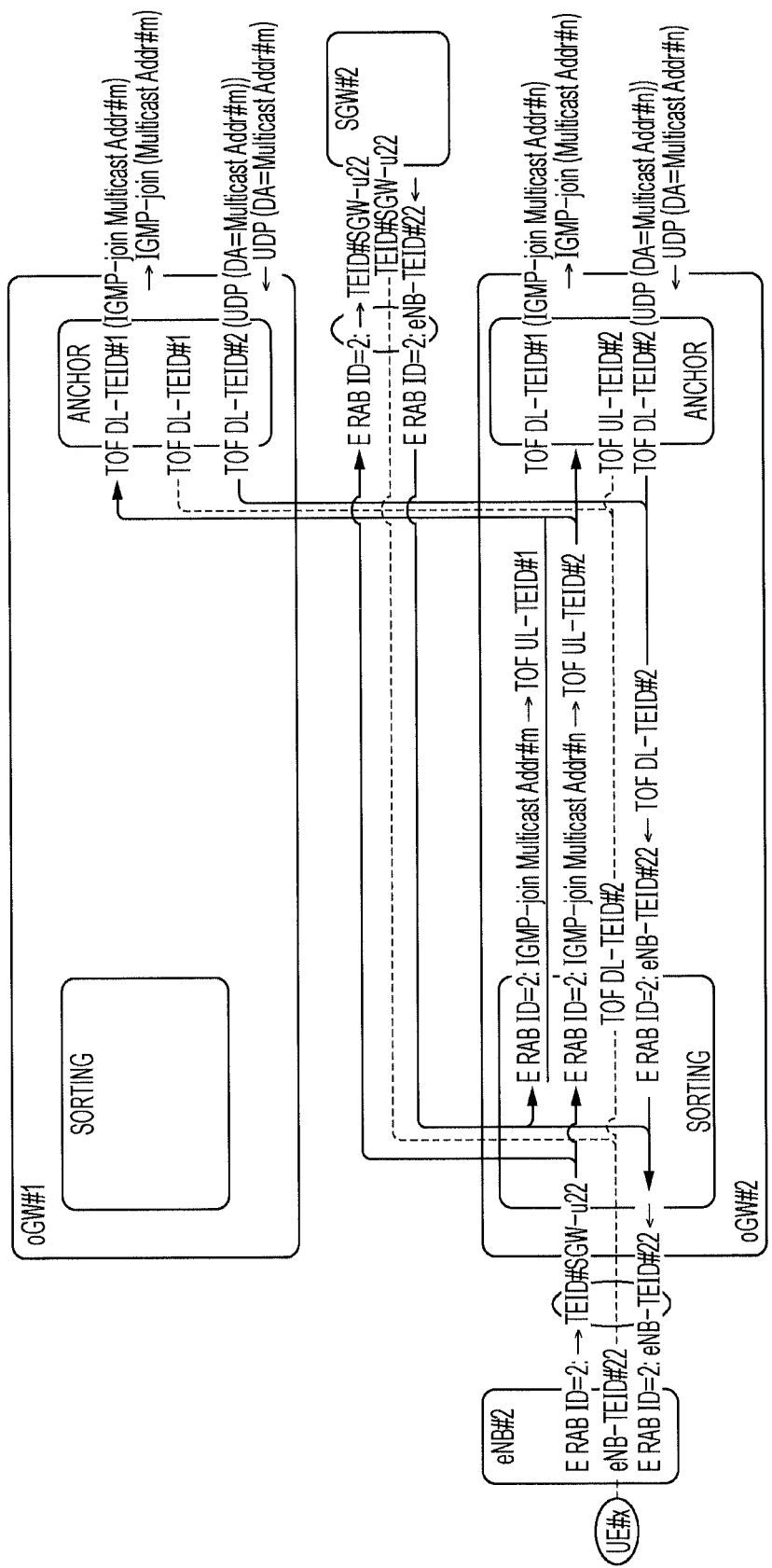
FIG. 99 illustrates an example (traffic flow) of an offload condition application state after secession of IPTV broadcast viewing after Handover.

Thus, as illustrated in FIG. 99, the path for IPTV broadcast viewing is deleted. However, the path for new IPTV broadcast viewing is maintained.

Operation 10-6: The path of uplink and downlink according to new IPTV broadcast viewing has not been changed since establishment of the new TCP connection, and accordingly, description will be omitted. Note that FIG. 100 indicates Bearer state data after IPTV broadcast secession.

According to the second embodiment, an oGW 70 has the sorting point 75 and anchor point 76, and with handover as a trigger, the Target oGW holds information of an offload anchor point, and viewing information of a maintained IPTV broadcast (Multicast viewing information). Thus, at the time of starting of viewing of a new IPTV broadcast, viewing of an IPTV broadcast with the own oGW as an offload anchor point (establishment of the reception path of a Multicast packet) may be enabled. Also, IGMP-leave (secession request) may suitably be informed to the oGW 70 serving as an offload anchor point.

In this way, with starting of providing a Multicast distribution service, it may be avoided that the distribution path of a new Multicast packet is established via an offload anchor point which has first been set.

Thus, for example, in FIG. 63, in a state in which User Equipment 60 is connected to the base station 11C, the distribution path of the Multicast packet from the IGMP station#n (server 41B) may be established via the offload network 52 instead of the offload network 51. In this case, traffic from the offload GW#C to the offload GW#A is deleted. Accordingly, according to reduction in traffic for offload in the EPC network 20 (core network: mobile transmission network), improvement in traffic reduction, load reduction for the EPC network 20, and effective utilization of resources may be realized.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A network system comprising:
 a plurality of base stations, each with which a mobile station communicates;
 a core network to include the plurality of base stations; and
 a plurality of offload devices, each arranged between the base station and a node device included in the core network, each to serve as the node device of an anchor point at which traffic to be offloaded is transmitted/received to/from an offload network, and each to serve as the node device of a relay point at which the traffic to be offloaded is relayed between the anchor point and one of the plurality of base stations with which the mobile station is communicating,
 wherein each of the plurality of offload devices includes:
  a storage device in which, in a case that the mobile station starts communicating of traffic to be offloaded via a first offload device, anchor point information including line information of the traffic, identification information of the traffic, and position information of the anchor point of the traffic are stored, relating to the first offload device;
  a packet transfer device to transmit, in a case that a second offload device serves as the node device of the relay point due to handover of the mobile station while the mobile station is communicating, the anchor point information to the second offload device; and
  a controller to control the packet transfer device so that the packet transfer device relays the traffic to be offloaded using the anchor point information received from the second offload device in a case that the first offload device serves as the node device of the relay point, and to release the first offload device from serving as the node device of the anchor point in a case of completion of the traffic.

2. An offload device comprising:
 a storage device in which, in a case that a mobile station starts communicating of traffic to be offloaded via a first offload device, anchor point information including line information of traffic, identification information of the traffic, and position information of an anchor point of the traffic are stored, relating to the first offload device;
 a packet transfer device to transmit, in a case that a second offload device serves as a node device of a relay point due to handover of the mobile station while the mobile station is communicating, the anchor point information to the second offload device; and
 a controller to control the packet transfer device so that the packet transfer device relays the traffic to be offloaded using the anchor point information received from the second offload device in a case that the first offload device serves as the node device of the relay point, and to release the first offload device from serving as the node device of the anchor point in a case of completion of the traffic,
 wherein the offload device is arranged between the base station and a node device included in a core network including a plurality of base stations, serves as the node device of the anchor point which transmits/receives traffic to be offloaded to/from an offload network, and serves as the node device of the relay point which relays the traffic to be offloaded between the anchor point and one of the plurality of base stations with which the mobile station is communicating.

3. The offload device according to claim 2, wherein the control device stores, in the event that new communication relating to traffic to be offloaded is started while the mobile station is communicating, the anchor point information used for the first offload device serving as the anchor point of the new communication in the storage device.

4. The offload device according to claim 2, wherein the communication of traffic is transmission control protocol (TCP) communication.

5. The offload device according to claim 2, wherein the communication is multicast communication.

6. An offload traffic control method of an offload device, the method comprising:
   storing, in a storage device in a case that a mobile station starts communicating of traffic to be offloaded via a first offload device, anchor point information including line information of the traffic, identification information of the traffic, and position information of an anchor point of the traffic, relating to the first offload device, in a storage device;
   transmitting, by a packet transfer device in a case that a second offload device serves as a node device of a relay point due to handover of the mobile station while the mobile station is communicating, the anchor point information to the second offload device;
   relaying, by the packet transfer device, the traffic to be offloaded using the anchor point information received from the second offload device in a case that the first offload device serves as the node device of the relay point; and
   releasing, by a controller, the first offload device from serving as the node device of the anchor point in a case of completion of the communication, by the first offload device, wherein
   the offload device is arranged between a base station and a node device included in a core network including a plurality of base stations, serves as the node device of the anchor point which transmits/receives traffic to be offloaded to/from an offload network, and serves as the node device of a relay point which relays the traffic to be offloaded between the anchor point and one of the plurality of base stations with which the mobile station is communicating.

* * * * *